United States Patent [19]

Tufts

[11] Patent Number: 5,253,192
[45] Date of Patent: Oct. 12, 1993

[54] SIGNAL PROCESSING APPARATUS AND METHOD FOR ITERATIVELY DETERMINING ARITHMETIC FOURIER TRANSFORM

[75] Inventor: Donald W. Tufts, Greenwich, R.I.

[73] Assignee: The Board of Governors for Higher Education, State of Rhode Island and Providence Plantations, Providence, R.I.

[21] Appl. No.: 792,348

[22] Filed: Nov. 14, 1991

[51] Int. Cl.$^5$ .......................................... G06F 15/332
[52] U.S. Cl. .................................................. 364/726
[58] Field of Search ................................. 364/726, 725

[56] References Cited

U.S. PATENT DOCUMENTS

| | | | |
|---|---|---|---|
| 4,159,528 | 6/1979 | Perry | 364/726 |
| 4,231,102 | 10/1980 | Barr et al. | 364/726 |
| 4,823,295 | 4/1989 | Mader | 364/726 |
| 4,999,799 | 3/1991 | Tufts | 364/726 |

Primary Examiner—Tan V. Mai
Attorney, Agent, or Firm—Samuels, Gauthier & Stevens

[57] ABSTRACT

A signal processing apparatus and method for iteratively determining the inverse Arithmetic Fourier Transform (AFT) of an input signal by converting the input signal, which represents Fourier coefficients of a function that varies in relation to time, space, or other independent variable, into a set of output signals representing the values of a Fourier series associated with the input signal. The signal processing apparatus and method utilize a process in which a data set of samples is used to iteratively compute a set of frequency samples, wherein each computational iteration utilizes error information which is calculated between the initial data and data synthesized using the AFT. The iterative computations converge and provide AFT values at the Farey-fraction arguments which are consistent with values given by a zero-padded Discrete Fourier Transform (DFT), thus obtaining dense frequency domain samples without interpolation or zero-padding.

8 Claims, 34 Drawing Sheets

| N | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|
| $N_f$ | 31 | 41 | 45 | 57 | 63 | 71 | 79 | 95 | 101 | 119 | 127 | 139 | 149 | 171 | 179 | 199 | 211 | 229 | 241 | 269 | 277 |
| $N_m$ | 56 | 76 | 94 | 128 | 142 | 162 | 188 | 222 | 264 | 290 | 326 | 354 | 398 | 492 | 584 | 724 | 846 | 982 | 1018 | 1264 | 1396 |
| $N_p$ | 48 | 98 | 102 | 134 | 158 | 188 | 206 | 304 | 332 | 456 | 490 | 584 | 608 | 732 | 794 | 868 | 946 | 1082 | 1160 | 1436 | 1534 |
| $N_c$ | 98 | 158 | 170 | 254 | 278 | 342 | 374 | 518 | 549 | 730 | 770 | 908 | 973 | 1251 | 1308 | 1596 | 1705 | 2004 | 2120 | 2624 | 2729 |

*FIG. 4*

| N | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|
| $N_i(5)$ | 148 | 208 | 222 | 264 | 298 | 338 | 366 | 474 | 512 | 646 | 690 | 794 | 828 | 962 | 1034 | 1118 | 1206 | 1352 | 1440 | 1726 | 1834 |
| $N_i(10)$ | 248 | 318 | 342 | 394 | 438 | 488 | 526 | 644 | 692 | 836 | 890 | 1004 | 1048 | 1192 | 1274 | 1368 | 1466 | 1622 | 1720 | 2016 | 2134 |
| $N_c$ | 98 | 158 | 170 | 254 | 278 | 342 | 374 | 518 | 549 | 730 | 770 | 908 | 973 | 1251 | 1308 | 1596 | 1705 | 2004 | 2120 | 2624 | 2729 |

FIG. 5

| i | $a_i$ | j | $a_j^*$ | $\Delta_j^{(1)}$ | k | $\Delta_k^{*(1)}$ | $\Delta_k^{(2)}$ | l | $\Delta_l^{*(2)}$ | $\Delta_l^{(3)}$ | m | $\Delta_m^{*(3)}$ | $\Delta_m^{(4)}$ | n | $\Delta_n^{*(4)}$ | $\Delta_n^{(5)}$ | 0 | $\Delta_0^{*(5)}$ | $\Delta_0^{(6)}$ |
|---|---|---|---|---|---|---|---|---|---|---|---|---|---|---|---|---|---|---|---|
| 1 | -1/30 | 1 | 1/30 | 1/30 | 1 | 0 | 0 | 1 | 0 | 0 | 1 | 0 | 0 | 1 | 0 | 0 | 1 | 0 | 0 |
| 2 | 1/4 | 2 | 1/5 | 1/6 | 2 | 1/30 | 1/30 | 2 | 1/60 | 0 | 2 | 0 | 0 | 2 | 0 | 0 | 2 | 0 | 0 |
| 3 | 1/3 | 3 | 1/4 | 1/20 | 3 | 1/20 | 1/60 | 3 | 1/30 | 1/60 | 3 | 1/60 | 1/60 | 3 | 0 | 0 | 3 | 0 | 0 |
| 4 | 1/4 | 4 | 1/4 | 0 | 4 | 1/12 | 1/30 | 4 | 1/30 | 0 | 4 | 1/66 | 0 | 4 | 1/60 | 1/60 | 4 | 1/60 | 1/60 |
| 5 | 1/5 | 5 | 1/3 | 1/12 | 5 | 1/6 | 1/12 | 5 | 1/12 | 1/20 | 5 | 1/20 | 1/30 | 5 | 1/30 | 1/60 | 5 | 1/60 | 0 |

*FIG. 7*

FIG.17A $$A = \left[\begin{array}{cccc|cccc|cccc|cccc}
\frac{49}{225} & \frac{-10}{75} & \frac{-14}{45} & \frac{-10}{75} & \frac{-14}{75} & \frac{4}{25} & \frac{4}{15} & \frac{4}{25} & \frac{-14}{45} & \frac{4}{15} & \frac{4}{9} & \frac{4}{15} & \frac{-14}{75} & \frac{4}{25} & \frac{4}{15} & \frac{4}{25} \\
\frac{7}{45} & 0 & \frac{14}{45} & 0 & \frac{-10}{75} & 0 & \frac{-4}{45} & 0 & \frac{-2}{9} & 0 & \frac{-4}{9} & 0 & \frac{-10}{75} & 0 & \frac{-4}{45} & 0 \\
\frac{7}{75} & \frac{10}{75} & 0 & \frac{10}{75} & \frac{-2}{25} & \frac{-4}{25} & 0 & \frac{-4}{25} & \frac{-10}{75} & \frac{-4}{15} & 0 & \frac{-4}{15} & \frac{-2}{25} & \frac{-4}{25} & 0 & \frac{-4}{25} \\
\hline
\frac{7}{45} & \frac{-10}{75} & \frac{-2}{9} & \frac{-10}{75} & 0 & 0 & 0 & 0 & \frac{14}{45} & \frac{-4}{15} & \frac{-4}{9} & \frac{-4}{15} & 0 & 0 & 0 & 0 \\
\frac{1}{9} & 0 & \frac{2}{9} & 0 & 0 & 0 & 0 & 0 & \frac{2}{9} & 0 & \frac{4}{9} & 0 & 0 & 0 & 0 & 0 \\
\frac{1}{15} & \frac{10}{75} & 0 & \frac{10}{75} & 0 & 0 & 0 & 0 & \frac{10}{75} & \frac{4}{15} & 0 & \frac{4}{15} & 0 & 0 & 0 & 0 \\
\hline
\frac{7}{75} & \frac{-10}{75} & \frac{-10}{75} & \frac{-10}{75} & \frac{14}{75} & \frac{-4}{25} & \frac{-4}{15} & \frac{-4}{25} & 0 & 0 & 0 & 0 & \frac{14}{75} & \frac{-4}{25} & \frac{-4}{15} & \frac{-4}{25} \\
\frac{1}{15} & 0 & \frac{10}{75} & 0 & \frac{10}{75} & 0 & \frac{4}{15} & 0 & 0 & 0 & 0 & 0 & \frac{10}{75} & 0 & \frac{4}{15} & 0 \\
\frac{1}{25} & \frac{10}{75} & 0 & \frac{10}{75} & \frac{2}{25} & \frac{4}{25} & 0 & \frac{4}{25} & 0 & 0 & 0 & 0 & \frac{2}{25} & \frac{4}{25} & 0 & \frac{4}{25}
\end{array}\right]$$

$$D = \begin{bmatrix}
0.000 & 0.000 & 0.000 & 0.000 & 0.000 & 0.000 & 0.000 & 0.000 & 0.000 \\
0.559 & -0.559 & 0.000 & 0.559 & -0.559 & 0.000 & 0.559 & -0.559 & 0.000 \\
0.000 & 0.000 & 0.000 & 0.000 & 0.000 & 0.000 & 0.000 & 0.000 & 0.000 \\
-0.559 & 0.559 & 0.000 & -0.559 & 0.559 & 0.000 & -0.559 & 0.559 & 0.000 \\
0.559 & 0.559 & 0.559 & -0.559 & -0.559 & -0.559 & 0.000 & 0.000 & 0.000 \\
0.033 & -0.312 & 0.559 & -0.312 & 0.592 & -0.559 & 0.559 & -0.559 & 0.000 \\
-0.279 & 0.559 & -0.279 & 0.279 & -0.559 & 0.279 & 0.000 & 0.000 & 0.000 \\
-0.312 & 0.033 & 0.599 & 0.592 & -0.312 & -0.599 & -0.559 & 0.559 & 0.000 \\
0.000 & 0.000 & 0.000 & 0.000 & 0.000 & 0.000 & 0.000 & 0.000 & 0.000 \\
-0.279 & 0.279 & 0.000 & 0.559 & -0.559 & 0.000 & -0.279 & 0.279 & 0.000 \\
0.000 & 0.000 & 0.000 & 0.000 & 0.000 & 0.000 & 0.000 & 0.000 & 0.000 \\
0.279 & -0.279 & 0.000 & -0.559 & 0.559 & 0.000 & 0.279 & -0.279 & 0.000 \\
-0.559 & -0.559 & -0.559 & 0.559 & 0.559 & 0.559 & 0.000 & 0.000 & 0.000 \\
-0.312 & 0.592 & -0.559 & 0.033 & -0.312 & -0.559 & 0.559 & -0.559 & 0.000 \\
0.279 & 0.559 & 0.279 & 0.279 & 0.559 & 0.279 & 0.000 & 0.000 & 0.000 \\
0.592 & -0.312 & -0.559 & -0.312 & 0.033 & 0.559 & -0.559 & 0.559 & 0.000
\end{bmatrix}$$

$$\begin{bmatrix} x[0,0] \\ x[1,0] \\ x[2,0] \\ --- \\ x[0,1] \\ x[1,1] \\ x[2,1] \\ --- \\ x[0,2] \\ x[1,2] \\ x[2,2] \end{bmatrix} = \begin{bmatrix} 1 & -1 & -1 & | & -1 & 1 & 1 & | & -1 & 1 & 1 \\ 0 & 1 & 0 & | & 0 & -1 & 0 & | & 0 & -1 & 0 \\ 0 & 0 & 1 & | & 0 & 0 & -1 & | & 0 & 0 & -1 \\ - & - & - & | & - & - & - & | & - & - & - \\ 0 & 0 & 0 & | & 1 & -1 & -1 & | & 0 & 0 & 0 \\ 0 & 0 & 0 & | & 0 & 1 & 0 & | & 0 & 0 & 0 \\ 0 & 0 & 0 & | & 0 & 0 & 1 & | & 0 & 0 & 0 \\ - & - & - & | & - & - & - & | & - & - & - \\ 0 & 0 & 0 & | & 0 & 0 & 0 & | & 1 & -1 & -1 \\ 0 & 0 & 0 & | & 0 & 0 & 0 & | & 0 & 1 & 0 \\ 0 & 0 & 0 & | & 0 & 0 & 0 & | & 0 & 0 & 1 \end{bmatrix} \begin{bmatrix} S[1,1] \\ S[3,1] \\ S[5,1] \\ --- \\ S[1,3] \\ S[3,3] \\ S[5,3] \\ --- \\ S[1,5] \\ S[3,5] \\ S[5,5] \end{bmatrix}$$

SIGNAL PROCESSING APPARATUS AND METHOD FOR ITERATIVELY DETERMINING ARITHMETIC FOURIER TRANSFORM

BACKGROUND OF THE INVENTION

The invention relates to a signal processing apparatus and methods for performing Fourier analysis and synthesis.

The Arithmetic Fourier Transform (AFT) is an algorithm for accurate high speed Fourier analysis and narrow-band filtering. The arithmetic computations in the AFT can be performed in parallel. Except for a small number of scalings in one stage of the computation, only multiplications by 0, +1 and −1 are required. Thus, the accuracy of the AFT is limited only by the analog-to-digital conversion of the input data, not by accumulation of rounding and coefficient errors as in the Fast Fourier Transform (FFT). Furthermore, the AFT needs no storage of memory addressing. These properties of the AFT make it very suitable for VLSI implementation of Fourier analysis.

In the early part of this century, a mathematician, H. Bruns, found a method for computing the Fourier series coefficients of a periodic function using Mobius inversion. Later in 1945, another mathematician, Aurel Wintner, reconsidered this technique and developed an arithmetic approach to ordinary Fourier series. Tufts later discovered the same algorithm and named it the Arithmetic Fourier Transform (AFT) and showed how parallel computations and efficient communication and control are built into the algorithm and pointed out its applications in fast Fourier analysis and signal processing using the AFT and used a simple interpolation scheme to realize the extended AFT. Relating thereto, Tufts described a signal processing apparatus for generating a Fourier transform of a signal using the AFT in U.S. Pat. No. 4,999,799, incorporated herein by reference.

Recently, a method of approximately realizing the inverse AFT by successive approximation has been proposed. This method is closely related to the least mean squares (LMS) successive approximation realization of the Discrete Fourier Transform (DFT). Using the adaptive method, only N time domain data samples are required and about $N^2/3$ frequency domain samples are obtained. This is in contrast with the original forward use of the AFT algorithm in which about $N^2/3$ time domain samples are required to compute N frequency domain samples. The computations involved in this sequential AFT method are the same as those in the AFT, namely, scaling by inverse-integer factors and accumulation. The number of iterations of this sequential method depends directly on the input data length N and there are difficulties about the convergence of this approximation process to a result which is consistent with a zero-padded DFT.

A unique apparatus and method for iteratively determining the inverse AFT is herein presented. The apparatus and method utilize an algorithm which uses a data block of N samples to iteratively compute a set of about $N^2$ frequency samples. Each iteration uses the error information between the observed data and data synthesized using the original AFT algorithm. If started with a properly synthesized data vector, the calculation will converge and give the inverse AFT values at the Farey-fraction arguments which are consistent with the values given by a zero-padded DFT. Therefore, it effectively overcomes the difficulty of dense, Farey-fraction sampling iterative use of the AFT. Dense frequency domain samples are obtained without any interpolation or zero-padding. The implementation of this iterative apparatus and method also preserves the advantage of the AFT for VLSI implementation by using a permuted difference coefficient structure (PDC) to provide simple computation of the updated Fourier transform vector. PDC is based on the mathematical formulation known as Summation by Parts (SBP) which is a finite difference analog to the integration by parts reformulation of an integral found in any standard calculus book. The arithmetic computation of this iterative AFT has a high degree of parallelism and the resulting architecture is regular. Because of its simplicity, this iterative AFT apparatus and method could be of interest in many applications such as phase retrieval, two dimensional maximum entropy power spectral estimation and recursive digital filter design, where many Fourier transform and inverse Fourier transform calculations are required, realization of multichannel filters, and determination of direction of arrival of a signal using an array of antennas, or microphones or hydrophones. The iterative AFT apparatus and method may be used with the AFT in these applications to perform the Fourier analysis efficiently.

BRIEF SUMMARY OF THE INVENTION

According to one embodiment of the present invention, there is provided a signal processing apparatus and method for converting an input signal, which represents Fourier coefficients of a function that varies in relation to an independent variable, into a set of output signals respectively representing the values of a Fourier series associated with the input signal. The apparatus and method involve receiving the input signal; generating a data signal vector comprising plural sets of samples of the input signal within an analysis period of said independent variable; generating a frequency domain signal vector representative of an approximation of the frequency domain signal vector by multiplying the data signal vector by a predetermined transform signal matrix, wherein the generating involves a predetermined number of computational iterations, and the frequency domain signal vector comprises plural sets of frequency samples of the input signal; performing an inverse transformation on the frequency domain signal vector by multiplying the frequency domain signal vector by an Arithmetic Fourier Transform signal matrix to produce a synthesized data signal vector representative of an approximation of the data signal vector; generating an error signal vector by determining the difference between the generated data signal vector and the synthesized data signal vector; converting the error signal vector into a frequency domain improvement signal by multiplying the error signal vector by the transpose of the Arithmetic Fourier Transform signal matrix, and by a predetermined scaling signal value; generating an updated frequency domain signal vector by adding the frequency domain improvement signal vector to the frequency domain signal vector; utilizing the updated frequency domain signal vector as a replacement signal vector for the frequency domain signal vector, and thereafter cycling the frequency domain signal vector through the means for performing, means for generating, means for converting and means for generating for the predetermined number of computational iterations;

and producing the output signals representative of said calculated frequency domain signal vector.

According to another embodiment of the present invention, there is provided a signal processing apparatus and method for converting an input signal, which represents Fourier coefficients of a function that varies in relation to an independent variable, into a set of output signals respectively representing the values of a Fourier series associated with the input signal. The apparatus and method involve receiving the input signal; generating a data signal vector comprising plural sets of samples of the input signal within an analysis period of the independent variable; generating a preliminary frequency domain signal vector by multiplying the data signal vector by a predetermined transform signal vector, the preliminary frequency domain signal vector comprising plural sets of frequency samples of the input signal; generating a frequency domain signal vector representative of an approximation of the frequency domain signal vector, wherein the generating involves a predetermined number of computational iterations; performing an inverse transformation on the frequency domain signal vector by multiplying the frequency domain signal vector by an Arithmetic Fourier Transform signal matrix to produce a synthesized data signal vector representative of an approximation of the data signal vector; generating an error signal vector by determining the difference between said generated data signal vector and the synthesized data signal vector; converting the error signal vector into a frequency domain improvement signal vector by multiplying the error signal vector by the transpose of the Arithmetic Fourier Transform signal matrix, and by a predetermined scaling signal value; generating an updated frequency domain vector by adding the frequency domain improvement signal vector to the frequency domain signal vector; utilizing the updated frequency domain signal vector as a replacement signal vector for the frequency domain signal vector, and thereafter cycling the frequency domain signal vector through the means for performing, means for generating, means for converting and means for generating for the predetermined number of computational iterations; and producing the output signals representative of the calculated frequency domain signal vector.

DESCRIPTION OF THE ILLUSTRATED EMBODIMENTS

FIG. 4 shows a table of the number of Farey-fraction frequency-domain values as a function of N;

FIG. 5 shows a table of values of multiplications required in the direct computation and the iterative computation;

FIG. 7 shows a table of values of the differencing and permuting process;

Figure 17A:
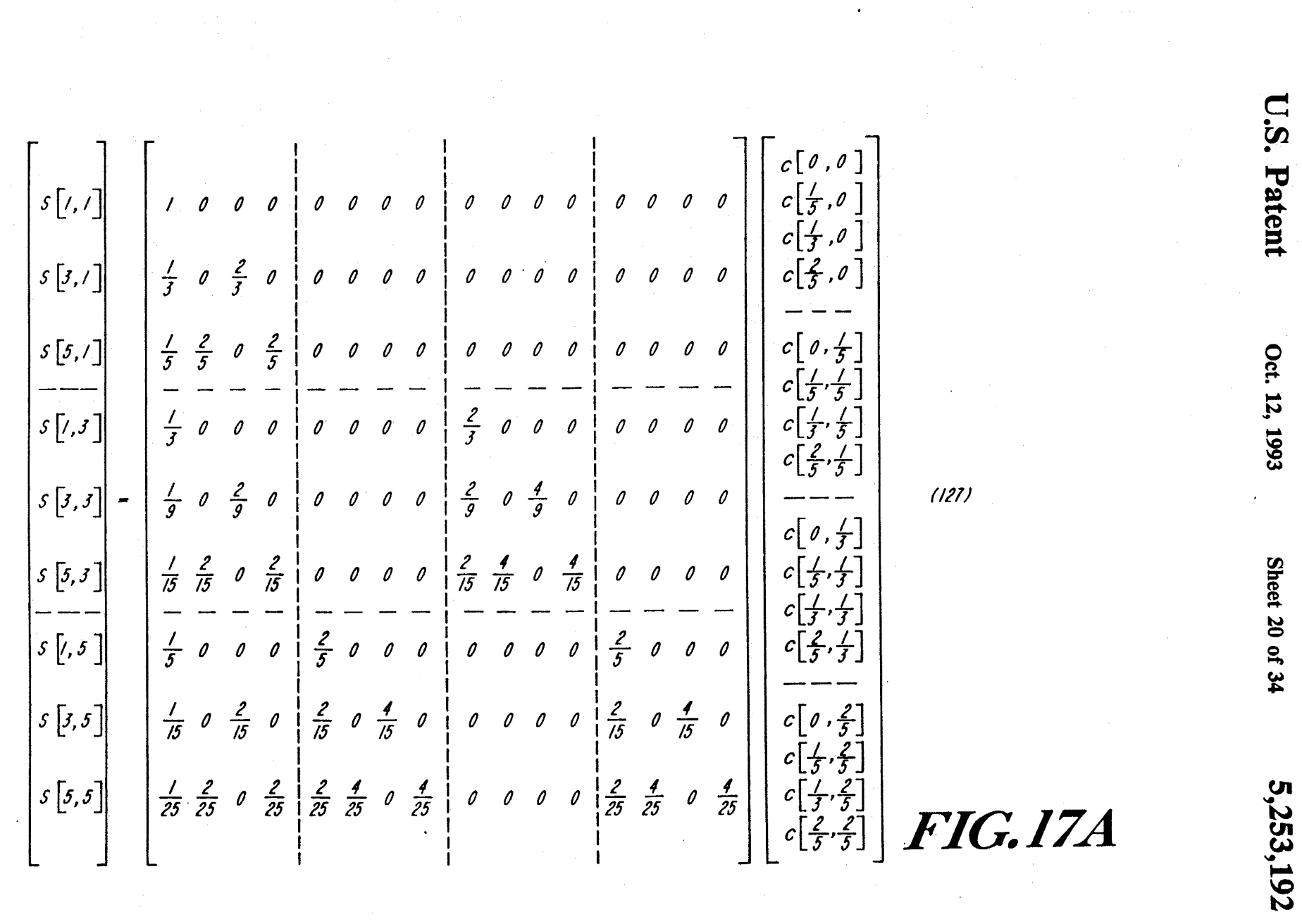
Figures 17B, 18:
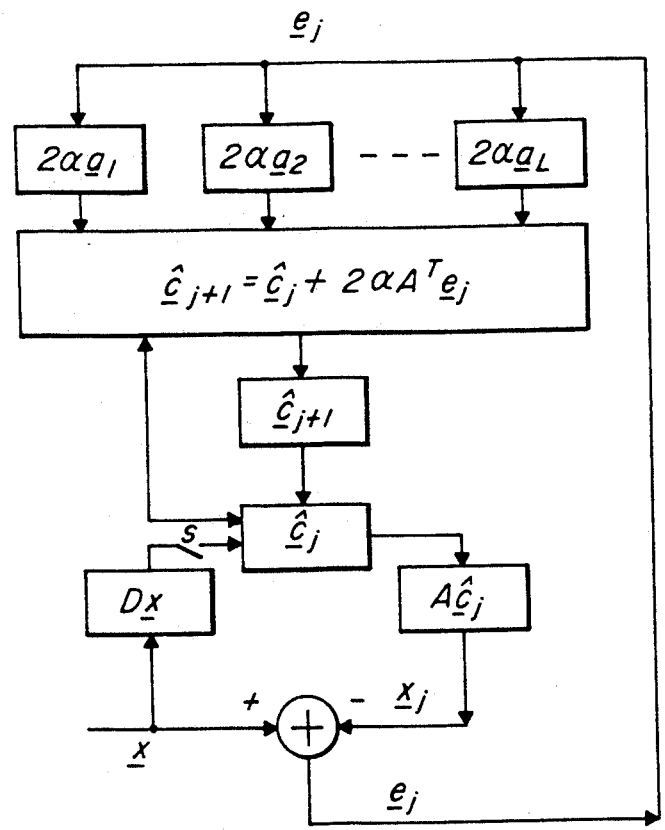
Figure 19:
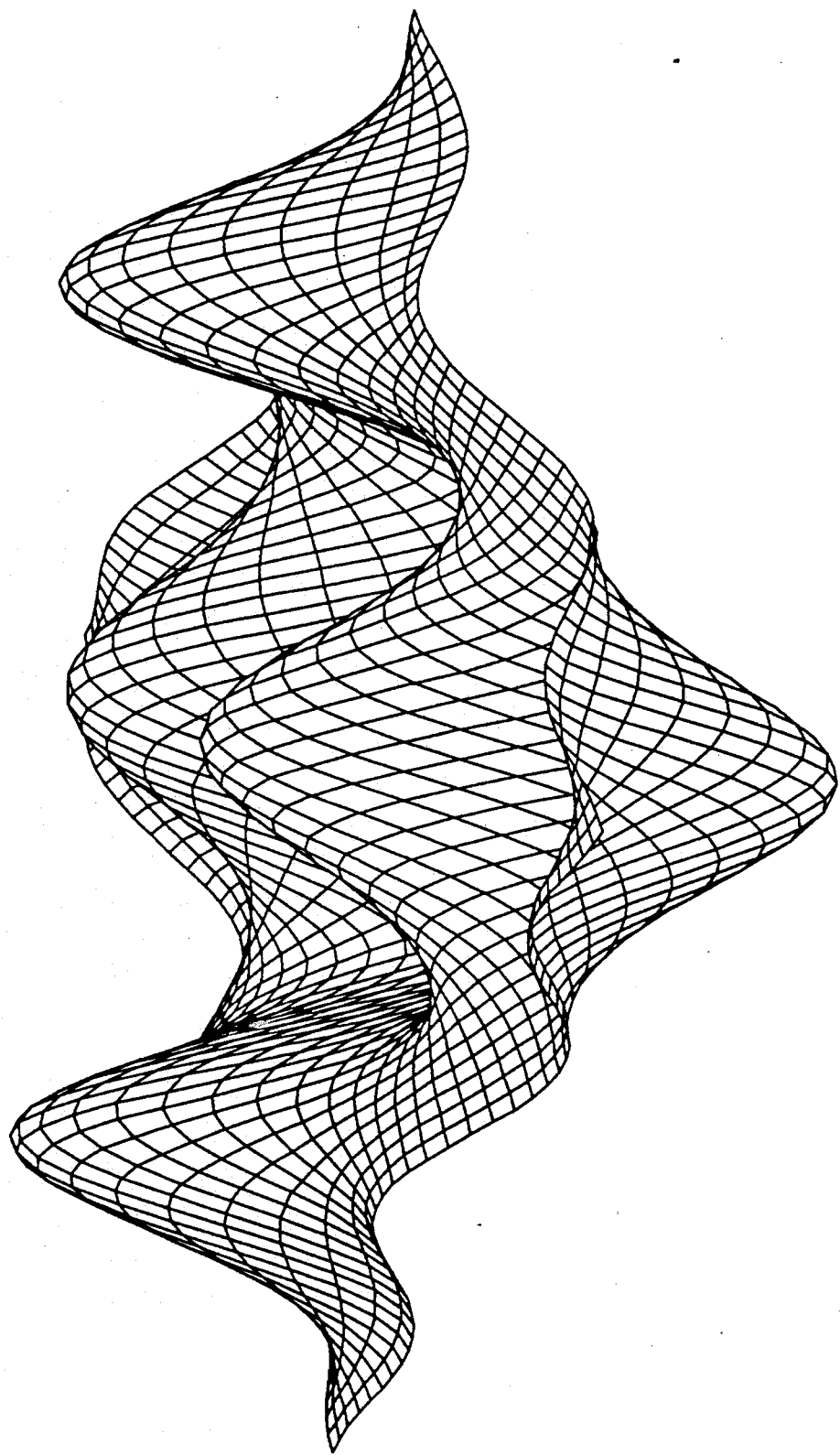
Figure 20A:
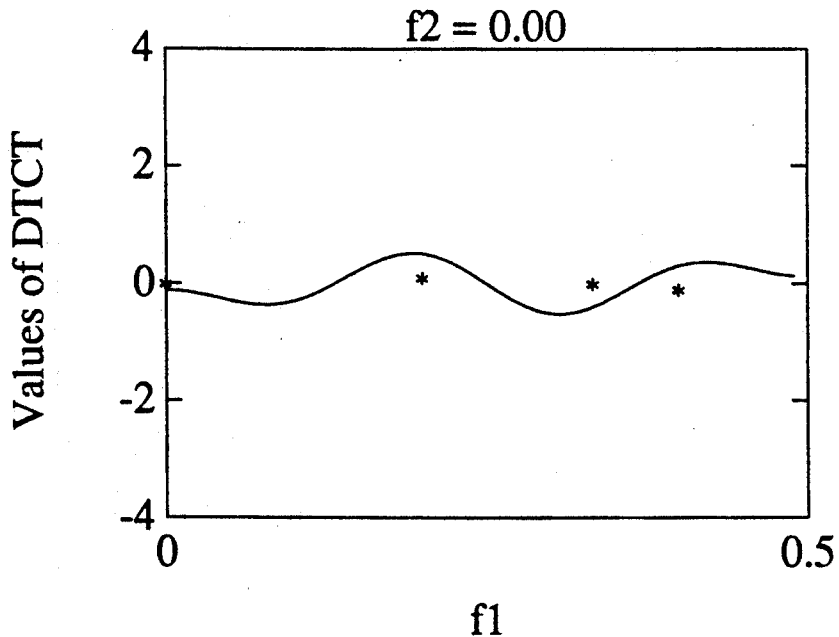
Figure 20B:
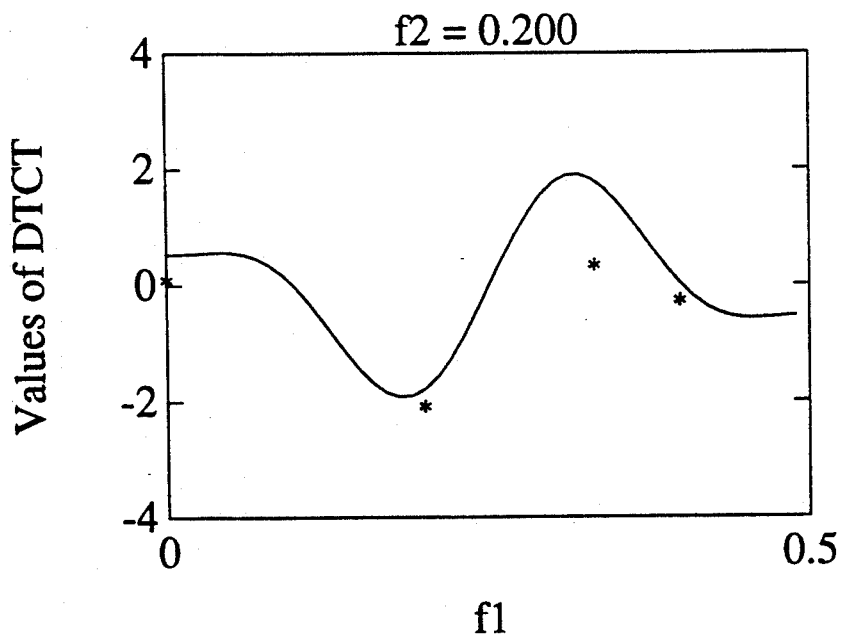
Figure 20C:
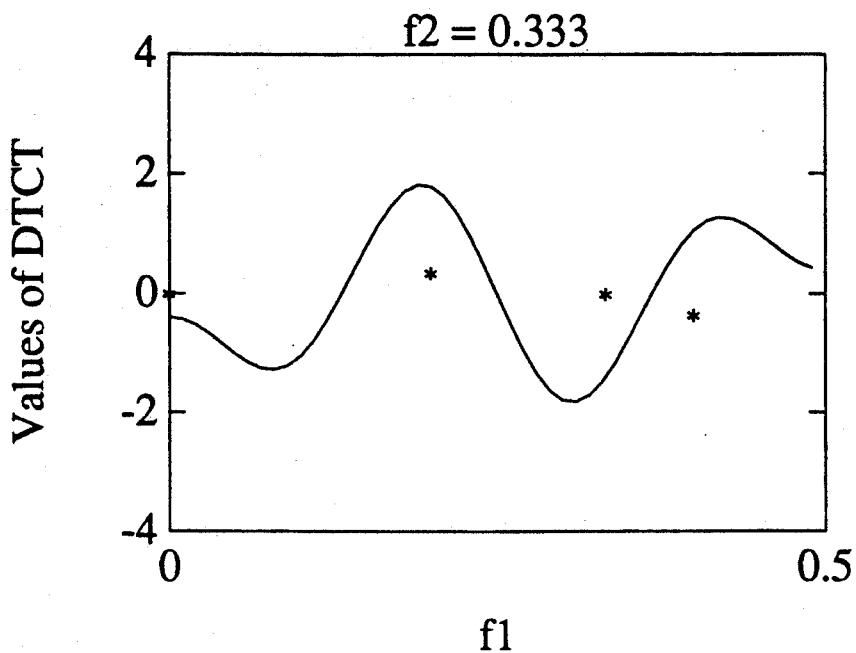
Figure 20D:
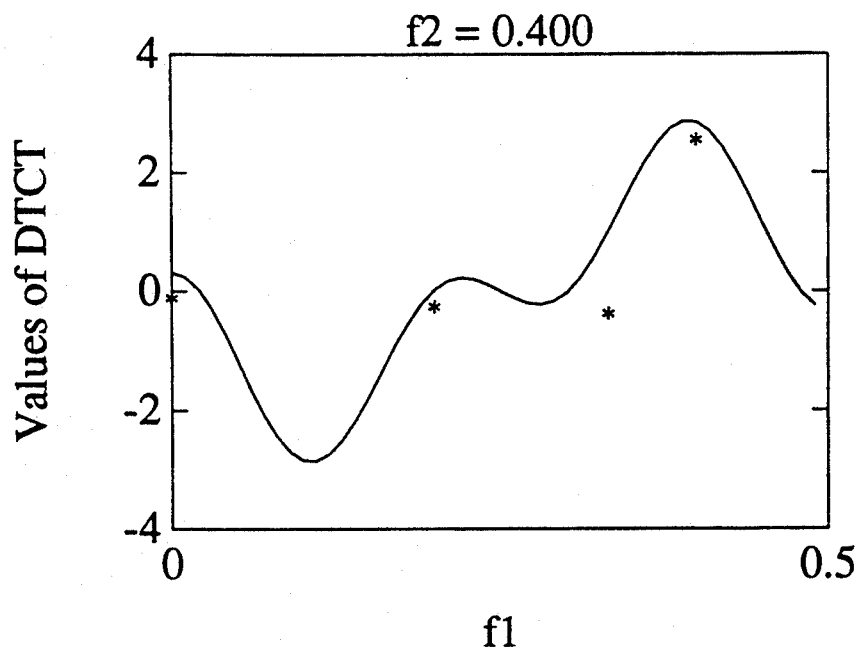
Figure 21A:
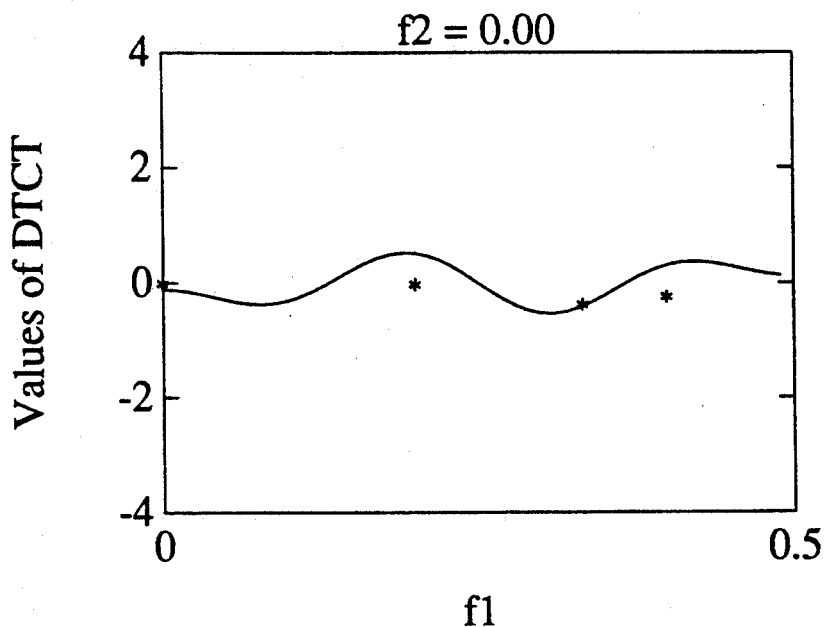
Figure 21B:
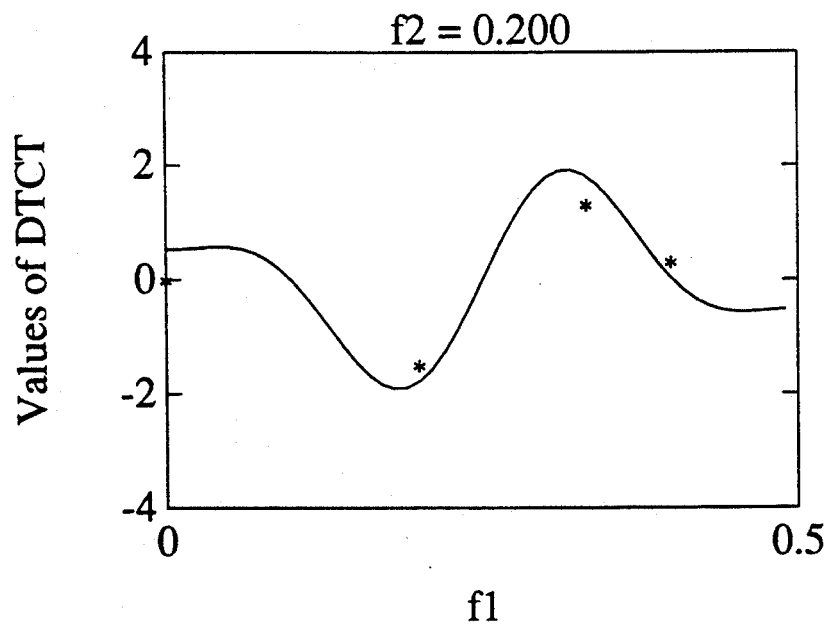
Figure 21C:
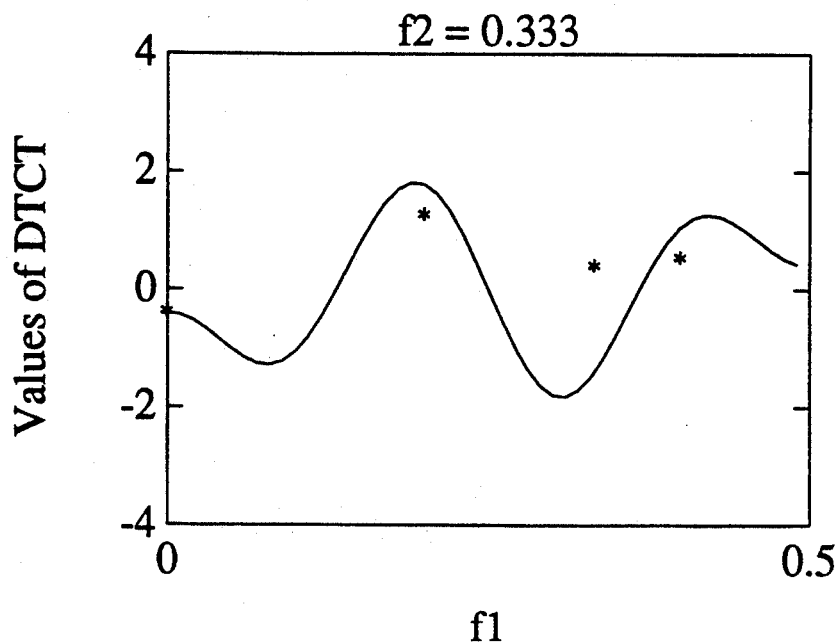
Figure 21D:
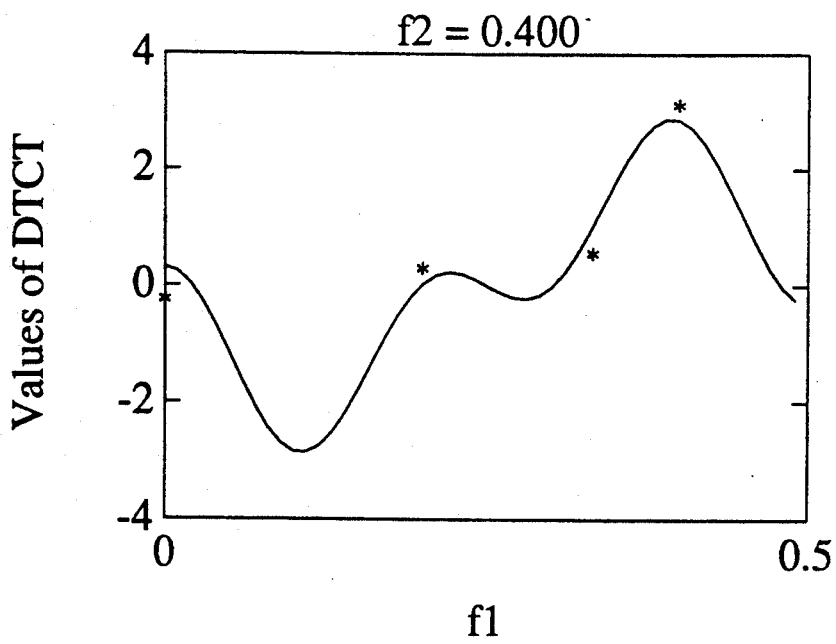
Figure 22A:
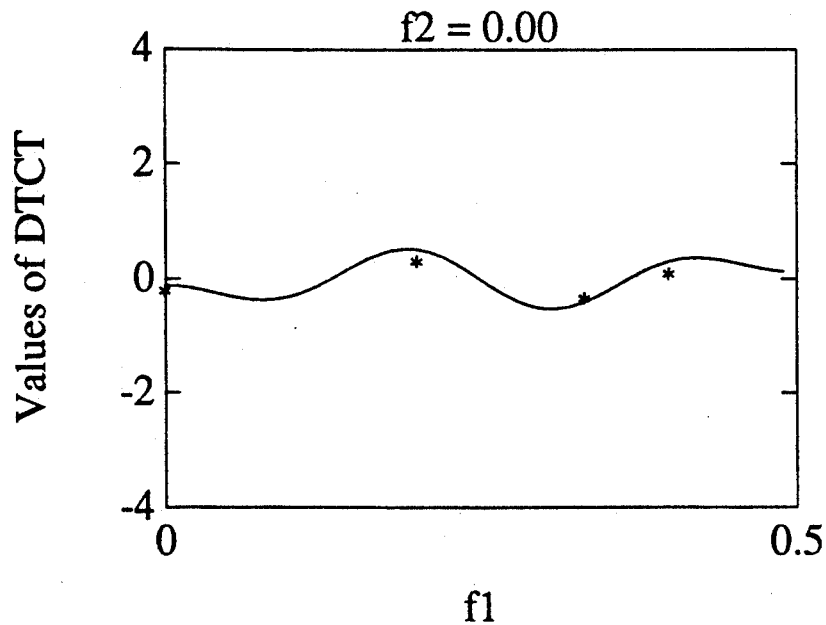
Figure 22B:
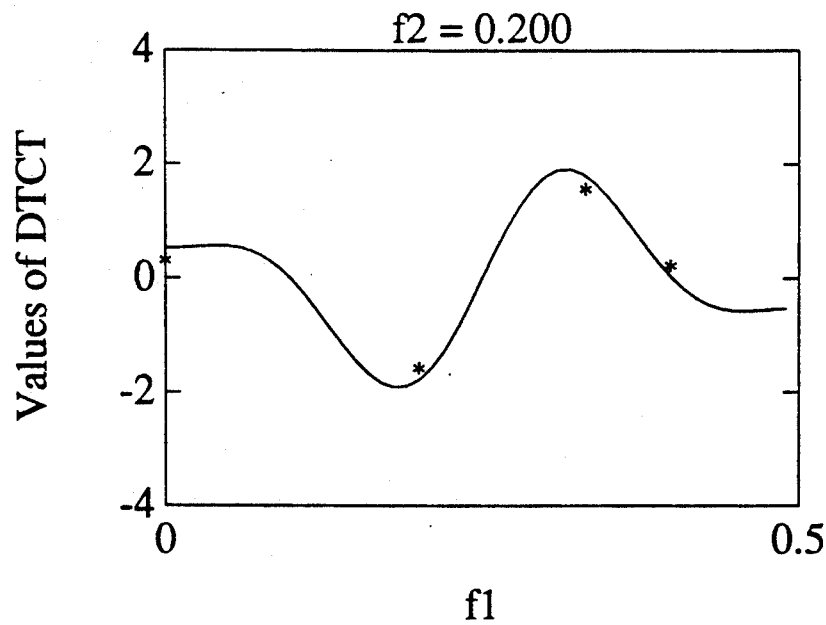
Figure 22C:
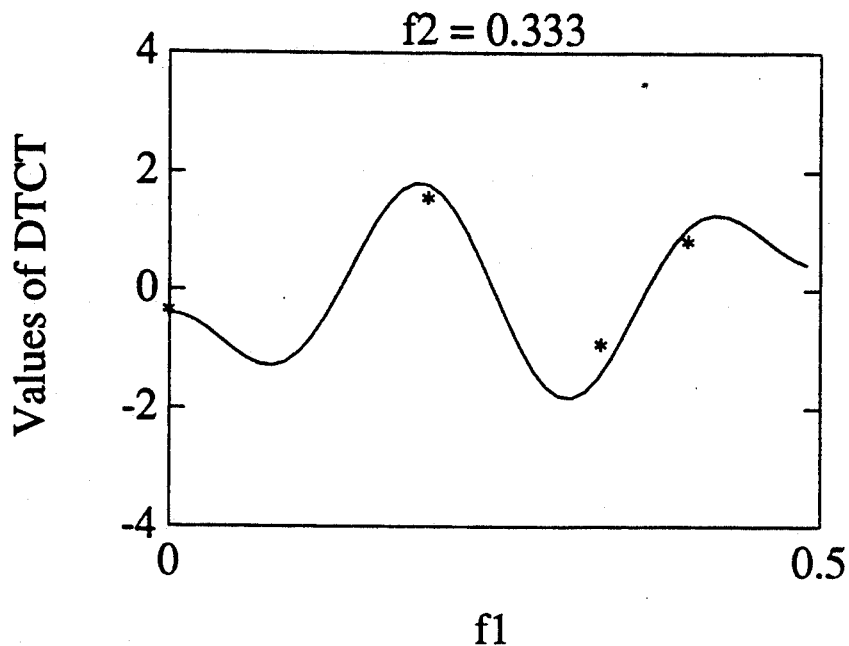
Figure 22D:
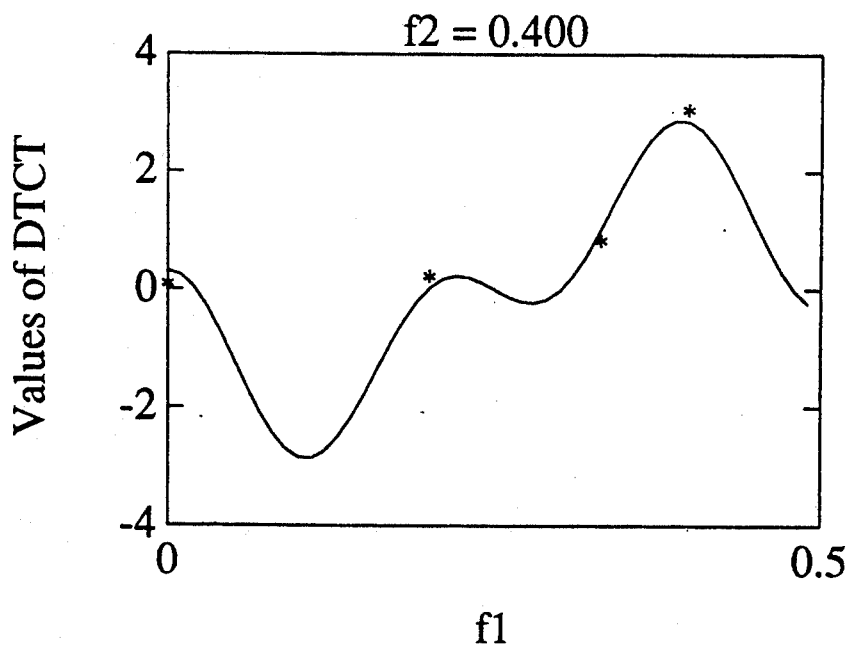
Figure 23A:
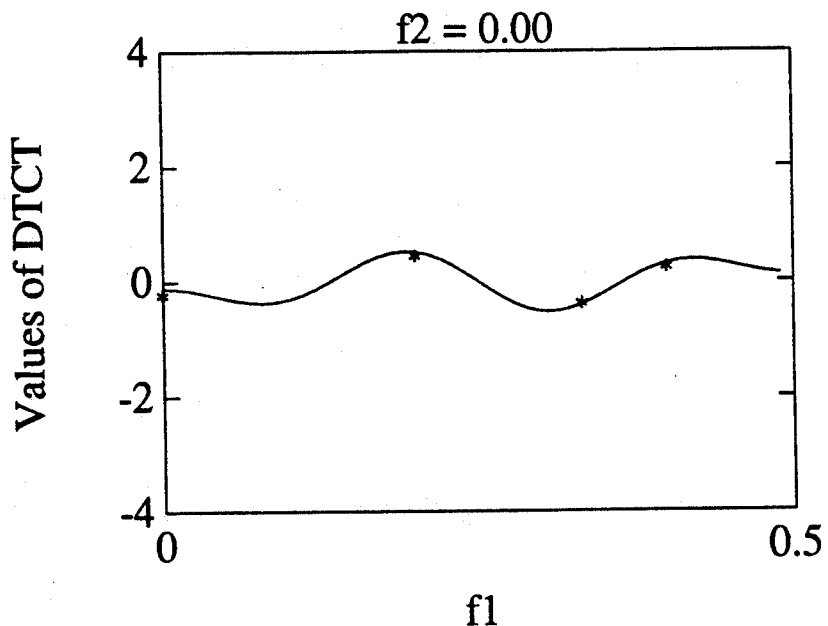
Figure 23B:
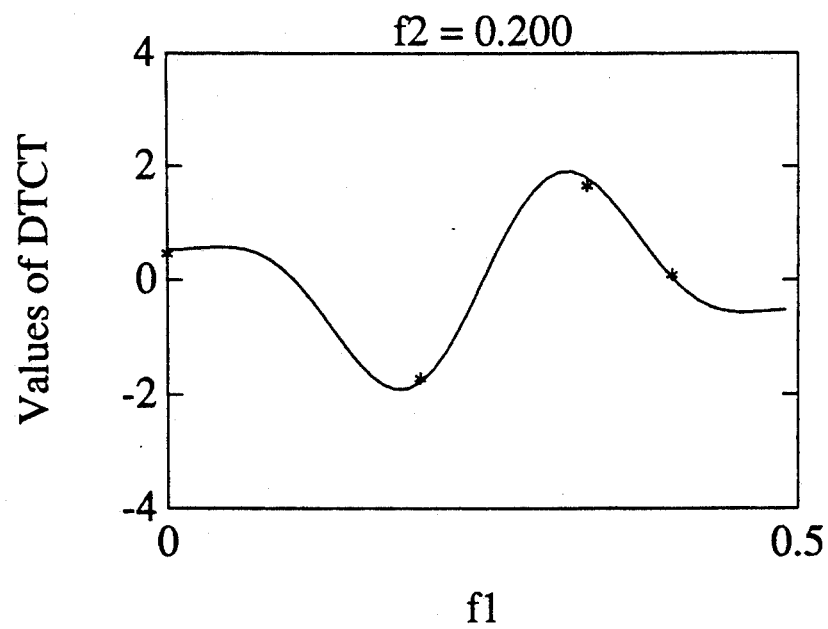
Figure 23C:
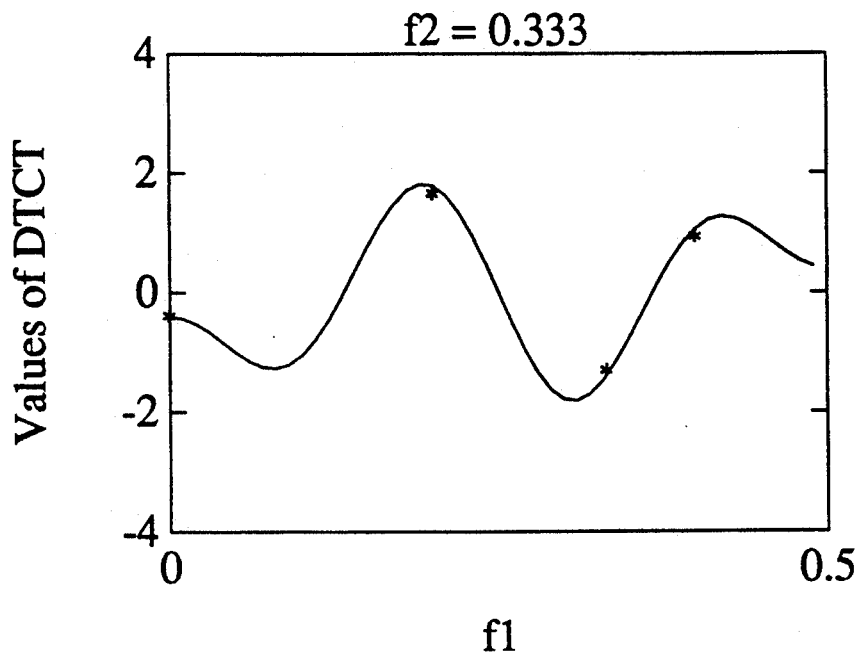
Figure 23D:
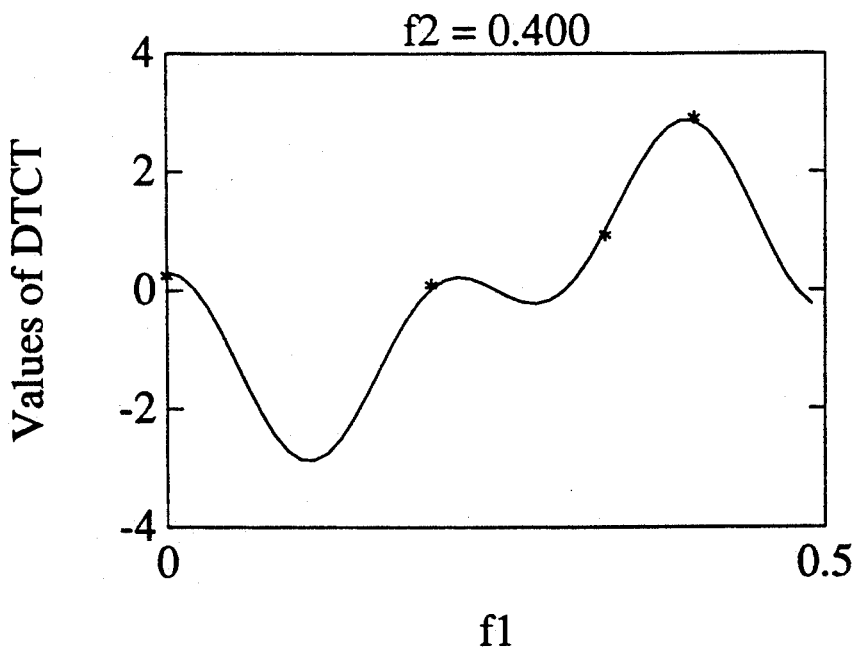
Figure 24A:
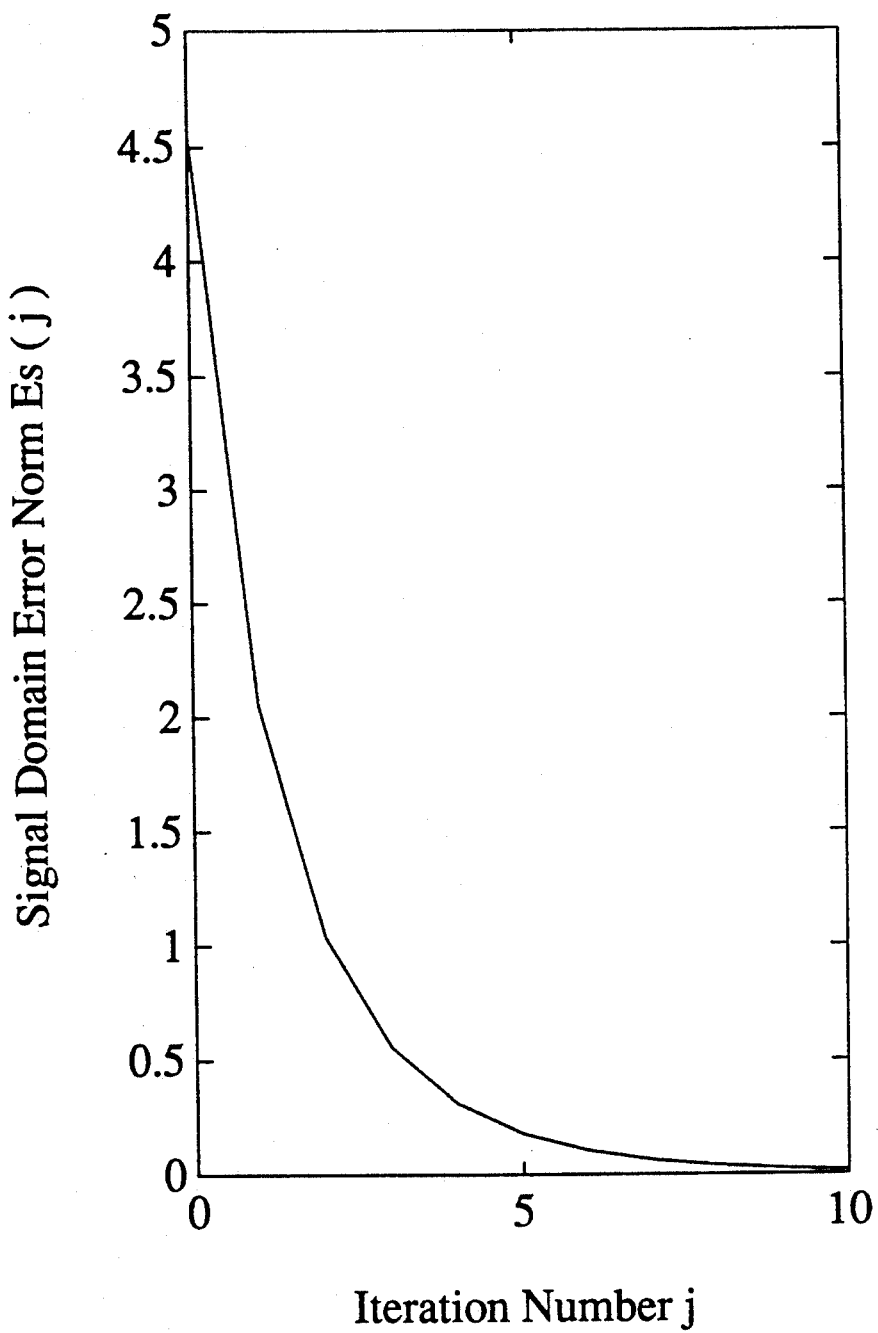
Figure 24B:
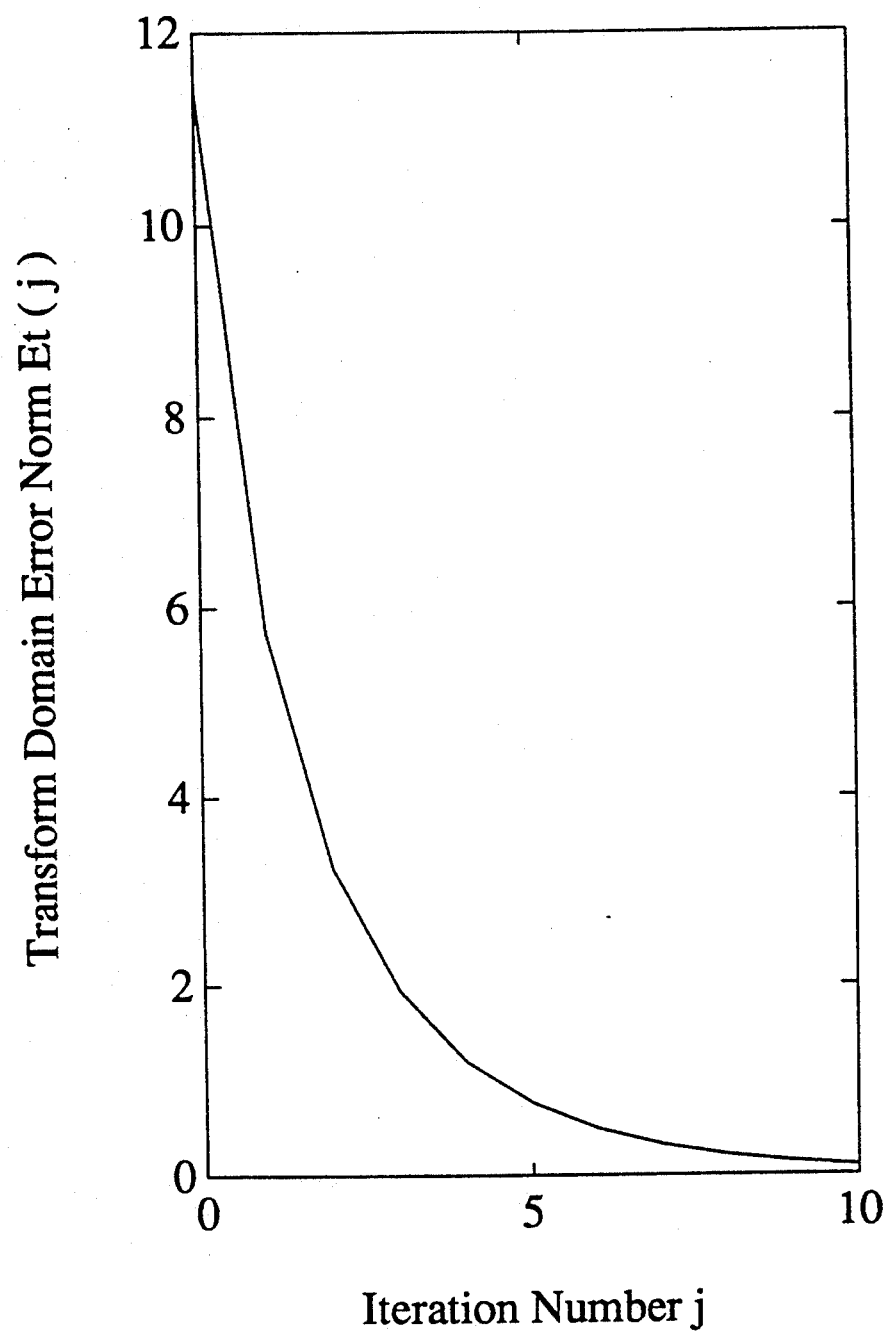
Figure 25:
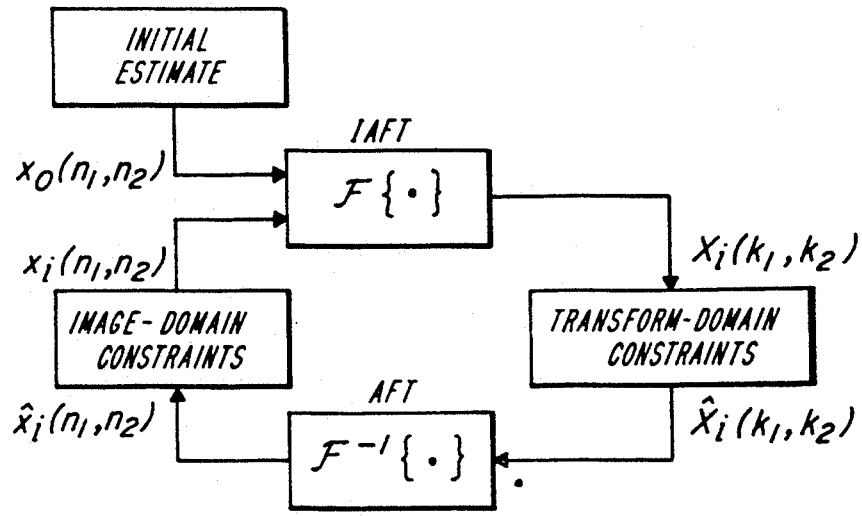
Figure 26:
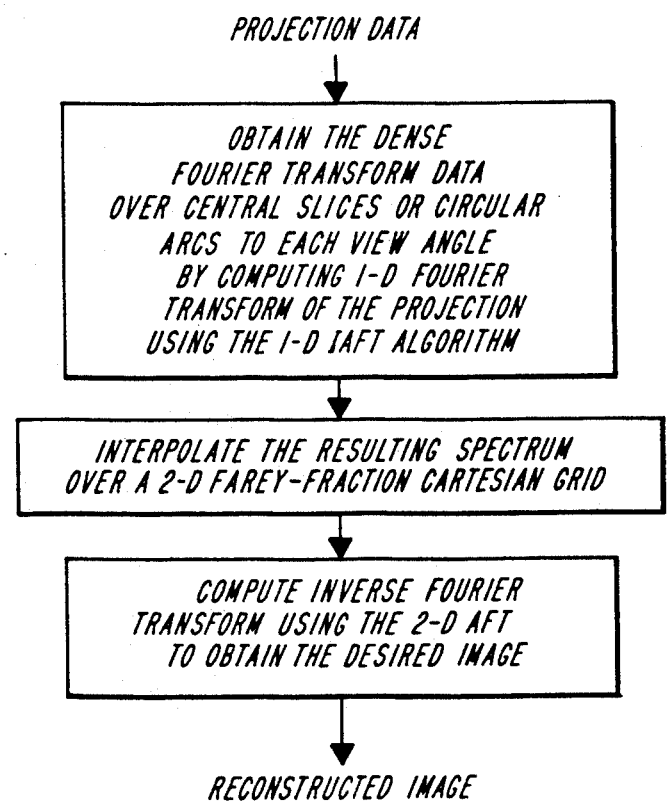

FIGS. 17A-17D respectively show matrices (127); (128); (130); and (139) of the present specification;

FIG. 18 shows a functional block diagram of a signal processing apparatus used for the computation of the DCT using the iterative AFT;

FIG. 19 shows a mesh plot of the function $c(w_1,w_2)$ defined by equation (100) of the present specification;

FIGS. 20-23 show plots of values of the function $c(w_1,w_2)$ defined by equation (100) along different frequency values;

FIG. 24 shows a plot of the squared error norms;

FIG. 25 shows a block diagram of the constrained image reconstruction using the iterative AFT; and FIG. 26 shows a flow chart for using the AFT and the IAFT to recover CT images.

DETAILED DESCRIPTION OF THE ILLUSTRATED EMBODIMENTS

The Mobius Function and Farey Functions

The Arithmetic Fourier transform (AFT) is a number-theoretic approach to accurate high speed Fourier analysis and synthesis. Since the Mobius function and Farey-fraction will be referred to frequently herein, a brief introduction about their important properties is helpful in the following discussions.

The Mobius function is defined on the positive integers by the formula $$\mu(n) = \begin{cases} = +1 & \text{if } n = 1; \\ = (-1)^s & \text{if } n \text{ is the product of } s \text{ distinct primes}; \\ = 0 & \text{if } p^2 | n \text{ for any prime } p. \end{cases}$$

The vertical bar notation mn in the above equation and in other formulas below means that the inter m divides the integer n exactly without remainder. Thus., the Mobius function is nonzero only when n=1 and n is square-free. It takes only three values: +1, −1 and 0. The values of first 9 values of the Mobius function $\mu(n)$ are:

$$\mu(1) = 1 \quad \mu(2) = -1 \quad \mu(3) = -1$$
$$\mu(4) = 0 \quad \mu(5) = -1 \quad \mu(6) = 1$$
$$\mu(7) = 1 \quad \mu(8) = 0 \quad \mu(9) = 0$$

The most important property of the Mobius function used in the AFT is that its summatory function is non-zero only when $j=k$. Therefore, the Kronecker delta function can be expressed using the summatory function of the Mobius function as $$\delta(j,k) = \sum_{n|j/k} \mu(n) = \begin{cases} 1 & \text{if } j = k; \\ 0 & \text{if } j \neq k; \end{cases}$$

As a result, the Mobius transform and its inverse transform pair can be defined as $$F(n) = \sum_{d|n} f(d) \quad f(n) = \sum_{d|n} \mu\left(\frac{n}{d}\right) F(d),$$

which permits us to determine a function f(n) from its summatory function F(n).

The Farey series in number theory is also used in the AFT. The Farey sequence $F_N$ of order N is the ascending sequence of irreducible fractions between 0 and 1 (both inclusive) whose denominators do not exceed N. For example, Fary series of order 5 are:

$$F_5 = \frac{0}{1}, \frac{1}{5}, \frac{1}{4}, \frac{1}{3}, \frac{2}{5}, \frac{1}{2}, \frac{3}{5}, \frac{2}{3}, \frac{3}{4}, \frac{4}{5}, \frac{1}{1}$$

In the interval [c, c+1] there are approximately $3N^2/\pi^2$ Farey fractions. In the following description, it will be seen that in the computation of DCT using the AFT and the iterative AFT, the sampling points occur at certain Farey fractions.

Block Iterative Computation of the AFT

In order to compute N uniformly spaced time domain samples x[n] using the AFT, we require F frequency domain samples $$X\left[\frac{k}{m}\right],$$

of the Fourier transform of x[n], at the Farey-fraction values of $$\frac{k}{m}.$$

The samples x[n] and $$X\left[\frac{k}{m}\right]$$

are related by $$X\left[\frac{k}{m}\right] = \sum_{n=1}^{N} x[n]\cos\left(2\pi \cdot n \cdot \frac{k}{m}\right), \quad (1)$$

with $m=1, \ldots N; k=0, \ldots, m-1$. The Farey-fraction sequence of order N is defined as the ascending series of irreducible fractions between 0 and 1 (both inclusive) with denominators which do not exceed N. For example, the sequence of Farey-fractions of order 5 in the interval [0,1] are:

$$\frac{0}{1}, \frac{1}{5}, \frac{1}{4}, \frac{1}{3}, \frac{2}{5}, \frac{1}{2}, \frac{3}{5}, \frac{2}{3}, \frac{3}{4}, \frac{4}{5}, \frac{1}{1}.$$

The total number F of frequency domain, Farey-fraction samples in the interval [0,1] corresponding to N time domain samples can be estimated as:

$$F(N) = 3\left(\frac{N}{\pi}\right)^2 + O(N\ln N). \quad (2)$$

That is, much denser frequency domain samples are needed for the AFT than the conventional inverse discrete Fourier transform (IDFT).

Equation (1) can be expressed in a matrix form as:

$$X = Cx$$

where C is an $F \times N$ matrix whose $i^{th}$ column is the cosine function $\cos(2\pi it)$ sampled at values of t which are Farey fraction values $$\frac{k}{m}.$$

The vectors $\underline{x}$ and $\underline{X}$ are defined as $$x = (x[1]\ x[2] \ldots x[N])^T, \quad (4)$$

$$X = \left(X[0]\ X\left[\frac{1}{N}\right] \ldots X\left[\frac{k}{m}\right] \ldots X\left[\frac{N-1}{N}\right]\right)^T \quad (5)$$

with T denoting the vector transpose operation. The elements X[0] to $$X\left[\frac{N-1}{N}\right]$$

are arranged according to the order of the increasing Farey-fraction values $$\frac{k}{m}.$$

Then according to the AFT algorithm by Tufts and Sadasiv, the result is:

$$x[n] = \sum_{m=1}^{\left[\frac{N}{n}\right]} \mu[m]s[m \cdot n], \quad n = 1, \ldots, N. \quad (6)$$

where $$\left[\frac{N}{n}\right]$$

indicates the integer part of $$\frac{N}{n}$$

and μ[m] is the Mobius function defined on the positive by:

$$\mu(m) = \begin{cases} 1, & \text{if } m = 1; \\ (-1)^s, & \text{if } m = p_1 \cdot p_2 \ldots p_s, \text{ where } p_i \text{ are distinct primes}; \\ 0, & \text{if } p^2 | m \text{ for any prime } p. \end{cases} \quad (7)$$

where the vertical bar notation $p^2|m$ means that the integer $p^2$ divides the integer m exactly without remainder. The function s[n] of the integer argument n is defined by $$s[n] = \frac{1}{n} \sum_{m=0}^{n-1} X\left[\frac{m}{n}\right], \quad n = 1, \ldots, N. \quad (8)$$

Because μ(m) in (7) only takes on values +1, −1 and 0 and s[n] in (8) can be easily computed with summation and scaling, equation (6) provides a very simple way of determining x[n] from samples of $$X\left[\frac{k}{m}\right]$$

in the AFT.

When given N uniformly spaced time domain samples x[n], we can determine the frequency domain samples $$X\left[\frac{k}{m}\right]$$

at the Farey-fraction values by iterative use of the AFT. From (6) and (8) above, we can relate x[n] and $$X\left[\frac{k}{m}\right]$$

by the AFT matrix A as $$X = AX \quad (9)$$

The AFT matrix A has dimensions of N×F and rank N. The AFT matrix A for N=5 is:

A is sparse and its nonzero coefficients are all proper fractions with numerator 1 and denominators which are all integer numbers.

If N>2, then F>N and the augmented matrix (A:x) has the rank N. There is then an infinite, number of solutions of X in (9) for a given x. The Fourier transform vector $\underline{X}$ of equation (3) and the minimum norm vector are two special solutions of (9). The minimum norm vector is defined as:

$$X^* = A^T(AA^T)^{-1}\underline{x} \quad (11)$$

The minimum norm solution, in general, is not equal to the Fourier transform solution.

The steepest descent algorithm has been widely used for solving least squares problems in adaptive signal processing. It can also be used for solving our minimum norm problem for $\underline{X}^*$ if we properly choose the initial vector $\underline{X}_o$. Then the minimum norm solution $\underline{X}^*$ can be used to determine the Fourier transform vector $\underline{X}$. Let $\underline{X}_k$ by the $K^{th}$ approximation to $\underline{X}^*$ and the synthesized signal $x_k = A\underline{X}_k$, then the approximation error vector is given by:

$$e_k = x - x_k = x - AX_k. \quad (12)$$

The squared norm of the error vector is:

$$E_k = e_k^T e_k. \quad (13)$$

Updating the vector of frequency domain samples by the steepest descent method:

$$X_{k+1} = X_k - \alpha \nabla E_k, \quad (14)$$

where α is the step factor of the updating and $$\nabla E_k = -2Aphu\ T(x - AX_k) \quad (15)$$

is the gradient of $E_k$. Equation (15) can be substituted into (14) to give the following two additional forms of the updating procedures:

$$X_{k+1} = (I - 2\alpha A^T A)X_k + 2\alpha A^A X. \quad (16)$$

and $$X_{k+1} = X_k + 2\alpha A^T(x - AX_k) = X_k + 2\alpha A^T e_k \quad (17)$$

Letting the $b_k$ represent the $k^{th}$ row of the matrix $A^T$, the iterative arithmetic Fourier transform is realized using the apparatus shown in block diagram form in FIG. 1.

Hereinafter, it will be shown that starting with a properly chosen initial vector $\underline{X}_o$, the iterative updating process defined by (14) or (16) will converge and give $$A = \begin{bmatrix} -\frac{1}{30} & -\frac{1}{5} & 0 & -\frac{1}{3} & -\frac{1}{5} & -\frac{1}{2} & -\frac{1}{5} & -\frac{1}{3} & 0 & -\frac{1}{5} \\ \frac{1}{4} & 0 & -\frac{1}{4} & 0 & 0 & \frac{1}{4} & 0 & 0 & -\frac{1}{4} & 0 \\ \frac{1}{3} & 0 & 0 & \frac{1}{3} & 0 & 0 & 0 & \frac{1}{3} & 0 & 0 \\ \frac{1}{4} & 0 & \frac{1}{4} & 0 & 0 & \frac{1}{4} & 0 & 0 & \frac{1}{4} & 0 \\ \frac{1}{5} & \frac{1}{5} & 0 & 0 & \frac{1}{5} & 0 & \frac{1}{5} & 0 & 0 & \frac{1}{5} \end{bmatrix}$$

the minimum norm solution $\underline{X}^*$. Then the minimum norm solution $\underline{X}^*$ can be used to determine the Fourier transform vector $\underline{X}$.

Convergence to the Minimum—Norm Solution

Starting with an initial vector $\underline{X}_o$, formula (16) may be used to write the $k^{th}$ approximation $\underline{X}_k$ in the following way:

$$X_k = (I - 2\alpha A^T A)^k X_o + 2\alpha \sum_{i=0}^{k-1} (I - 2\alpha A^T A)^i A^T x. \quad (18)$$

In this case, if $N>2$, $A^T A$, which has F rows and F columns, is only positive semidefinite. The matrix A has rank N and $N<F$. Using the singular value decomposition (SVD), A can be written as:

$$A_{N \times F} = U_{N \times N} \Sigma_{N \times F} V^T_{F \times F} \quad (19)$$

where U and V are ($N \times N$) and ($F \times F$) orthogonal matrices, respectively, $\Sigma$ is an ($N \times F$) pseudo-diagonal matrix which has the form:

$$\Sigma = [\Sigma_{N \times N} : O_{N \times (F-n)}] \quad (20)$$

The square ($N \times N$) matrix $\Sigma$ is a diagonal matrix composed of the non-zero singular values $\sigma_i$, $i=1, 2, \ldots, N$, of the matrix A and O is an ($N \times (F-N)$) zero matrix. The matrix $(I - 2\alpha A^T A)^i$ is therefore $$(I - 2\alpha A^T A)^i = V \begin{bmatrix} D^i & O \\ O & I \end{bmatrix} V^T, \quad (21)$$

where the ($N \times N$) matrix D has the form $$D = \begin{bmatrix} 1 - 2\alpha \sigma_1^2 & 0 & \ldots & 0 & 0 \\ 0 & 1 - 2\alpha \sigma_2^2 & \ldots & 0 & 0 \\ \cdot & \cdot & \ldots & \cdot & \cdot \\ \cdot & \cdot & \ldots & \cdot & \cdot \\ \cdot & \cdot & \ldots & \cdot & \cdot \\ 0 & 0 & \ldots & 0 & 1 - 2\alpha\sigma_N^2 \end{bmatrix} \quad (22)$$

$O_{N \times (F-N)}$ and $O_{(F-N) \times N}$ are zero matrices, and $I_{(F-N) \times (F-N)}$ is an $(F-N) \times (F-N)$ identity matrix. Because, of $\bar{I}$, the first term in (18) will not converge to the zero vector for any $\alpha$. However, if the initial vector $\underline{X}_o$ is chosen to be the zero vector, $\underline{O}$, the first term will have no effect on the iterative process (18) and then it may be shown that the iterative process converges to the minimum norm solution.

Considering the matrix $(I - 2\alpha A^T A)^i A^T$ in the second term of (18), we get $$(I - 2\alpha A^T A)^i A^T = V \begin{bmatrix} \overline{D^i} & O \\ \overline{O} & I \end{bmatrix} \begin{bmatrix} \Sigma \\ O^T \end{bmatrix} U^T = V \begin{bmatrix} \overline{D^i} \\ O^T \end{bmatrix} U^T \quad (23)$$

where $\overline{D^i}$ is an ($N \times N$) diagonal matrix with the (j,j)th element being $(1 - 2\alpha\sigma_j^2)^i \sigma_j$. If we choose the step factor $\alpha$ in the range $$0 < \alpha < \frac{1}{\sigma_{max}^2} \quad (24)$$

where $\sigma_{max}^2$ is the biggest eigenvalue of $A^T A$, then $$\lim_{k \to \infty} \sum_{i=0}^{k} (1 - 2\alpha\sigma_j^2)^i \sigma_j = \frac{1}{2\alpha\sigma_j} \quad (25)$$

since this in an infinite sum of a geometric series with the ratio $r = (1 - 2\alpha\sigma_i^2)$ and $|r| < 1$. Therefore the matrix $D^i$ will approach the zero matrix and which results as:

$$2\alpha \lim_{k \to \infty} \sum_{i=0}^{k-1} \overline{D^i} = \Sigma^{-1} \quad (26)$$

and $$2\alpha \lim_{k \to \infty} \sum_{i=0}^{k-1} (I - 2\alpha A^T A)^i A^T = V \begin{bmatrix} \Sigma^{-1} \\ O^T \end{bmatrix} U^T, \quad (27)$$

Since the matrix $AA^T$ can be written as $$AA^T = U[\Sigma : O] V^T V \begin{bmatrix} \Sigma \\ O^T \end{bmatrix} U^T = U\Sigma^2 U^T, \quad (28)$$

and thus $$(AA^T)^{-1} = U(\Sigma^2)^{-1} U^T. \quad (29)$$

Therefore, the pseudoinverse matrix which provides the minimum norm solution of equation (11) is:

$$A^T(AA^T)^{-1} = V \begin{bmatrix} \Sigma^{-1} \\ O^T \end{bmatrix} U^T. \quad (30)$$

From (27) and (30) it may be seen that:

$$2\alpha \lim_{k \to \infty} \sum_{i=0}^{k-1} (I - 2\alpha A^T A)^i A^T x = A^T(AA^T)^{-1} x. \quad (32)$$

That is, the minimum norm solution can be computed iteratively.

Obtaining the Fourier Transform Solution

The different of the Fourier transform solution and the minimum norm solution is determined by:

$$X - X^* = Cx - A^T(AA^T)^{-1} x = Px, \quad (33)$$

where the matrix P is defined as:

$$P = C - A^T(AA^T)^{-1}$$

and C is given in (3). Considering the initial vector given by:

$$X_o = Px \quad (34)$$

the result is:

$$AX_o = APx = A(C - A^T(AA^T)^{-1})x. \quad (35)$$

The matrix multiplication AC is the original AFT operation and $AC = I$ and I being an $(N \times N)$ identity matrix. Thus resulting as:

$$AX_o = (AC - AA^T(AA^T)^{-1})x = (I - I)x = 0 \quad (36)$$

for any input $x$. Therefore, if started With this initial vector, the $k^{th}$ approximation in (18) will be:

$$X_k = X_o + 2\alpha \sum_{i=o}^{k-1} (I - 2\alpha A^T A)^i A^T x = \quad (37)$$

$$Px + 2\alpha \sum_{i=o}^{k-1} (I - 2\alpha A^T A)^i A^T x$$

and we have $$\lim_{k \to \infty} X_k = X_o + 2\alpha \lim_{k \to \infty} \sum_{i=o}^{k-1} (I - 2\alpha A^T A)^i A^T x = Cx. \quad (38)$$

Therefore, the convergence of the iteration process (18) will not be affected by this properly chosen initial vector, and the final result is the Fourier transform vector X. In fact, from (36) above, $\underline{X}_o$ cannot pass the AFT filter and may be computed independently in parallel with the iterative process.

Thus, the steps of the iterative Arithmetic Fourier transform method are as follows:

1. Specify the maximum tolerance in the squared norm $E_m$ of the error vector $\underline{e}_k$ of a specify a maximum number of iterations;
2. Calculate the initial frequency domain vector $\underline{X}_o = P\underline{x}$ where $\underline{x}$ is the signal vector in (4);
3. Synthesize the time domain signal vector $\underline{x}_k = A\underline{X}_k$ using the AFT filter;
4. Calculate the error signal vector $\underline{e}_k = \underline{x} - \underline{x}_k$ and squared norm $E_k$;
5. Update the frequency domain vector $/ _{k+1} = / _k + 2\alpha A^T \underline{e}_k$;
6. Repeat steps 3-5 by incrementing the iterate index k until a satisfactory convergence ($E_k \leq E_m$) has been achieved or the maximum number of iterations have been completed.

Alternatively, the iterations can be started with the zero vector in step 2. It has been shown above that the solution component $P\underline{x}$ is orthogonal to the row subspace of A. It can be computed in parallel with the iterative computation of the minimum-norm solution (equation (11)) of the AFT equations (equation (9)). The contribution $P\underline{x}$ to the solution can then be added at any convenient time.

Since the computation of $\underline{x}_k = A\underline{z}_k$ in this method can be easily realized by the forward AFT and only needs multiplications by 0, +1, −1 and a small number of scalings, most multiplications required in this iterative method arise from the computations of $A^T\underline{e}_k$ and $P\underline{x}$. In this next section, it will be shown that, based on the properties of the AFT matrix A and the difference matrix P, the computations of $A^T\underline{e}_k$ and $P\underline{x}$ can be implemented with only few multiplications by using a permuted difference coefficient (PDC) structure.

Figure 1A:
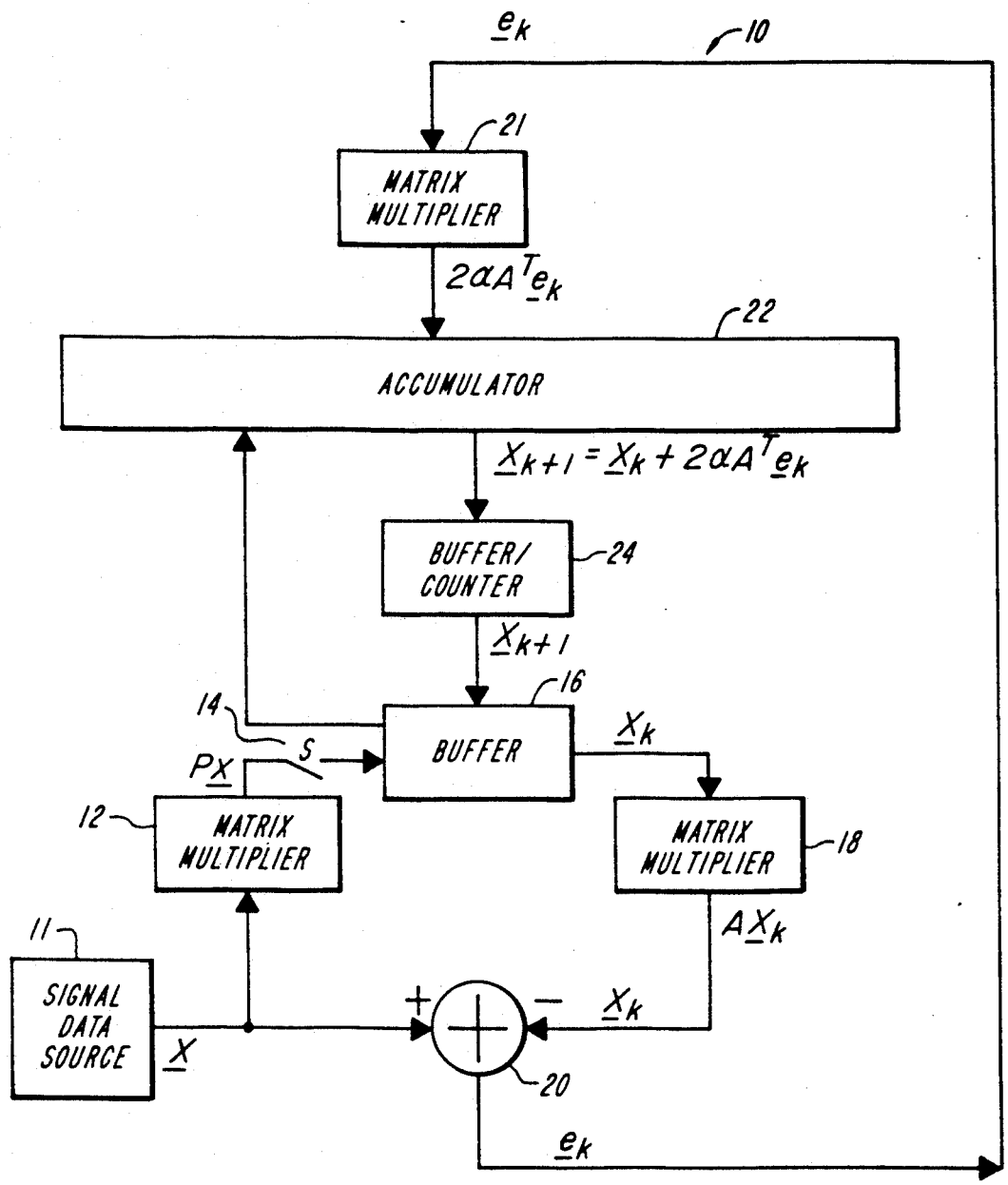
FIGS. 1A and 1B show signal processing apparatus used for realizing the iterative AFT.

With reference now to FIG. 1A, an embodiment of a signal processing apparatus 10 used for realizing the iterative AFT is illustrated. The signal vector $\underline{x}$ is produced from a signal data source 10 and provided to both a matrix multiplier 12 and an adder/subtractor 20. A buffer 16 may be either initialized to a zero signal vector or provided with an initial frequency domain signal vector $\underline{X}$ calculated in the multiplier 12 by closing a switch 14 at the start of the process.

The initial frequency domain signal vector is calculated in the multiplier 12 by multiplying the signal vector by a predetermined transform matrix P.

The frequency domain signal vector held in the buffer 16 is then fed to a matrix multiplier 18. The matrix multiplier 18 in effect performs an inverse transformation on the frequency domain signal vector to form an approximation of the signal vector $\underline{X}$ by multiplying the frequency domain signal vector by a predetermined AFT matrix. The signal vector approximation is thereafter subtracted from the signal vector $\underline{X}$ by the adder/subtractor 20 to form an error signal vector.

The error signal vector is then fed to a matrix multiplier 21 where it is multiplied by the transpose matrix of the predetermined AFT matrix used in the multiplier 18, and by a predetermined scaling factor. The product calculated in the multiplier 21 is thereafter used by an accumulator 22 which adds the product to the frequency domain signal vector presently held in the buffer 16 in order to provide an updated frequency domain signal vector to a buffer/counter 24.

The updated frequency domain signal vector held in buffer/counter 24 is then restored in buffer 16 so that the signal processing apparatus 10 may iteratively compute updated values for the frequency domain signal vector for a predetermined number of computations or until a satisfactory approximation of the frequency domain signal vector is achieved. The frequency domain signal vector provided by multiplier 12 may be added at the end of the computations of apparatus 10 or at any one intermediate iteration by closing the switch 14 in cases where the buffer 16 is initialized to the zero signal vector. Therefore, the resulting output signals represent the values of a Fourier series associated with the input signal, which in turn represents Fourier coefficients that vary in relation to time, space, or other independent variables.

Figure 1B:
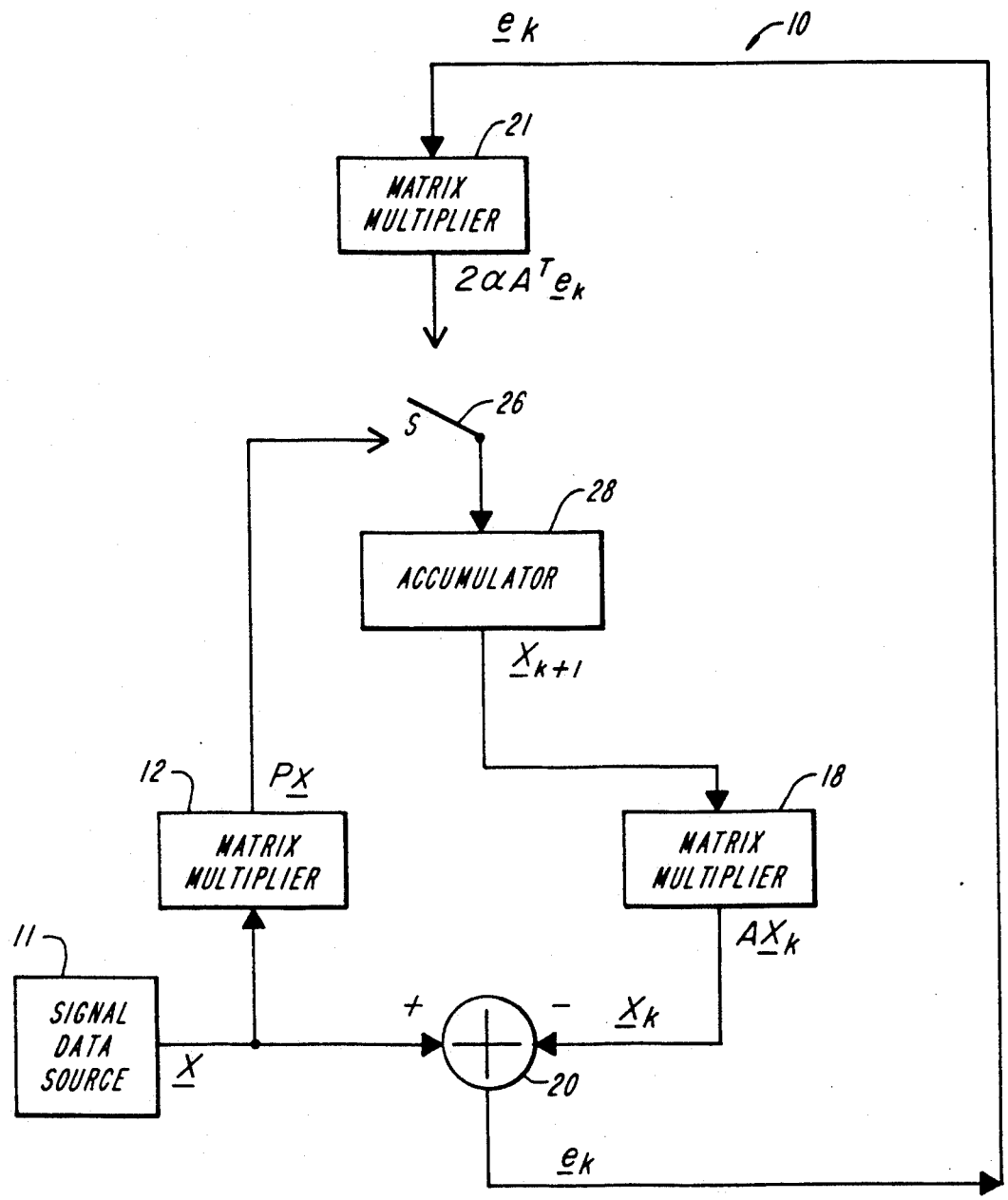
Figure 2A:
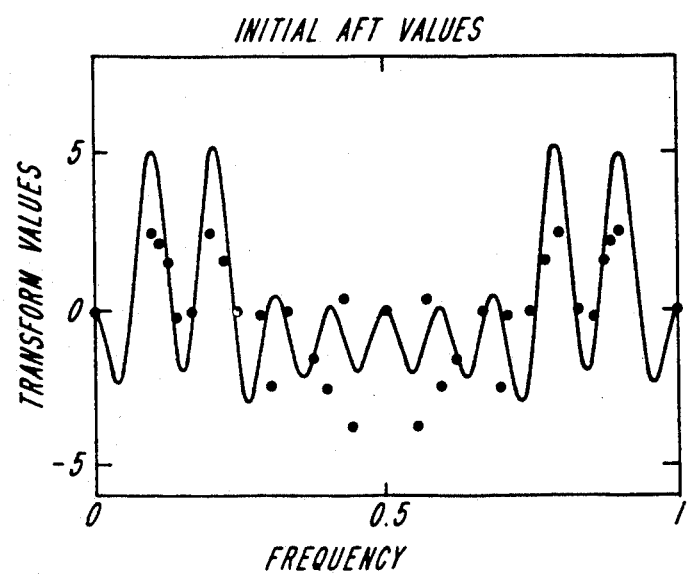
FIG. 2 shows the spectrums from the iterative AFT and the spectrum from the DFT at the Farey-fraction values $$\frac{k}{m};$$
Figure 2B:
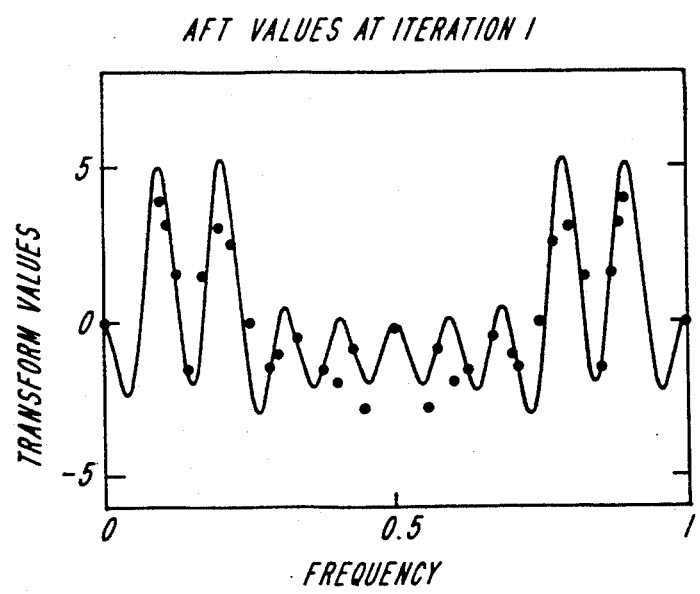
Figure 2C:
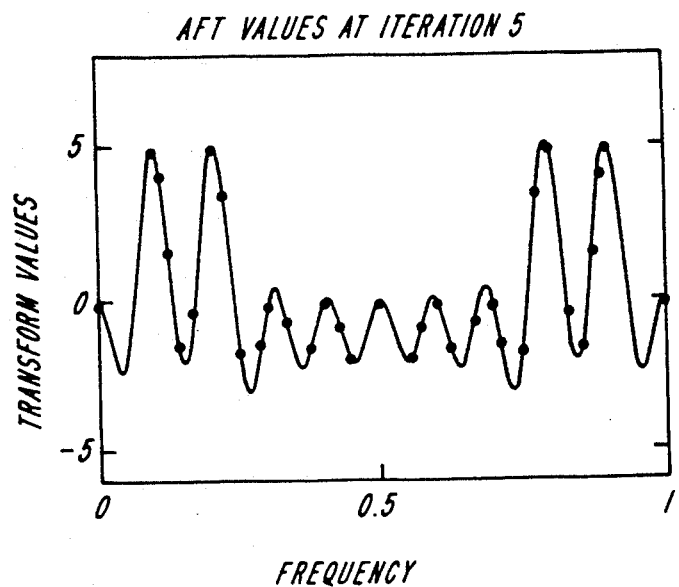
Figure 2D:
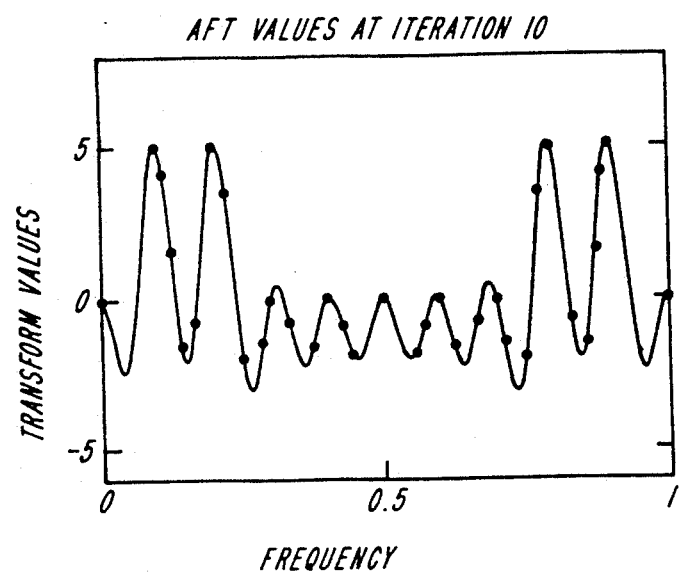

FIG. 1B shows an alternate embodiment of the signal processing apparatus 10 illustrated in FIG. 1A. The alternate embodiment of apparatus 10 involves the condensing of the accumulator 22, the buffer/counter 24, and the buffer 16 into a single accumulator 28. The accumulator 28 would operate to hold either the zero signal vector or the initial frequency domain signal vector at the start of the process. Thereafter, the accumulator 28 may operate to calculate the updated frequency domain signal vector by adding the product calculated in the multiplier 21 to the value presently held in the accumulator 28. In addition, a switch 26 may be provided in order to allow the approximation of the frequency domain signal vector calculated in the multiplier 12 to be added to the accumulator 28 at the start of the calculation process, at any one intermediate iteration, or following the last iteration.

It will be appreciated by those skilled in the art that the illustrated embodiments describe the conversion of an input signal into frequency domain vectors, these converted signal vectors may also be in the domain of other independent variables.

As an example of the iterative AFT, the spectrum of a signal $x[n] = \cos(2\pi f_1 n) + \cos(2\pi f_2 n)$ with $n = 1, 2, \ldots, 10$ and $F_1 = 0.1$, $f_2 = 0.2$ may be calculated. There are 33 elements in the corresponding vector $\underline{X}_k$ of Farey-fraction frequency domain samples. The spectrums from the iterative AFT and the spectrum from the DFT at the Farey-fraction values $$\frac{k}{m}$$

are shown in FIG. 2. The term f"spectrum" means the values of the elements of a frequency domain vector, such as $\underline{X}_k$ or $\underline{X}$. In FIG. 2, the solid line represents the values of the continuous function X(f) defined by:

$$X(f) = \sum_{n=1}^{N} x[n]\cos(2\pi \cdot n \cdot f) \qquad (38)$$

Figure 3A:
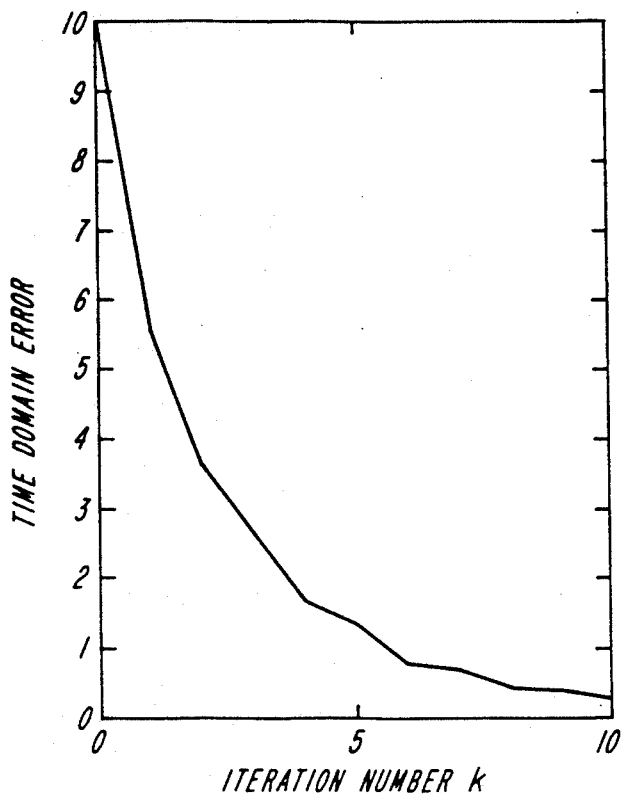
FIG. 3 shows plots of the squared time domain error norm and the squared frequency domain error norm.
Figure 3B:
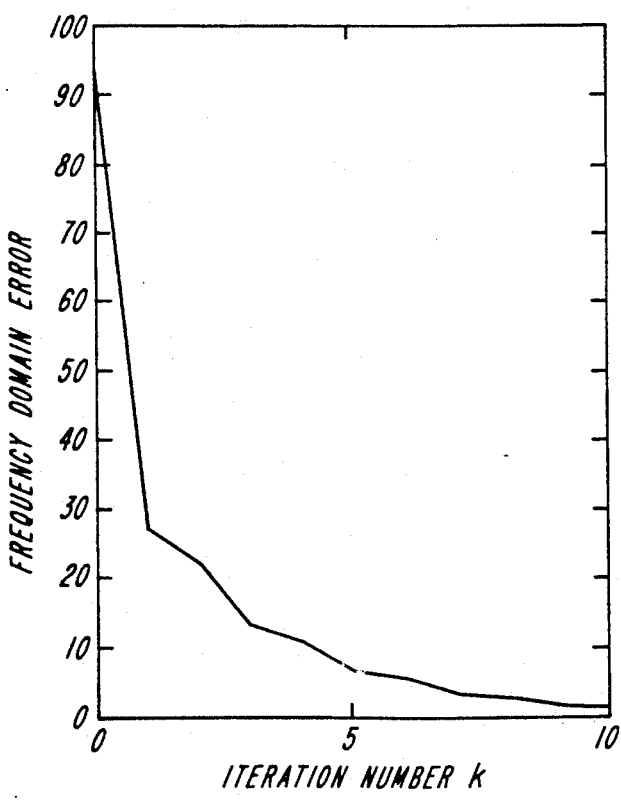

The squared time domain error norm $E_k$ and the squared frequency domain error norm $E_f(k)$ are plotted in FIG. 3 as functions of the iteration number k, where the squared frequency domain error norm is defined by:

$$E_f(k) = \sum_{j,m}\left[X\left(\frac{j}{m}\right) - X_k\left(\frac{j}{m}\right)\right]^2 \qquad (39)$$

for j=0, 1, ..., m; m=1, 2, ..., N. The values of the squared norms in the time and frequency domains, equations (13) and (39), respectively, are different, even at the same iteration, because of the Farey-fraction sampling in the frequency domain. The initial AFT spectrum is determined by $\underline{X}_o = P\underline{x}$. From FIG. 2 and FIG. 3, we can see that after several iterations, the iterative AFT quickly reduces the squared error norms and the resulting spectrums converge to the DFT spectrum.

Since the computation of $\underline{x}_k = A\underline{z}_k$ in this method can be easily realized by the forward AFT and only needs multiplications by 0, +1, −1 and a small number of scalings, the most multiplication computation required in this iterative method is the determination of $A^T\underline{e}_k$ and $P\underline{x}$. In the next section, it will be shown that, based on the properties of the AFT matrix A and the difference matrix P, the computation of $A^T\underline{e}_k$ and $P\underline{x}$ can be implemented with only few multiplications by using a permuted difference coefficient (PDC) structure.

The computation of the iterative AFT is based on successive approximation, it is clear that the accuracy and the computational complexity of the algorithm depend on the iteration number k. In table of FIG. 4, the number of Farey-fraction frequency-domain values $N_f$ is provided as a function of N, the number of elements in the time-domain vextor $\underline{x}$ for N=10 to N=30. Also tabulated are the corresponding values of $N_m$, $N_p$ and $N_c$. These are each the number of different values of multiplication coefficients required for direct matrix-vector product implementation of the computations of the minimum-norm solution $M\underline{x}$ of (11), the additional solution component $P\underline{x}$ of formula (32), and the direct DFT computation $C\underline{x}$ of formula (3), respectively. Since $N_f$ increased with N at a rate about $N^2/3$, the numbers of multiplications required in direct implementation without iteration also increase very fast with the number of elements, N, of the time-domain data vector.

The use of the iterative approach to computer $M\underline{x}$ reduce the number of multiplications related to $N_m$ in the table of FIG. 4. In each iteration we need (N−1) scalings by integer numbers in the computation of $A\underline{X}_k$ and about N multiplications in the computation $A^T\underline{e}_k$. Therefore, in k iterations, about $2 \cdot k \cdot N$ multiplications are required. Since $N_m$ varies with N at a rate of about $N^2$, if the iteration number k is less than N/2, then $2 \cdot k \cdot N < N^2$ and the iterative approach requires fewer multiplications than the direct method in the computation of $M\underline{x}$, in general. Some values of multiplications required in the direct computation $C\underline{x}$ and the iterative computation for k=5 and k=10 iterations are shown in the table of FIG. 5, where $N_i(k)$ is the number required by the iterative AFT for k iterations. It can be seen that fewer multiplications are required in the iterative AFT. Still further reduction is possible by only computing the solution component $P\underline{x}$. This will be discussed below.

Theoretically, an infinite number of iterations is required to achieve the minimum time-domain error which is zero. However, in the practice of VLSI implementation of this iterative algorithm, the accuracy of the computation is limited by the input A/D conversion process, the finite word length of the internal accumulation registers, and the implementation of the scaling operations and the PDC operations. Because of this, the minimum time-domain error norm cannot be reduced to zero value. Since the convergence rate of this iterative algorithm is exponential, only several iterations are necessary to reach the minimum error norm and to obtain the final result of dense frequency-domain samples. Thus, the results in the tables of FIGS. 4 and 5 show that for realistic ranges of the required number of iterations, the iterative AFT requires a smaller number of multiplications.

Figure 6:
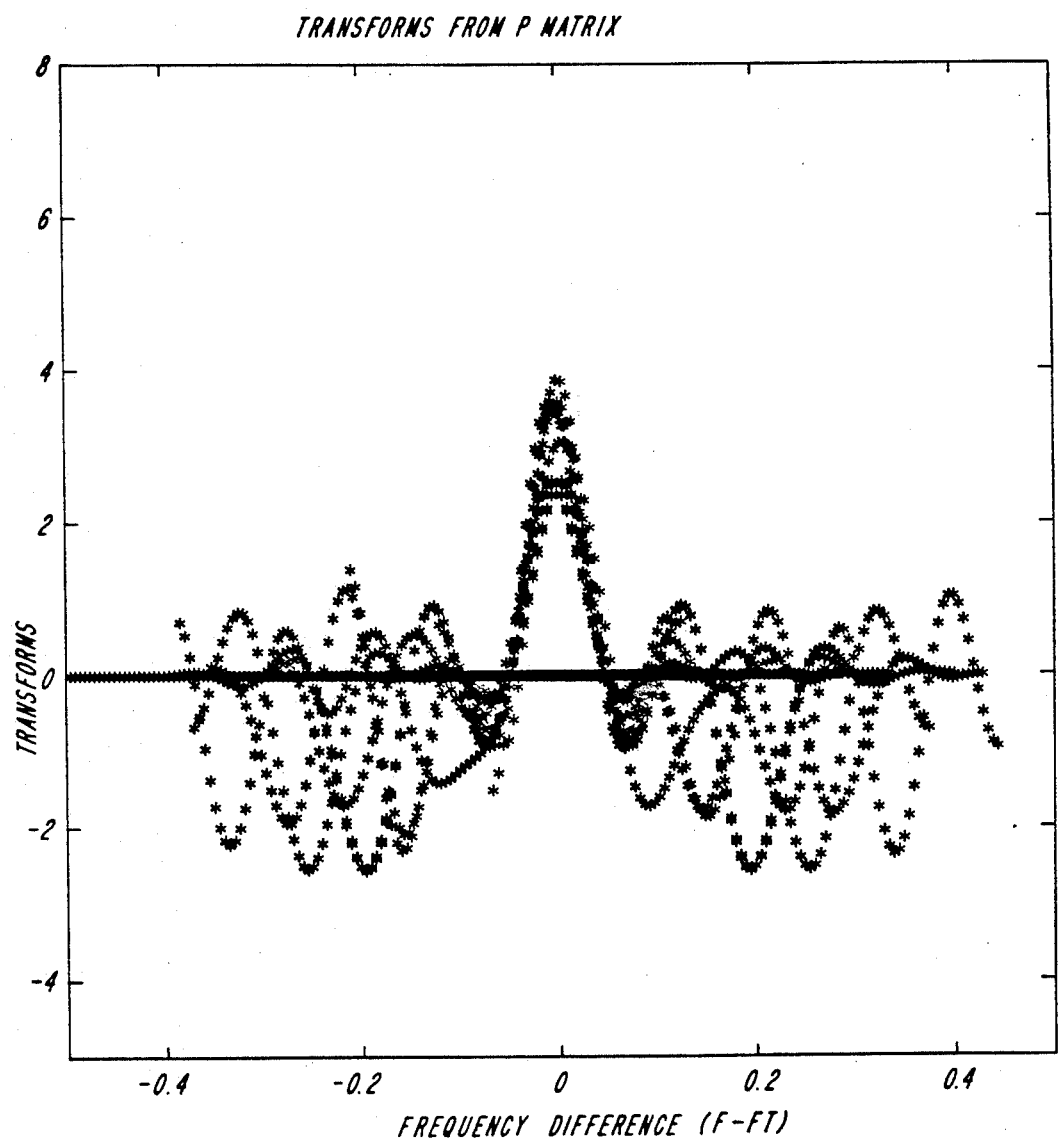
FIG. 6 shows a plot of the values of the transform-domain vector $\underline{X}_o$.

The matrix P resulting from the difference of (C−M) provides good transform-domain vector $\underline{X}_o = P\underline{x}$ by itself without adding the minimum-norm solution $M\underline{x}$. In FIG. 6, the values of the transform-domain vector $\underline{X}_o$ for the case N=10 are plotted on top each other for individual time-domain signals x[n] =cos($2\pi \cdot n \cdot$ft). The test frequency ft takes 100 different values and these values are equally spaced in the frequency range [0,0.5]. The values of the transform-domain vectors $\underline{X}_o = P\underline{x}$ are plotted versus the difference frequency (f-ft) and superposed. The matrix filtering operation $P\underline{x}$ thus provides a good set of closely spaced, overlapping, narrow bandfilters by itself without adding the minimum-norm contribution $M\underline{x}$. This is not surprising because the minimum-norm frequency-domain solution $M\underline{x}$ will suppress spectral peaks because of its minimum-norm property. For many applications, such as initial spectrum estimation prior to parametric modeling, the initial computation using the P matrix alone provides sufficient accuracy.

The matrix P is also suitable for implementation with the permuted difference coefficient structure. The number of multiplications in P can be more effectively reduced than the matrix C. As a result, the total number of multiplications in the iterative approach will be less than the number of multiplications in the direct implementation of $C\underline{x}$ when the condition k<N/2 is satisfied, in general. The decomposition of the computation $C\underline{x}$ to the computations of $P\underline{x}$ and $M\underline{x}$ and the property of $A\underline{x}_o$ discussed above also allows the parallel computation of $P\underline{x}$ and $M\underline{x}$, which could provide further time saving from the direct computation of $C\underline{x}$. The computational saving from this can be seen by comparing the last two rows in the table of FIG. 4 for the direct multiplication approach without use of the PDC implementation.

The Permuted Difference Coefficient Structure

Let the AFT matrix A be $$A = \begin{bmatrix} a_{11} & a_{12} & \cdots & a_{1F} \\ a_{21} & a_{22} & \cdots & a_{2F} \\ \cdot & \cdot & \cdots & \cdot \\ \cdot & \cdot & \cdots & \cdot \\ \cdot & \cdot & \cdots & \cdot \\ a_{N1} & a_{N2} & \cdots & a_{NF} \end{bmatrix} \quad (40)$$

and thus $A^T$ is $$A^T = \begin{bmatrix} a_{11} & a_{21} & \cdots & a_{N1} \\ a_{12} & a_{22} & \cdots & a_{N2} \\ \cdot & \cdot & \cdots & \cdot \\ \cdot & \cdot & \cdots & \cdot \\ \cdot & \cdot & \cdots & \cdot \\ a_{1F} & a_{2F} & \cdots & a_{NF} \end{bmatrix} = \begin{bmatrix} \underline{b}_1 \\ \underline{b}_2 \\ \cdot \\ \cdot \\ \cdot \\ \underline{b}_F \end{bmatrix}, \quad (41)$$

where $\underline{b}_k$ is the $k^{th}$ row vector of matrix $A^T$. Let the error vector at iteration k be:

$$\underline{e}_k = [e_k(1)\ e_k(2) \ldots e_k(N)]^T, \quad (42)$$

then $2\alpha A^T \underline{e}_k$ can be written as:

$$2\alpha A^T \underline{e}_k = 2\alpha \begin{bmatrix} \underline{b}_1 \underline{e}_k \\ \underline{b}_2 \underline{e}_k \\ \cdot \\ \cdot \\ \cdot \\ \underline{b}_F \underline{e}_k \end{bmatrix} \quad (43)$$

Thus, computation of $A^T \underline{e}_k$ can be thought as a multiple channel FIR filtering operation and the output of the $j^{th}$ channel at time k is given by:

$$T_j = 2\alpha \sum_{i=1}^{N} a_{ij} e_k(i) \quad i \leq j \leq F. \quad (44)$$

Direct computation of (44) requires on the order of N+1 multiplications and N additions. In VLSI, the multipliers are relatively area intensive and time consuming. In the FIR digital filter realization, many techniques have been used to implement multiplying operations, such as the power-of-two coefficient approximation method, the summation by parts method and the permuted difference coefficient method.

In the permuted difference coefficient method, the new filter coefficients are obtained by successively differencing the coefficients of the previous lower difference consider the computation:

$$T = 2\alpha \sum_{i=1}^{N} a_i e(i). \quad (45)$$

The absolute values of the filter coefficients $a_i$'s are reordered in a sequence $a_k^*$ with increasing magnitude as $$0 \leq a^*_1 \leq a^*_2 \ldots a^*_N, \text{ with } a^*_k = |a_i| \quad (46)$$

For example, $a^*_1 = \min_i |a_i|$ and $a^*_N = \max_i |a_i|$. Then the equation (45) can be rewritten as $$T = 2\alpha \sum_{k=1}^{N} a_k^* e^*(k) \quad (47)$$

where $$e^*(k) = \text{sign}(a_i) \cdot e(i). \quad (48)$$

The first-order permuted difference coefficients $\Delta_k^{(1)}$ are defined by:

$$\Delta_k^{(1)} = a_k^* - a_{k-1}^*, \ k = 2, 3, \ldots, N \quad (49)$$

Using the difference coefficients $\Delta_k^{(1)}$, T in (45) and (47) can be expressed as:

$$T = 2\alpha \sum_{k=1}^{N} \Delta_k^{(1)} S_k^{(1)} \quad (50)$$

where the partial sum $S_k^{(1)}$ is defined as $$S_k^{(1)} = \sum_{i=k}^{N} e^*(i) \quad (51)$$

and can be calculated by the accumulation $$S_k^{(1)} = S_{k+1}^{(1)} + e^*(k), \ K = 1, 2, \ldots, N-1; \quad (52)$$

$$S_N^{(1)} = e^*(N).$$

Repeating this difference and permuting process on $\Delta_k^{(1)}$ and $S_k^{(1)}$, the second-order and higher order permuted difference coefficients can be obtained. If, after several repetitions of this process, many of the resulting coefficients can become zero, the number of multiplications will be effectively reduced.

$$A^T = \begin{bmatrix} -\frac{1}{30} & \frac{1}{4} & \frac{1}{3} & \frac{1}{4} & \frac{1}{5} \\ -\frac{1}{5} & 0 & 0 & 0 & \frac{1}{5} \\ 0 & \frac{1}{4} & 0 & \frac{1}{4} & 0 \\ -\frac{1}{3} & 0 & \frac{1}{3} & 0 & 0 \\ -\frac{1}{5} & 0 & 0 & 0 & \frac{1}{5} \\ -\frac{1}{2} & \frac{1}{4} & 0 & \frac{1}{4} & 0 \\ -\frac{1}{5} & 0 & 0 & 0 & \frac{1}{5} \\ -\frac{1}{3} & 0 & \frac{1}{3} & 0 & 0 \\ 0 & -\frac{1}{4} & 0 & \frac{1}{4} & 0 \\ -\frac{1}{5} & 0 & 0 & 0 & \frac{1}{5} \end{bmatrix} = \begin{bmatrix} \underline{b}_1 \\ \underline{b}_2 \\ \underline{b}_3 \\ \underline{b}_4 \\ \underline{b}_5 \\ \underline{b}_6 \\ \underline{b}_7 \\ \underline{b}_8 \\ \underline{b}_9 \\ \underline{b}_{10} \end{bmatrix} \quad (53)$$

For example, the matrix $A^T$ for N=5 is shown in (53). It has 10 channels. Only 5(=N) of these are independent or different (e.g. $\underline{b}_1, \underline{b}_2, \underline{b}_3, \underline{b}_4, \underline{b}_6$). Other channels have the same coefficients as one of these independent channels (e.g. $\underline{b}_1, \underline{b}_5, \underline{b}_7, \underline{b}_{10}$) This property of the AFT matrix can be utilized to further simplify the computation. Only the outputs of the independent channels need to be computed.

Figure 8:
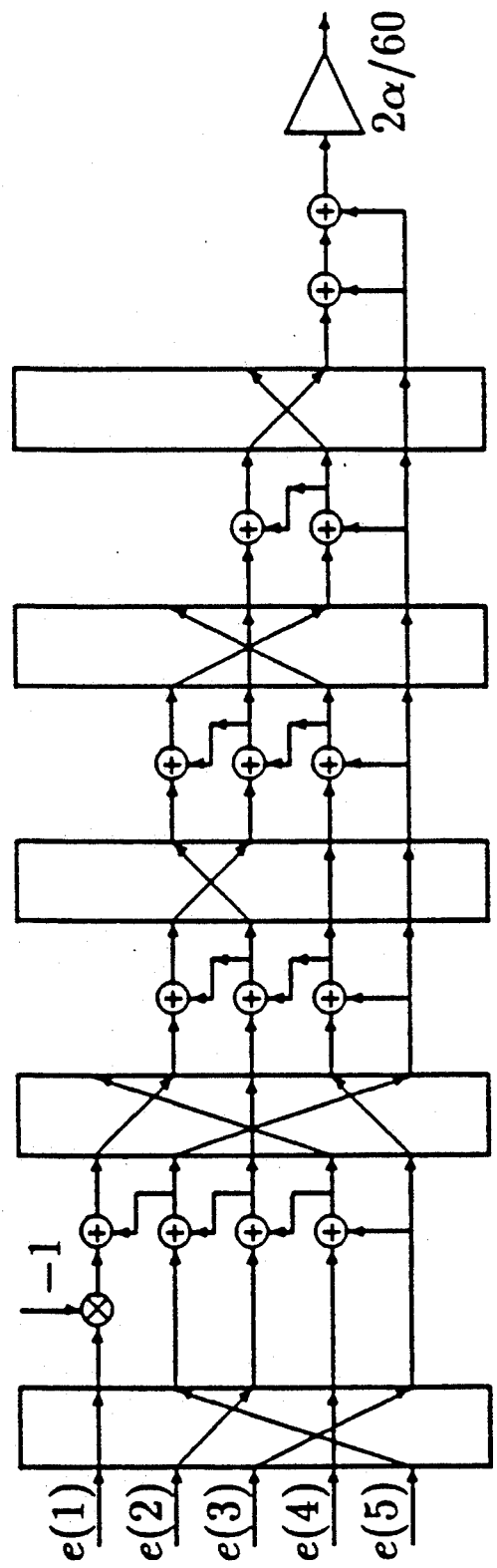
FIG. 8 shows a resulting permuted difference coefficient structure.

The differencing and permuting process of the elements of the first channel $$b_1 = \begin{bmatrix} -\frac{1}{30} & \frac{1}{4} & \frac{1}{3} & \frac{1}{4} & \frac{1}{5} \end{bmatrix}$$

is shown in the table of FIG. 7. Starting from the original 5 coefficients, after 4 steps of differencing and permuting, the number of non-zero coefficients is reduced to 2. After 5 steps, only one multiplying coefficient is needed. The resulting permuted difference coefficient structure for the first channel is shown in FIG. 8.

The sixth channel needs only two steps of coefficient permuting and differencing to reduce the number of multiplication to one. The remaining channels need only one multiplication and sign change operation.

From equation (35), we see that the difference matrix P for computing the initial vector has the property AP=O with O being an N×N matrix of all zero elements. Many elements of the matrix P have the same absolute values. Also, among the elements with different values, many of their differences have the same absolute values. These properties of P are very suitable for the PDC structure. Furthermore, many rows of P are the same except the different sign. Therefore, the computation of the initial vector can be realized with only a few multiplications. A simple example of the matrix P for N=5 is shown in (54), which can be realized with only one multiplication by a coefficient 0.559 with the PDC structure.

$$P = \begin{bmatrix} 0.000 & 0.000 & 0.000 & 0.000 & 0.000 \\ 0.559 & -0.559 & -0.559 & 0.559 & 0.000 \\ 0.000 & 0.000 & 0.000 & 0.000 & 0.000 \\ 0.000 & 0.000 & 0.000 & 0.000 & 0.000 \\ -0.559 & 0.559 & 0.559 & -0.559 & 0.000 \\ 0.000 & 0.000 & 0.000 & 0.000 & 0.000 \\ -0.559 & 0.559 & 0.559 & -0.559 & 0.000 \\ 0.000 & 0.000 & 0.000 & 0.000 & 0.000 \\ 0.000 & 0.000 & 0.000 & 0.000 & 0.000 \\ 0.559 & -0.559 & -0.559 & 0.559 & 0.000 \end{bmatrix} \quad (54)$$

A VLSI implementation of the PDC algorithm can be easily realized using a random access memory (RAM) together with a read only memory (ROM) where the subsequent reordered coefficient addresses are stored. The sign changing operation needs an EX-OR gate only. Since the AFT matrix A and the difference matrix P are sparse and have nice properties for the effective reduction of the number of multiplications by using the permuted difference coefficient structure, the implementation complexity of this iterative AFT is on the same order as that of the AFT. Only a small number of scalings are required. By properly choosing the step size α of updating, these scaling factors can be realized by power-of-two coefficients and., therefore, only bit-shift operations and summations are necessary.

Applications

Applications of the iterative AFT in signal reconstruction, two dimensional maximum entropy spectral estimation, and recursive digital filter design will be described hereinafter.

In many disciplines, including astronomy, X-ray crystallography and remote sensing, one often needs to reconstruct an object function f(x) from the modulus $|F(u)|$ of its Fourier transform $$F(u) = |F(u)| \exp(i\phi(u)) = F[f(x)] \quad (55)$$

where F denotes Fourier transform. Variables x and u may be one dimensional or two dimensional coordinates. Reconstruction of the object function f(x) from $|F(u)|$ is equivalent to reconstruction of the Fourier phase $\phi(u)$ from $|F(u)|$, Many iterative Fourier transform calculations have been proposed for this phase retrieval problem because they have wide applicability and low sensitivity to noise. All these processes involve the Fourier transformation back and forth between the Fourier domain and the object domain, starting with an initial random data array on the known support for the object function. The support and some other constraints on the object function f(x) and the known Fourier modulus data $|F(u)|$ are used in each iteration to successively reconstruct the object function f(x). Typically, hundreds of iterations are required. The computation load involved in the Fourier transform and inverse Fourier transform is rather heavy.

The iterative AFT can be naturally introduced for these signal reconstruction algorithms. The iterative AFT needs only a small number of multiplications in each iteration and its arithmetic computations are performed in parallel, and furthermore, from the dense frequency domain samples at Farey-fraction values, the inverse Fourier transform can be implemented very efficiently using the original AFT to obtain the time domain samples. Therefore, the use of the iterative AFT with the original AFT will effectively reduce the computation load. The adaptation of the iterative AFT could also be included into the iterative process of signal reconstruction to further reduce the computation without loss of accuracy.

Another application of the iterative AFT could be in the two dimensional maximum entropy power spectral estimation (2-D ME PSE). The problem is to determine the power spectrum $P(\omega_1, \omega_2)$ such that $P(\omega_1,\omega_2)$ is in the form $$P(\omega^1,\omega^2) = \frac{1}{\Sigma\Sigma_{(n1,n2)\in S}\lambda(n1,n2)e^{-j\omega 1 n1}e^{-j\omega 2 n2}} \quad (56)$$

and $$F^{-1}[P(\omega_1,\omega_2)] = r(n_1,n_2) = r(n_1,n_2) \text{ for } (n_1,n_2)\in S \quad (57)$$

where $r(n_1,n_2)$ is the given autocorrelation function on the support S.

The 2-D ME power spectral estimation is a highly nonlinear problem. Various attempts have been made to solve the problem. A conventional process utilizes the computational efficiency of the fast Fourier transform algorithm to iteratively compute the ME power spectral estimation. Similar in form to the iterative phase retrieval technique discussed above, this iterative algorithm starts with some initial estimate for $\lambda(n_1,n_2)$ and requires many iterations of Fourier transform and inverse Fourier transform operations to obtain the autocorrelation estimate $r(n_1, n_2)$ and the coefficient estimate $\lambda(n_1,n_2)$. Therefore, as in the phase retrieval case the iterative AFT and the AFT could be used instead of the FFT and inverse FFT (IFFT) to alleviate the computational burden.

In two dimensional digital filter design, iterative optimization procedures are used for minimizing the error functions of magnitude, phase and stability until a satisfactory convergence has been achieved. The FFT and IFFT are required several times per iteration in these algorithms. The FFT and IFFT could be replaced by the iterative AFT and the AFT to perform the Fourier transform and reduce the design time. This iterative AFT could also be used for linear uniformly spaced array signal processing to obtain the dense frequency-wavenumber estimation without interpolation or zero-padding.

Computation of Discrete Cosine Transform Using AFT

The discrete cosine transform (DCT) is an orthogonal transformation. Its basis vectors are sampled cosine functions. The one-dimensional DCT and inverse discrete cosine transform (IDCT) of an N point real sequence $x_n$ are defined by $$c_k = \frac{2}{N} e_k \sum_{n=0}^{N-1} x_n \cdot \cos\left[\frac{(2N+1)k\pi}{2N}\right], 0 \leq n \leq N-1 \quad (58)$$

$$x_n = \sum_{k=0}^{N-1} e_k \cdot c_k \cdot \cos\left[\frac{(2N+1)k\pi}{2N}\right], 0 \leq n \leq N-1 \quad (59)$$

respectively, where $$e_k = \begin{cases} \frac{1}{\sqrt{2}} & \text{if } k = 0; \\ 1 & \text{otherwise.} \end{cases}$$

Thus, unlike the discrete Fourier transform (DFT), the DCT is a real transform. The basis set of the DCT is a good approximation to the eigen vectors of the class of Toeplitz matrices. It has been shown that the DCT offers a higher effectiveness than the discrete Fourier transform (DFT) and performs very close to the statistically optimal Karhunen-Loeve transform (KLT) when used for coding signals with Markov-1 statistics. The DCT has also found applications in signal analysis and processing.

Based on the relation of the DCT with the discrete Fourier transform (DFT), the N point DCT can be computed using a 2N-point fast Fourier transform (FFT) with zero padding or mirror-image padding, or using two N-point FFTs. Algorithms based on direct sparse matrix factorization have also been proposed for the fast computation of the DCT. The computation of the DCT via other discrete transforms, such as the discrete Hartley transform (DHT) and the Walsh-Hadamard transform (WHT), has also been exploited. The simple VLSI implementation of DCT algorithms with a realistic throughput rate for real-time application is another active research field where the regularity and simplicity of the algorithms in VLSI layout is an important concern in the algorithm development.

Closely related with the DCT, the discrete-time cosine transform (DTCT) is defined by $$c(w) = \sum_{n=0}^{N-1} x_n \cos\left(\left(n + \frac{1}{2}\right)w\right).$$

We can see that except for the scaling factors, the DCT can be considered as samples of the DTCT with $$w = w_k = \frac{k}{N} \pi,$$

$k=0, 1, \ldots, N-1$. Herein is presented a process calculating values of $c(w)$ at a denser set of values $w_k$ by use of the iterative Arithmetic Fourier transform (IAFT). Since the DCT is different from the discrete Fourier transform (DFT), special considerations arise when using the AFT or the IAFT to compute the DCT. Some of these considerations are (1) dense sampling in wider time span and the special computations required in removing the DC component when using the AFT for the computation of the DCT (2) redefining the delay-line filters of the AFT for use in the DCT and the inverse DCT computations (3) avoiding the dense sampling and the special computation problems by using the modified iterative AFT algorithm. This is analogous to the use of the FFT to compute the DCT. Special considerations such as zero-padding or mirror-image padding arise there also. Using this iterative approach, the dense transform-domain samples are obtained without any additional zero-padding or interpolation. These dense samples are useful for accurate parameter estimation or determination of a few principal components. Also, the inverse DCT can be simply computed from these dense transform-domain samples by using the modified Arithmetic Fourier transform (AFT) algorithm. The most computations in this approach are naturally pipelined and can be performed in parallel. Except a small number of scalings, only multiplications by +1, −1 and 0 are required. There is no need for the storage of cosine coefficients and thus the memory addressing is simple. Therefore, the resulting structure is suitable for VLSI implementation.

Considering the continuous function:

$$x(t) = \sum_{k=0}^{N-1} e_k \cdot c_k \cdot \cos(\pi k t) = \sum_{k=0}^{N-1} e_k \cdot c_k(t) \quad (62)$$

where $$c_k(t) = c_k \cdot \cos(\pi k t) \quad (63)$$

we can see that $x(t)$ has period 2 and $x_n$ is obtained by sampling $x(t)$ at time $t=(n+\frac{1}{2})/N$ for $N.=0, \ldots, N=1$. If there is no zero-frequency (DC) component, namely, $c_o=0$, we get $$x(t) = \sum_{k=1}^{N-1} c_k \cdot \cos(\pi k t) \quad (64)$$

and $x_n$ is determined by $$x_n = \sum_{k=1}^{N-1} c_k \cdot \cos\frac{(2n+1)k\pi}{2N}. \quad (65)$$

Similar to the AFT algorithm, a set of delay-line filters may be defined as:

$$D_n(t) = \frac{1}{n} \sum_{m=0}^{n-1} x\left(t - \frac{2m}{n}\right) \text{ for } n = 1, \ldots, N-1. \quad (66)$$

Note that for the DCT the wider sampling interval $$\left[ 0, \frac{2(N-2)}{N-1} \right]$$

is required than the sampling interval $$\left[ 0, \frac{N-1}{N} \right]$$

in the original AFT and the sampling points are at the scaled Farey-fraction values. For N=5, the sampling points are the sequence of $$\left[ 0, \frac{2}{4}, \frac{2}{3}, \frac{2}{2}, \frac{4}{3}, \frac{6}{4} \right]$$

which are the fourth-order Farey fractions scaled by a factor of 2.

Substituting (63) and (66) and rearranging the orders of summations, there is obtained:

$$D_n(t) = \frac{1}{n} \sum_{m=0}^{n-1} \sum_{k=1}^{N-1} c_k \cdot \cos\left[\pi k \left(t - \frac{2m}{n}\right)\right] \quad (67)$$

$$= \sum_{k=1}^{N-1} c_k \frac{1}{n} \sum_{m=0}^{n-1} \cos\left[\pi k \left(t - \frac{2m}{n}\right)\right]$$

for n=1, ..., N−1.

The inner summation can be determined as $$\frac{1}{n} \sum_{m=0}^{n-1} \cos\left[\pi k\left(t - \frac{2m}{n}\right)\right] = \begin{cases} \cos(\pi k t), & \text{if } k = l \cdot n \text{ for some interger } l; \\ 0, & \text{if } n \nmid k, \end{cases}$$

where the symbol n ∤ k denotes that k cannot e divided by n exactly with no remainder. Then by summing up the non-zero terms of the index k=1·n and changing the index k into the index 1 in the outer summation of formula (67), the outputs of the delay-line filters of formula (66) can be expressed as $$D_n(t) = \sum_{l=1}^{\lfloor (N-1)/n \rfloor} c_{l \cdot n} \cdot \cos(\pi l \cdot nt) = \sum_{l=1}^{\lfloor (N-1)/n \rfloor} c_{l \cdot n}(t), \quad (69)$$

for $n = 1, \ldots, N-1$;

where $\lfloor (N-1)/n \rfloor$ denotes the largest integer which is less than or equal to (N−1)/n. Applying the Mobius inversion formula to the outputs of the delay-line filters (69), the result is:

$$c_k(t) = \sum_{l=1}^{\lfloor (N-1)/n \rfloor} \mu(n) D_{n \cdot k}(t), \text{ for } k = 1, \ldots, N-1, \quad (70)$$

where μ(n) is the Mobius function which takes only values of +1, 0 and −1. Finally, by sampling ck(t) at t=0, the formula for the discrete cosine transform using the AFT is obtained as:

$$c_k = c_k(t)|_{t=0} = \sum_{n=1}^{(N-1)/k} \mu(n) D_{n \cdot k}(0), \quad (71)$$

for k = 1, 2, ..., N − 1.

This computation needs only additions except for a small amount of multiplications by prescribed scale factors $$\frac{1}{n}$$

for n=1, ..., N−1 in the delay-line filters (66). For computing $D_n(t)$ for n=1, ..., N−1 using (66), (N−1)(N−2)/2 additions and N−1 multiplications are needed. For computing $c_k$ using (71), we need about (N−1)log$_2$(N−1) additions. If the zero-mean (DC) component is to be removed, additional 2N additions and one multiplication are required. So the total number of additions (NOA) and number of multiplications (NOM) in this AFT-based algorithm are NOA=(N−1)(N−2)/2+2N+(N−1)log$_2$(N−1) and NOM=N, respectively. The number of multiplications equals to the sample number of the time-domain data $x_n$. There is no need for the storage of cosine coefficients and thus it does not need complex memory addressing. Also, the high degree regularity and parallelism of the AFT make this algorithm very suitable for VLSI implementation. But from (66), for computation of the discrete cosine transform using the AFT, dense data samples of x(t) at non-equally spaced fractions $$\frac{2m}{n}$$

(n=1, ..., N−1; m=0, ..., n−1) are required. There is also a zero-mean requirement for the signal $x_n$. The disadvantage of dense sampling in order interpolation.

Computation of the inverse DCT Using the AFT

The difficulties in the previous section can be overcome by using the iterative AFT. The iterative method for calculating the forward DCT is based on iterative evaluation of the inverse DCT. In this section, details of the evaluation of the inverse DCT using the modified AFT are presented.

It will be understood from (61) that the periodic function c(w) has a period of π. Similar also to the AFT algorithm, a set of N delay-line filters is defined which span the whole period of c(w). The outputs of these filters are $$S(2m+1) = \frac{1}{2m+1} \sum_{k=0}^{2m} c\left(4\pi \frac{k}{2m+1}\right) = \quad (72)$$

$$\frac{1}{2m+1} \sum_{k=0}^{2m} c\left(\frac{k}{2m+1}\right)$$

with $$c\left(\frac{k}{2m+1}\right) = c\left(4\pi \frac{k}{2m+1}\right)$$

for m=0, 1, ..., N−1. Substituting (61) into (72) and exchanging the orders of summations:

$$S(2m+1) = \frac{1}{(2m+1)} \sum_{k=0}^{2m} \sum_{n=0}^{N-1} x_n \cdot \cos\left(n + \frac{1}{2}\right) \frac{2k\pi}{2m+1} \quad (73)$$

$$= \sum_{n=0}^{N-1} x_n \frac{1}{2m+1} \sum_{k=0}^{2m} \cos\left(\frac{2n+1}{2m+1} 2k\pi\right)$$

Since $$\frac{1}{2m+1} \sum_{k=0}^{2m} \cos\left(\frac{2n+1}{2m+1} 2k\pi\right) = \quad (74)$$

$$\begin{cases} 1, & \text{if } \frac{2n+1}{2m+1} = l, \text{ for some integer } l, \\ 0, & \text{otherwise} \end{cases}$$

then $$S(2m+1) = \sum_n x_n. \quad (75)$$

The summation above is carried out over values of n which satisfy the condition $$\frac{2n+1}{2m+1} = \text{some integer } l. \quad (76)$$

Using the Mobius inversion formula to the resulting sum $S(2m+1)$ in (75), the formula for determining the time-domain signal $x_n$ is obtained from the outputs $S(2m+1)$ of delay-line filters (20)

$$x_n = \sum_{l=0}^{\left\lfloor \frac{2N-1}{2n+1} - 1 \right\rfloor} \mu(2l+1) S((2l+1)(2n+1)), \quad (77)$$

for $n = 0, 1, \ldots, N-1$.

The sampling instants of transform-domain samples in this inverse DCT algorithm are at the Farey-fraction values which are obtained using only odd-number denominators. For example, the sequence of 13 sampling points for $N=4$ is $$0, \frac{1}{7}, \frac{1}{5}, \frac{2}{7}, \frac{1}{3}, \frac{2}{5}, \frac{3}{7}, \frac{4}{7}, \frac{3}{5}, \frac{2}{3}, \frac{5}{7}, \frac{4}{5}, \frac{6}{7}.$$

The total number F of transform-domain samples in the interval $[0, 4\pi)$ corresponding to N time-domain samples can be estimated as $$F(N) \; N^2. \quad (78)$$

Figure 9:
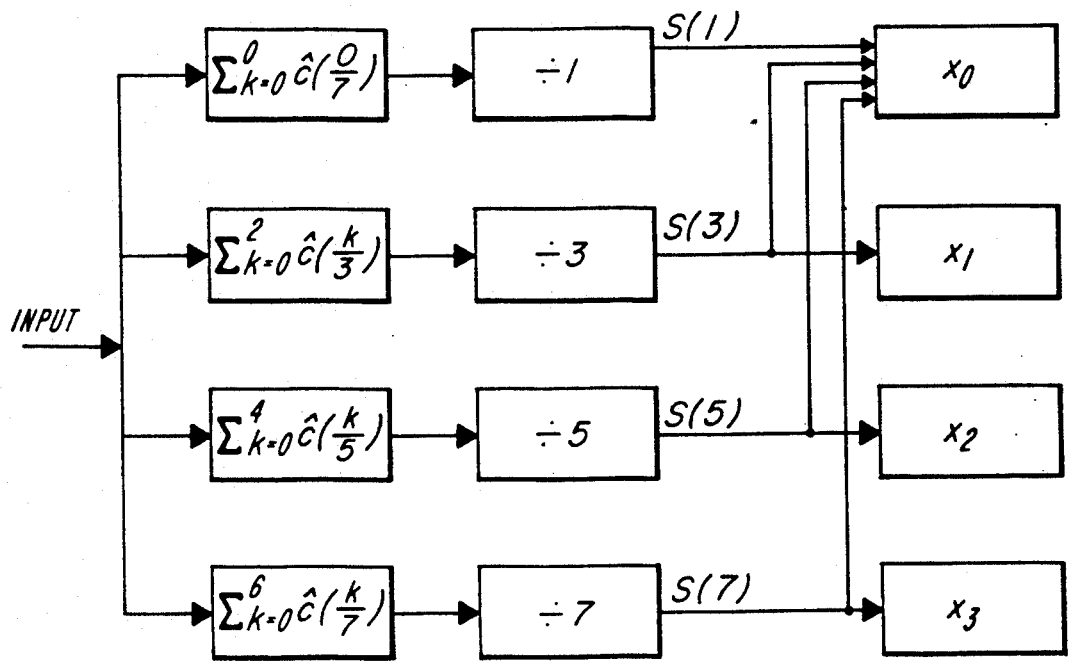
FIG. 9 shows a flow chart for the calculation of the inverse DCT using the AFT for N=4.

That is, much more transform-domain samples are needed for determination of time-domain samples by using this AFT-based approach, compared with a direct inverse DCT computation of equation (59). The advantage of simple, efficient computation is gained by use of the dense transform-domain representation, and the density can be utilized in estimation of signal parameters, such as predominant signal frequencies. FIG. 9 shows a flow chart for the calculation of the inverse DCT using the AFT in the case of $N=4$. As can be seen, the computations proceed in parallel and the individual operations are very simple. In addition, there is also no need of multiplications by cosine coefficients. Except for one scaling by an integer factor $2m+1$ for $M=0, \ldots, N-1$ in each channel respectively, only trivial multiplications by 0, +1, −1 and accumulations are required. If only the partial data set $x_n$ for $$\frac{N}{2} < n < N - 1$$

are required, they can be simply obtained using only the delay-line filtering operations, and then the computations of different channels are completely parallel and independent. These properties enable the efficient VLSI implementation of this inverse DCT algorithm.

When $N=4$, the matrices corresponding to operations of the delay-line filters (72) and the Mobius inversion (77) are $$\begin{bmatrix} S(1) \\ S(3) \\ S(5) \\ S(7) \end{bmatrix} = \quad (79)$$

$$\begin{bmatrix} 1 & 0 & 0 & 0 & 0 & 0 & 0 & 0 & 0 & 0 & 0 & 0 & 0 \\ \frac{1}{3} & 0 & 0 & 0 & \frac{1}{3} & 0 & 0 & 0 & \frac{1}{3} & 0 & 0 & 0 \\ \frac{1}{5} & 0 & \frac{1}{5} & 0 & 0 & \frac{1}{5} & 0 & 0 & \frac{1}{5} & 0 & 0 & \frac{1}{5} & 0 \\ \frac{1}{7} & \frac{1}{7} & 0 & \frac{1}{7} & 0 & 0 & \frac{1}{7} & \frac{1}{7} & 0 & 0 & \frac{1}{7} & 0 & \frac{1}{7} \end{bmatrix} \begin{bmatrix} c(0/7) \\ c(1/7) \\ c(1/5) \\ c(2/7) \\ c(1/3) \\ c(2/5) \\ c(3/7) \\ c(4/7) \\ c(3/5) \\ c(2/3) \\ c(5/7) \\ c(4/5) \\ c(6/7) \end{bmatrix}$$

and $$\begin{bmatrix} x_0 \\ x_1 \\ x_2 \\ x_3 \end{bmatrix} = \begin{bmatrix} 1 & -1 & -1 & -1 \\ 0 & 1 & 0 & 0 \\ 0 & 0 & 1 & 0 \\ 0 & 0 & 0 & 1 \end{bmatrix} \begin{bmatrix} S(1) \\ S(3) \\ S(5) \\ S(7) \end{bmatrix} \quad (80)$$

respectively. The computation of $x_n$ from $$c\left(\frac{k}{2m+1}\right)$$

can be expressed in a matrix form as $$x = Ac. \quad (81)$$

The vectors c and x are defined as $$c = \left[ c(\theta) \; c\left(\frac{1}{2N-1}\right) c\left(\frac{1}{2N-3}\right) \ldots c\left(\frac{2(N-1)}{2N-1}\right) \right]^T \quad (82)$$

and

-continued $$x = [x_0 \ x_1 \ldots x_{N-1}]^T \quad (83)$$

respectively, where T represents the vector transpose operation. The elements c are arranged according to the increasing order of values $$\left(\frac{k}{2m+1}\right)$$

for $M=1, \ldots, N-1; k=0, \ldots, 2m$. Combining the delay-line filter matrix (79) and the Mobius invention filter matrix (80), we obtain the following matrix A which describes the complete inverse DCT operation for N=4 as:

$$A = \begin{bmatrix} \frac{34}{105} & \frac{-1}{7} & \frac{-1}{5} & \frac{-1}{7} & \frac{-1}{3} & \frac{-1}{5} & \frac{-1}{7} & \frac{-1}{7} & \frac{-1}{5} & \frac{-1}{3} & \frac{-1}{7} & \frac{-1}{5} & \frac{-1}{7} \\ \frac{1}{3} & 0 & 0 & 0 & \frac{1}{3} & 0 & 0 & 0 & 0 & \frac{1}{3} & 0 & 0 & 0 \\ \frac{1}{5} & 0 & \frac{1}{5} & 0 & 0 & \frac{1}{5} & 0 & 0 & \frac{1}{5} & 0 & 0 & \frac{1}{5} & 0 \\ \frac{1}{7} & \frac{1}{7} & 0 & \frac{1}{7} & 0 & 0 & \frac{1}{7} & \frac{1}{7} & 0 & 0 & \frac{1}{7} & 0 & \frac{1}{7} \end{bmatrix} \quad (84)$$

The matrix A is sparse and its nonzero coefficients are proper fractions. Many elements of the column vectors of A have the same absolute values. Furthermore, the elements of different values in the columns of A have a least common multiplier. These properties of A are useful in using a permuted difference coefficient (PDC) structure to efficiently reduce the number of multiplications involved. This will be explained in the next section.

Iterative Computation of the DCT

The new approach to iterative realization of the Arithmetic Fourier Transform will enable an iterative computation of the DCT. Started with a properly synthesized initial approximation vector, a set of about $N^2$ transform-domain samples is iteratively computed from N time-domain samples without any interpolation or zero-padding. The iterative AFT may be modified to calculate the discrete cosine transform with the same data set $x_n$ in equation (58) and therefore overcome the dense, Farey-fraction sampling problem inherent in the method described above. The previous requirement that $x_n$ has zero mean can also be eliminated and dense DTCT samples of c(w) of equation (61) will be obtained.

When given N uniformly spaced time-domain samples $x_n$, $n = 0, 1, \ldots, N-1$, the transform-domain samples $$c\left(\frac{k}{2m+1}\right)$$

may be determined by iterative use of equation (81) in the steepest descent algorithm. The initial transform-domain vector is properly determined so that the algorithm will converge and give the dense DTCT samples. The following formulas, results and their proofs parallel those of reference to which the reader is referred for details of the closely parallel justifications. The steepest descent algorithm is used for updating the transform-domain samples and is given by $$c_{j+2} = c_j + 2\alpha A^T e_j \quad (85)$$

where $c_j$ is the $j^{th}$ approximation to C and $\alpha$ is the step factor of updating. The error vector $e_j$ is defined as $$e_j = x - x_j \quad (86)$$

where $x_j$ denotes the synthesized time-domain signal using the AFT filter (81). That is, $$x_j = Ac_j \quad (87)$$

Starting with a zero vector $c_0 = 0$ and choosing the step factor $\alpha$ in the range $$0 < \alpha < \frac{1}{\sigma_{max}^2} \quad (88)$$

where $\sigma_{max}$ is the maximum singular value of the matrix A, the process (85) will converge and give the minimum norm solution $c_m$ of the equation (81):

$$c_m = A^T(AA^T)^{-1}x = Mx, \quad (89)$$

where M is the minimum norm solution matrix defined by $M = A^T(AA^T)^{-1}$.

Evaluating both sides of formula (61) at $$w = \frac{4k\pi}{2m+1},$$

the transform-domain samples $$c\left(\frac{k}{2m+1}\right)$$

of the cosine transform and the time-domain samples $x_n$ are related by $$c\left(\frac{k}{2m+1}\right) = \sum_{n=0}^{N-1} x_n \cos\left(\frac{2n+1}{2m+1} 2k\pi\right) \quad (90)$$

with $m=0, 1, \ldots, N-1; k=0, 1, \ldots, 2m$. Writing this in matrix form, we have $$c = Cx \quad (91)$$

where C is the cosine transform matrix whose $n^{th}$ column ($n=0, 1, \ldots, N-1$) is the cosine function $\cos((n+\frac{1}{2})w)$ sampled at values of $w=$ $$\frac{4k\pi}{2m+1}$$

for $m=0, \ldots, N-1$; $k=0, \ldots, 2m$. The direct computation of equation (91) requires many multiplications of cosine coefficients. In general, the cosine transform matrix C is not equal to the minimum vector for the iteration of equation 85). We use D to represent the difference matrix between the cosine transform matrix C and the minimum norm matrix M, namely, $$D = C - M. \quad (92)$$

Consider the matrix multiplication of AD, we note $$AD = A(C - A^T(AA^T)^{-1}) \quad (93)$$

The operation of AC is the AFT operation on the cosine signals sampled at Farey fraction values. Thus $AC = I$ and $AD = O$ where I and O are identity matrix and zero matrix, respectively.

If we start with an initial vector determined by $$c_o = Dx \quad (94)$$

the convergence property of the updating process (85) will not be affected and the process will converge to the cosine transform equation (91):

$$\lim_{j \to \infty} c_j = c. \quad (95)$$

Figure 10:
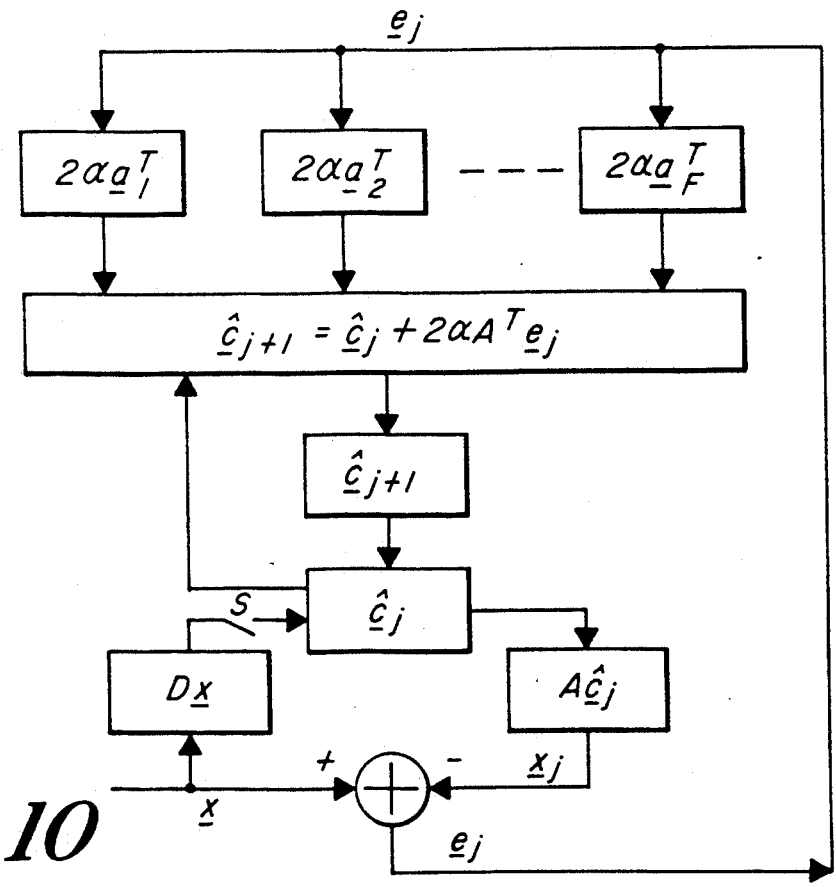
FIG. 10 shows a block diagram of computation of the DCT using the iterative AFT.

The proof of this fact follows the corresponding argument of reference. The block diagram of computation of the DCT using the iterative AFT is shown in FIG. 10, where the vectors $a_i$ for $i=1, \ldots, F$ are the column vectors of the matrix A and the switch s is closed only at the first step ($j=0$) to obtain the initial transform-domain vector $c_o$.

In this algorithm, the computation of synthesizing the signal $x_j = Ac_j$ can be easily achieved by the AFT algorithm. The number of multiplications (NOM) involved is $NOM = N-1$, where N is the time-domain data number. Based on the properties of the matrices A and D, the number of multiplications in the computations of $A^T e_j$ and of the initial vector $c_o$ can be effectively reduced by using a permuted difference coefficient (PDC) structure. The PDC is equivalent to the mathematical formulation known as summation-by-parts (SBP) which is a finite difference analog to the integration-by-parts reformulation of an integral. This structure has been used in the finite impulse response (FIR) filter implementation to reduce the number of multiplications and to obtain a smaller roundoff error. In this structure, started from the original coefficients, the new coefficients are formed by differencing successive values of the coefficients in the previous stage and ordering the results with falling magnitude. The rate of decrease in the NOM depends on the structure of the original coefficients.

Figure 11:
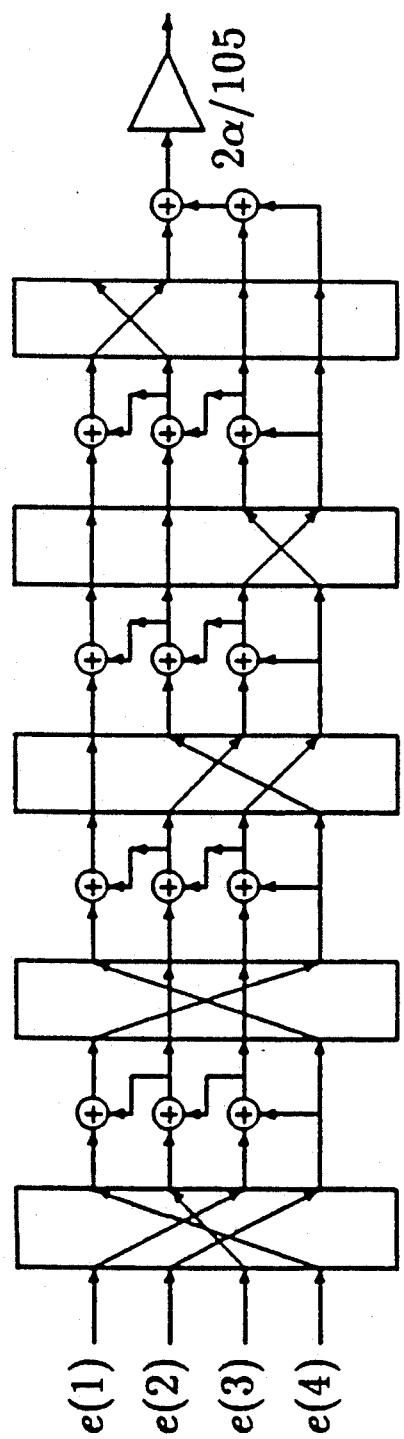
FIG. 11 shows a permuted difference coefficient structure.
Figure 12A:
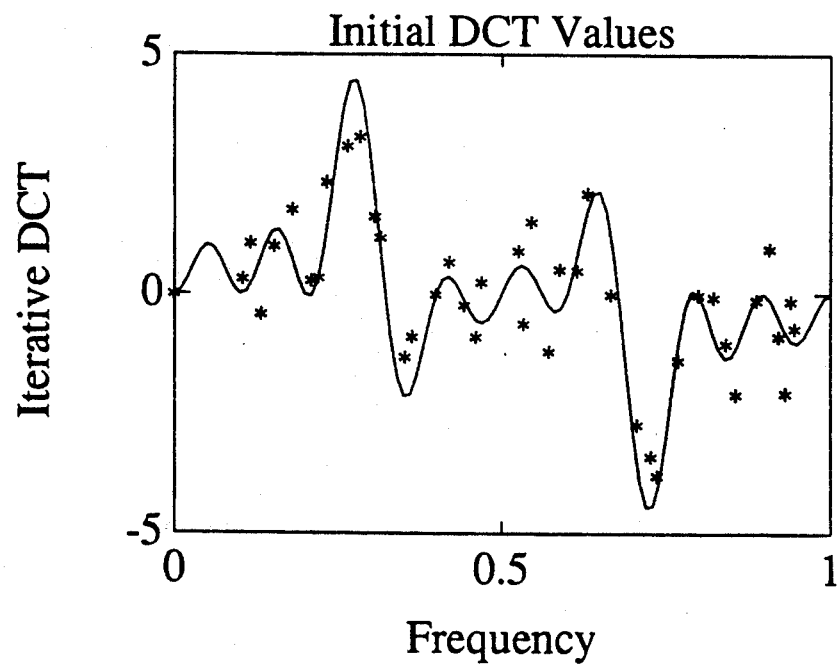
FIGS. 12A-12D show example graphs of computations of the discrete cosine transform using the iterative AFT.
Figure 12B:
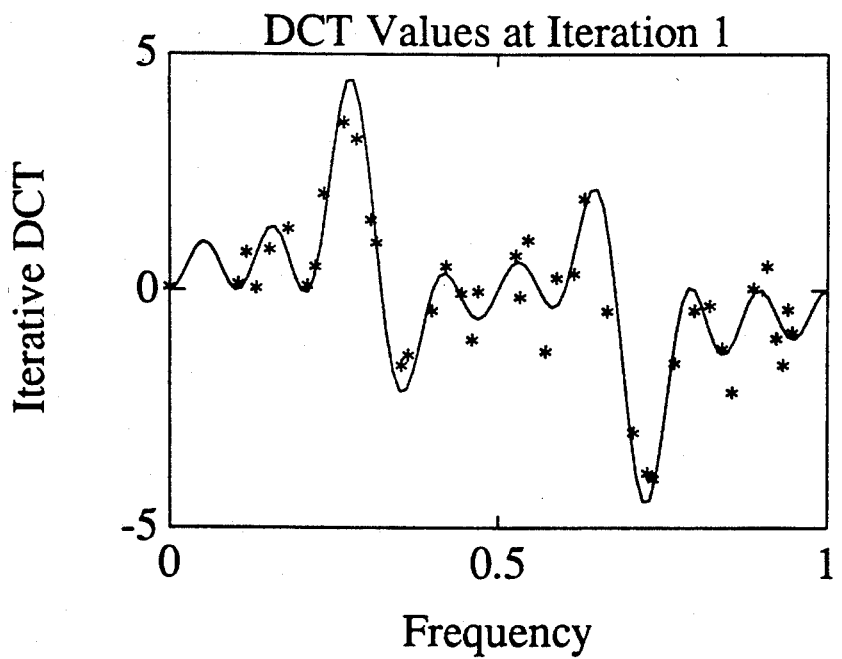
Figure 12C:
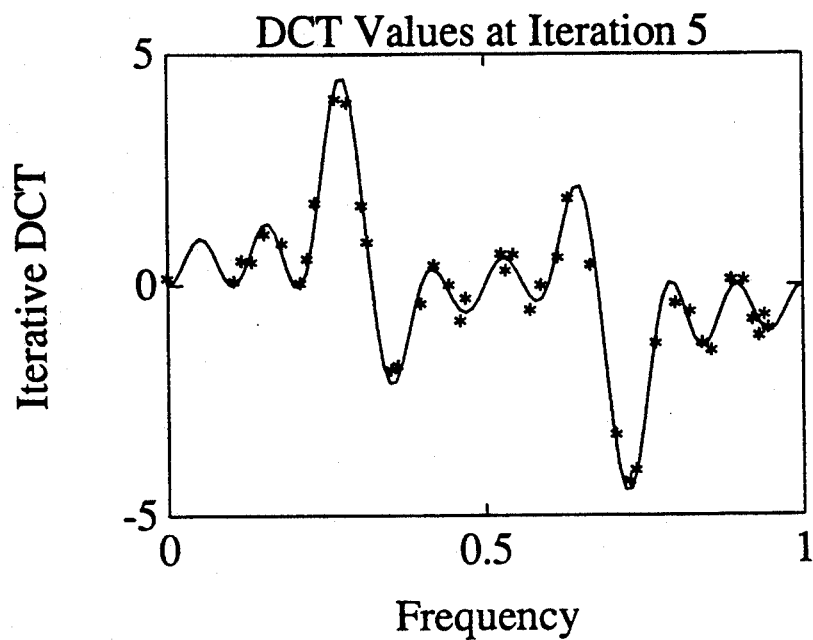
Figure 12D:
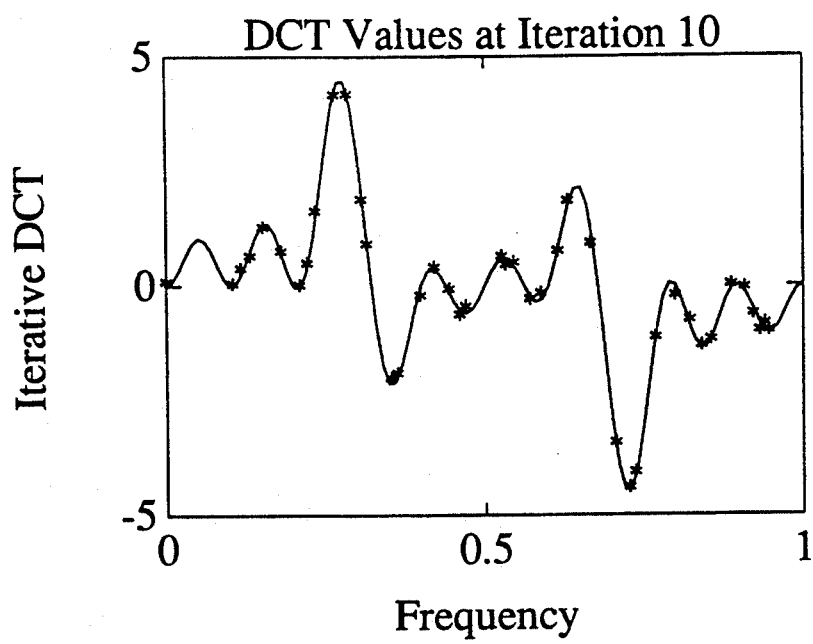

The properties of the AFT matrix are very useful for using the PDC structure to effectively reduce the NOM required in the computation $A^T e_j$. For example, the PDC structure for computing $a_1^T e_j$ for the case of $N=4$ is shown in FIG. 11. The original coefficients are $$a_1^T e_j = \frac{34}{105} \quad \frac{1}{3} \quad \frac{1}{5} \quad \frac{1}{7}.$$

It will be appreciated that after 5 stages of permuting and differencing process, only one multiplication is required. The remaining columns of A need only one multiplication and sign change operation. Thus, using the PDC structure, the computation of $A^T e_j$ can be implemented using only N multiplications. By properly choosing the step size $\alpha$ of updating, these multiplications can be realized by power-of-two coefficients and, therefore, only bit-shift operations are required.

This technique can also be used to effectively simplify the computation of the initial vector $C_o = Dx$. For example, we have the D matrix for $N=7$.

$$D = \begin{bmatrix}
0.000 & 0.000 & 0.000 & 0.000 & 0.000 & 0.000 & 0.000 \\
0.969 & 0.204 & -0.665 & -0.888 & -0.271 & 0.651 & 0.000 \\
0.941 & -0.042 & -0.859 & -0.555 & 0.515 & 0.000 & 0.515 \\
0.766 & 0.000 & -0.940 & 0.174 & 0.000 & 0.174 & 0.940 \\
0.790 & -0.734 & -0.056 & 0.000 & -0.056 & -0.734 & 0.790 \\
0.651 & -0.888 & 0.204 & 0.969 & -0.665 & -0.271 & 0.000 \\
0.515 & -0.859 & 0.941 & -0.042 & -0.555 & 0.000 & 0.555 \\
0.559 & -0.559 & 0.000 & -0.559 & 0.559 & 0.559 & -0.559 \\
0.174 & 0.000 & 0.766 & -0.940 & 0.000 & -0.940 & 0.766 \\
0.204 & -0.271 & 0.651 & -0.665 & 0.969 & -0.888 & 0.000 \\
-0.042 & 0.515 & -0.555 & 0.941 & -0.859 & 0.000 & -0.859 \\
-0.056 & 0.790 & -0.734 & 0.000 & -0.734 & 0.790 & -0.056 \\
-0.271 & 0.969 & -0.888 & 0.651 & 0.204 & -0.665 & 0.000 \\
0.000 & 0.000 & 0.000 & 0.000 & 0.000 & 0.000 & 0.000 \\
-0.555 & 0.941 & 0.515 & -0.859 & -0.042 & 0.000 & -0.042 \\
-0.665 & 0.651 & 0.969 & -0.271 & -0.888 & 0.204 & 0.000 \\
-0.559 & 0.559 & 0.000 & 0.559 & -0.559 & -0.559 & 0.559 \\
-0.734 & -0.056 & 0.790 & 0.000 & 0.790 & -0.056 & -0.734 \\
-0.940 & 0.000 & 0.174 & 0.766 & 0.000 & 0.766 & 0.174 \\
-0.859 & -0.555 & -0.042 & 0.515 & 0.941 & 0.000 & 0.941 \\
-0.888 & -0.665 & -0.271 & 0.204 & 0.651 & 0.969 & 0.000
\end{bmatrix} \quad (96)$$

The direct computation of $c_o = Dx$ would require 112 multiplications. Using the PDC structure, only one multiplication is needed for the second row after 8 stages of permuting and differencing, reducing from the original 6 multiplications. The NOM in other rows can be similarly reduced to only one to two in several stages and, as a result, only 25 multiplications are needed to determine the initial vector $c_o$. The PDC structure can be easily implemented with random access memory (RAM) and read-only memory (ROM) where the subsequent reordered coefficient addresses are stored.

It is known from (78) that the sample number F(N) in the transform domain increases at a rate of about $N^2$.

Therefore, the direct computation of $C_x$ would require about $N^3$ multiplications. The total computations required in the iterative AFT algorithm are dependent on the data length N and the maximum number $j_{max}$ of iterations. Since in each iteration, only less than $(2N-1)$ multiplications are needed, the total NOM in $j_{max}$ iterations is about $2N \cdot j_{max}$. The determination of $D_x$ needs extra computations which depend only on the data length N and the NOM involved can be effectively reduced to about $N^2/2$ by using the PDC structure. Thus the total NOM can be estimated as $NOM_{total} N^2/2 + 2N \cdot j_{max}$. The reduction in the NOM is achieved at the expense of increase in the NOA. In each iteration, about $2N^2$ additions are required and total additions are in the order of $2N^2 \cdot j_{max}$. These additions maybe computed in parallel.

In the conventional N-point DCT, the NOM is estimated by $NOM = N/2 \cdot \log_2 N$. This should not be directly compared with the NOM in the iterative AFT approach, since in the conventional DCT only N transform-domain samples are computed from N time-domain samples. The zero-padding is necessary for obtaining $N^2$ uniformly spaced transform-domain samples. If no special arrangement is made, the number of multiplications would be in the order of $N^2/2 \cdot \log_2 N^2 = N^2 \cdot \log_2 N$. The pruned-FFT techniques can be used to increase the computational efficiency for computing the zero-padded data where one removes branches coming from nodes with zero data. When $2^M$ points are transformed of which only $2^L$ are nonzero, the number multiplications can be reduced to about $$\frac{L}{M}$$

of the NOM required when without using the pruning. So if we have $N = 2^L$, then $N^2 = 2^{2L}$ and $M = 2L$. Therefore, the NOM required in the pruned-FFT approach is in the order of $$\frac{L}{M} N^2 \cdot \log_2 N = N^2/2 \cdot \log_2 N.$$

Comparing this result with $N^2/2 + 2N \cdot j_{max}$ required in the iterative AFT approach, if the maximum iteration number $j_{max}$ is much less than the data length N, the iterative AFT algorithm needs less multiplications. In the practice of VLSI implementation of the iterative algorithm, the accuracy of the computation is limited by the input A/D conversion process, the finite word length of the internal accumulating registers, and the implementation of the scaling operations. Because of this, the minimum time-domain and minimum transform-domain error norms can not be reduced to zero value. Since the convergence rate of this iterative algorithm is exponential, only several iterations are necessary to reach the minimum transform-domain error norm and to obtain the final results of dense transform-domain samples. Also, these samples are at Farey-fraction values and, from these dense transform domain samples, the inverse DCT can be very simply computed using the AFT algorithm discussed above.

Thus, by the iterative use of the AFT, the problem of dense, non-equally spaced time-domain data samples has been obviated and dense transform-domain samples of the cosine transform are obtained without any interpolation or zero-padding. These dense samples can be advantageously used to obtain accurate estimation of signal parameters and determination of a few principal components. The resulting parameters and principal components are useful in signal processing and coding. The arithmetic computations of this iterative method also have a high degree of parallelism and the resulting architecture is regular. Thus, it is also suitable for VLSI implementation.

Figure 13A:
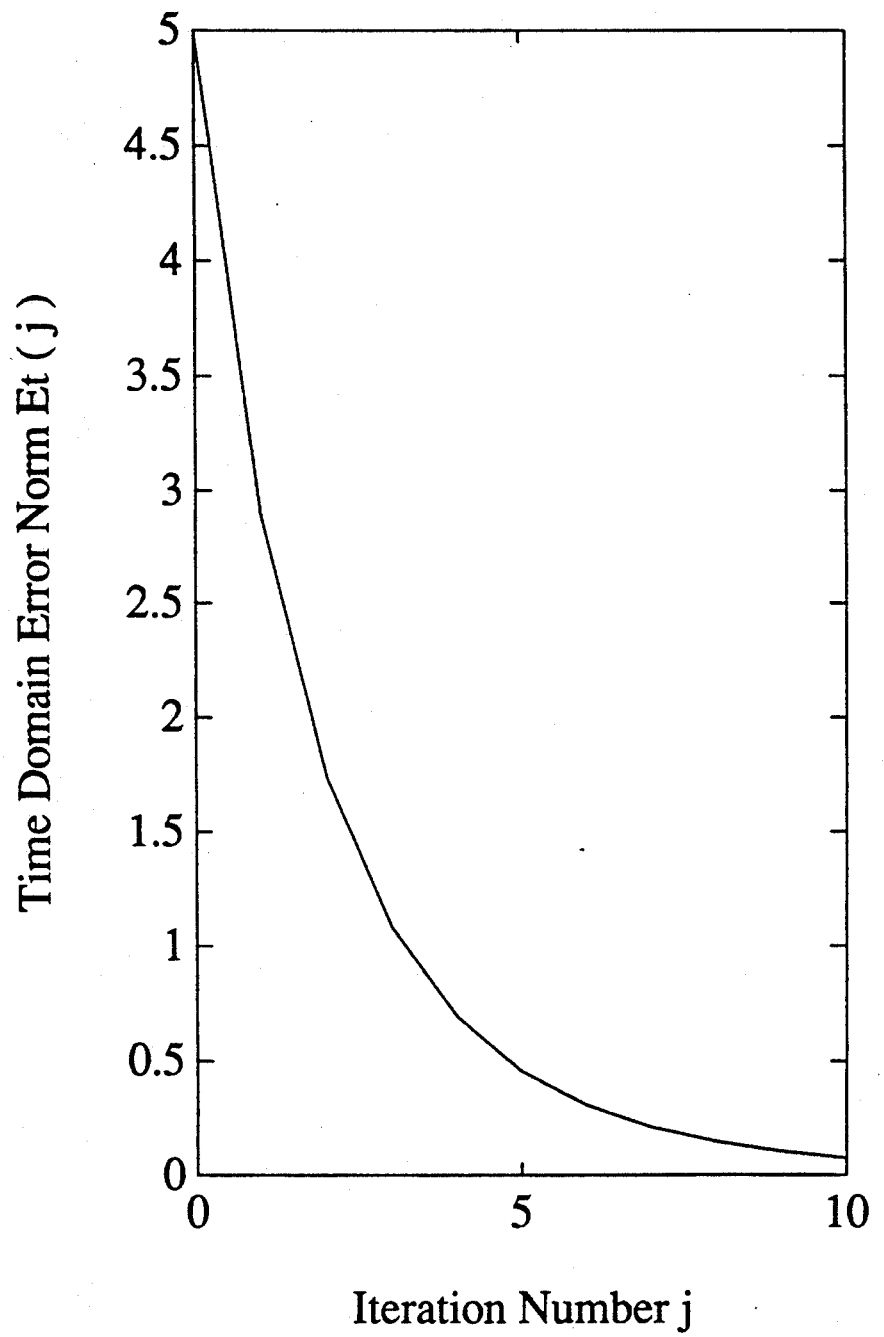
FIG. 13 shows graphs of the squared error norms as functions of an iteration number j.
Figure 13B:
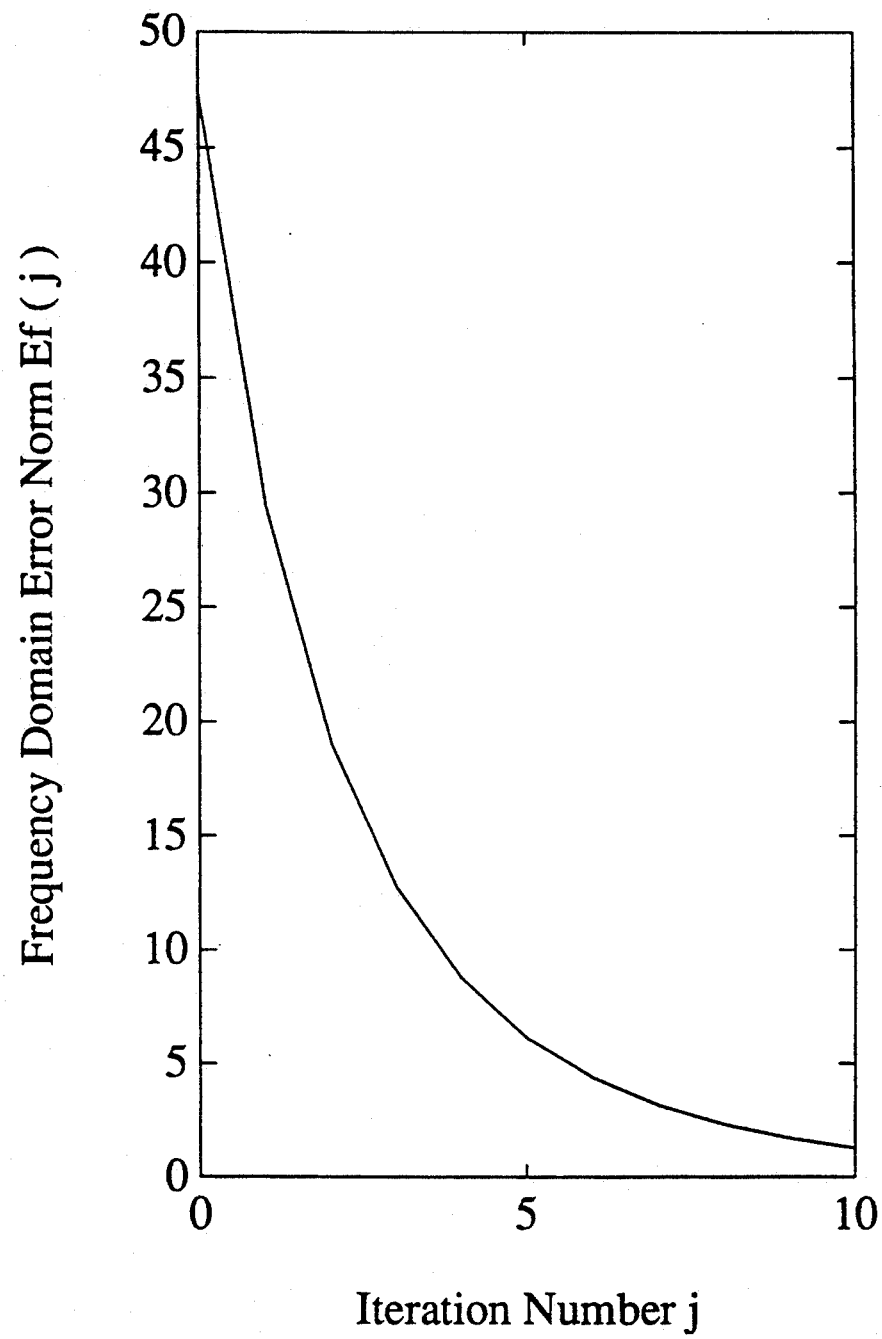

As an example of computation of the discrete cosine transform using the iterative AFT, we calculate the DCT of a signal $x_n = \cos(2\pi f n)$ with $f = 0.3$ and $N = 0, 1, \ldots, 9$ and show the results in FIGS. 12A–12D. The continuous function defined by (61) is shown in the solid line in these figures. The values of the DCT using the iterative AFT at different iterations are shown by the asterisks. The squared error norms are shown in FIG. 13 as functions of iteration number j. The squared time-domain error norm is defined by $$E(j) = \sum_{n=0}^{N-1} |x_n - x_{j,n}|^2. \tag{97}$$

The corresponding squared transform-domain error norm is defined by $$E(j) = \sum_{k,m} \left| c\left(\frac{k}{2m+1}\right) - c_j\left(\frac{k}{2m+1}\right) \right|^2$$

where frequency points are at the odd-number denominator Farey-fractions $$\frac{k}{2m+1}.$$

We can see that after several iterations, the iterative AFT quickly reduces the squared error norms and the resulting transform converges to the DTCT. The squared norms have different values in the time-domain and transform-domain because of the different number of components in x and c.

Therefore, a method of computation of the discrete cosine transform using the iterative AFT is presented. It overcomes the difficulty of dense, Farey-fraction sampling in the time-domain and could be used for cases in which (a) the function to be analyzed can only be sampled uniformly and at a rate close to the Nyquist rate or (b) dense transform-domain samples are needed. The inverse discrete cosine transform can be very efficiently computed from these dense, Farey-fraction transform-domain samples using the AFT. Therefore, this iterative method could be used with the AFT to form a transform pair and efficiently perform the discrete cosine transform and the inverse discrete cosine transform.

Computation of the 2-D DCT Using the AFT

The two-dimensional discrete cosine transform (2-D DCT) of a two-dimensional data array $x[n_1, n_2]$, $0 \leq n_1, n_2 \leq N-1$ is defined by:

$$c[k_1, k_2] = \sum_{n_1=0}^{N-1} \sum_{n_2=0}^{N-1} x[n_1, n_2] \cos\left[\frac{(2n_1+1)k_1\pi}{2N}\right] \cos\left[\frac{(2n_2+1)k_2\pi}{2N}\right] \tag{99}$$

The 2-D discrete-time cosine transform (2-D DTCT) is defined by:

$$c(w_1, w_2) = \sum_{n_1=0}^{N-1} \sum_{n_2=0}^{N-1} x[n_1, n_2] \cos\left(\left(n_1 + \frac{1}{2}\right) w_1\right) \cos\left(\left(n_2 + \frac{1}{2}\right) w_2\right) \quad (100)$$

It will be appreciated that the 2-D DCT can be considered as samples of the 2-D DTCT with $$w_1 = \frac{k_1}{N} \pi, \ w_2 = \frac{k_2}{N} \pi, \ 0 \leq k_1, k_2 \leq N - 1.$$

The discrete cosine transform plays an important role in digital image processing. It is nearly optimal in coding performance when an image can be modeled as a realization of a two-dimensional, discrete Markov random field. Fast computation and simple VLSI implementation of the 2-D DCT is the intended objective.

In this section, the 2-D AFT approach is used to compute the 2-D DCT. The algorithm has the same advantages as the 1-D DCT by using the AFT. But in addition to the need for dense samples, there also is a requirement for the removal of specified signal components before using the 2-D AFT algorithm.

Considering the 2-D continuous function:

$$x(t_1, t_2) = \sum_{k_1=0}^{N-1} \sum_{k_2=0}^{N-1} c[k_1, k_2] \cos(\pi k_1 t_1) \cos(\pi k_2 t_2) = \quad (101)$$

$$\sum_{k_1=0}^{N-1} \sum_{k_2=0}^{N-2} C_{k_1, k_2}(t_1, t_2)$$

where $$C_{k_1, k_2}(t_1, t_2) = c[k_1, k_2] \cos(\pi k_1 t_1) \cos(\pi k_2 t_2) \quad (102)$$

it is apparent that $x(t_1, t_2)$ is doubly periodic, and both horizontal and vertical periods are 2. In the above and following discussions, we use the parenthesis form $(.,.)$ is used to represent a continuous function and the square bracket form $[.,.]$ to represent its samples. Thus, $x[n_1, n_2]$ can be obtained by sampling $x(t_1, t_2)$ at time $$(t_1, t_2) = \left(\frac{n_1 + 1/2}{N}, \frac{n_2 + 1/2}{N}\right)$$

for $0 \leq n_1, n_2 \leq N-1$. The DCT values $c[0,0]$, $c[k_1,0]$ and $c[0,k_2]$ are not computed using the AFT algorithm. $c[0,0]$ can be easily determined by summation, $c[k_1,0]$ and $c[0,k_2]$ can be computed using the one dimensional DCT. The corresponding $(2N-1)$ components of equation (101) must be removed prior to using the AFT. In the 1-D DCT case, only the DC component corresponding to the coefficient $c[0]$ has to be removed. Therefore, in the following discussion, we assume that the signal under analysis is in the form of $$x(t_1, t_2) = \sum_{k_1=1}^{N-1} \sum_{k_2=1}^{N-1} c[k_1, k_2] \cos(\pi k_1 t_1) \cos(\pi k_2 t_2). \quad (103)$$

Thus, $x[n_1, n_2]$ is determined by:

$$x(n_1, n_2) = \sum_{k_1=1}^{N-1} \sum_{k_2=1}^{N-1} c[k_1, k_2] \cos\left[\frac{(2n_1 + 1)k_1 \pi}{2N}\right] \cos\left[\frac{(2n_2 + 1)k_2 \pi}{2N}\right] \quad (104)$$

Similar to the AFT algorithm, we define a set of two dimensional delay-line filters $$D_{n_1, n_2}(t_1, t_2) = \frac{1}{n_1 n_2} \sum_{m_1=0}^{n_1-1} \sum_{m_2=0}^{n_2-1} x\left(t_1 + \frac{2m_1}{n_1}, t_2 + \frac{2m_2}{n_2}\right) \quad (105)$$

for $1 \leq n_1, n_2 \leq N - 1$.

The sample points of $x(t_1, t_2)$ are on 2-D Farey fraction lattice. Note that for the 2-D DCT the wider sampling region $$\left[0 \leq t_1 \leq \frac{2(N-2)}{N-1}, 0 \leq t_2 \leq \frac{2(N-2)}{N-1}\right]$$

is required than the sampling region $$\left[0 \leq t_1 \leq \frac{N-1}{N}, 0 \leq t_2 \leq \frac{N-1}{N}\right]$$

used in the 2-D AFT.

Substituting (101) into (105) and rearranging the order of summations, we get $$D_{n_1, n_2}(t_1, t_2) = \frac{1}{n_1 n_2} \sum_{m_1=0}^{n_1-1} \sum_{m_2=0}^{n_2-1} \sum_{k_1=1}^{N-1} \sum_{k_2=1}^{N-1} c[k_1, k_2] \cos\left[\pi k_1 \left(t_1 + \frac{2m_1}{n_1}\right)\right] \quad (106)$$

$$\cos\left[\pi k_2 \left(t_2 + \frac{2m_2}{n_2}\right)\right]$$

$$= \sum_{k_1=1}^{N-1} \sum_{k_2=1}^{N-1} c[k_1, k_2] \frac{1}{n_1 n_2} \sum_{m_1=0}^{n_1-1} \sum_{m_2=0}^{n_2-1} \cos\left[\pi k_1 \left(t_1 + \frac{2m_1}{n_1}\right)\right]$$

$$\cos\left[\pi k_2 \left(t_2 + \frac{2m_2}{n_2}\right)\right]$$

-continued $$= \sum_{k_1=1}^{N-1} \sum_{k_2=1}^{N-1} c[k_1, k_2] \frac{1}{n_1} \sum_{m_1=0}^{n_1-1} \cos\left[\pi k_1 \left(t_1 + \frac{2m_1}{n_1}\right)\right]$$

$$\frac{1}{n_2} \sum_{m_2=0}^{n_2-1} \cos\left[\pi k_2 \left(t_2 + \frac{2m_2}{n_2}\right)\right]$$

for $1 \leq n_1, n_2 \leq N-1$. Since, $$\frac{1}{n} \sum_{m=0}^{n-1} \cos\left[\pi k \left(t + \frac{-2m}{n}\right)\right] = \qquad (107)$$

$$\begin{cases} \cos(\pi kt), & \text{if } k = l \cdot n \text{ for some integer } l; \\ 0, & \text{if } n \nmid k, \end{cases}$$

the outputs of the above 2-D delay-line filters of equation (106) can be expressed as $$D_{n1,n2}(t_1,t_2) = \sum_{l_1=1}^{\lfloor (N-1)/n_1 \rfloor} \sum_{l_2=1}^{\lfloor (N-1)/n_2 \rfloor} c[l_1 n_1, l_2 n_2] \cos(\pi l_1 n_1 t_1) \cos(\pi l_2 n_2 t_2) \qquad (108)$$

$$= \sum_{l_1=1}^{\lfloor (N-1)/n_1 \rfloor} \sum_{l_2=1}^{\lfloor (N-1)/n_2 \rfloor} Cl_1 n_1, l_2 n_2(t_1, t_2)$$

for $1 \leq n_1, n_2 \leq N-1$; where $(N-1)/n$ denotes the largest integer which is less than or equal to $(N-1)/n$. Noticing that $c[k_1, k_2] = 0$ for $K_1 > (N-1)$ or $K_2 > (N-1)$ and $D_{n1,n2}(t_1,t_2) = 0$ for $n_1 > (N-1)$ or $n_2 > (N-1)$, multiply both sides of equation (108) by the Mobius function $\mu(m_1)\mu(m_2)$ and sum over all non-zero elements. The result is:

$$\sum_{m_1=1}^{\lfloor (N-1)/k_1 \rfloor} \sum_{m_2=1}^{\lfloor (N-1)/k_2 \rfloor} \mu(m_1)\mu(m_2) D_{m1 k1, m2 k2}(t_1, t_2) = \qquad (109)$$

$$\sum_{m_1=1}^{\infty} \sum_{m_2=1}^{\infty} \mu(m_1)\mu(m_2) D_{m1 k1, m2 k2}(t_1, t_2)$$

$$= \sum_{m_1=1}^{\infty} \sum_{m_2=1}^{\infty} \mu(m_1)\mu(m_2) \sum_{l_1=1}^{\infty} \sum_{l_2=1}^{\infty} Cl_1 m1 k1, l2 m2 k2(t_1, t_2)$$

$$= \sum_{j_1=1}^{\infty} \sum_{j_2=1}^{\infty} C_{j_1, j_2}(t_1, t_2) (\sum_{m_1 | j_1/k_1} \mu(m_1))(\sum_{m_2 | j_2/k_2} \mu(m_2))$$

Using the property of the Mobius function the following is obtained.

$$C_{k_1, k_2}(t_1, t_2) = \sum_{m_1=1}^{(N-1)/k_1} \sum_{m_2=1}^{(N-1)/k_2} \mu(m_1)\mu(m_2) D_{m1 k1, m2 k2}(t_1, t_2) \qquad (110)$$

Sampling $C_{k_1, k_2}(t_1, t_2)$ at $(t_1, t_2) = (0,0)$, the formula for the 2-D discrete cosine transform is obtained using the 2-D AFT as $$c[k_1, k_2] = c_{k_1, k_2}(t_1, t_2)|_{(t_1, t_2)=(0,0)} = \qquad (111)$$

$$\sum_{m_1=1}^{\lfloor (N-1)/k_1 \rfloor} \sum_{m_2=1}^{\lfloor (N-1)/k_2 \rfloor} \mu(m_1)\mu(m_2) D_{m1 k1, m2 k2}(0,0)$$

for $1 \leq k_1, k_2 \leq N-1$.

Figure 14:
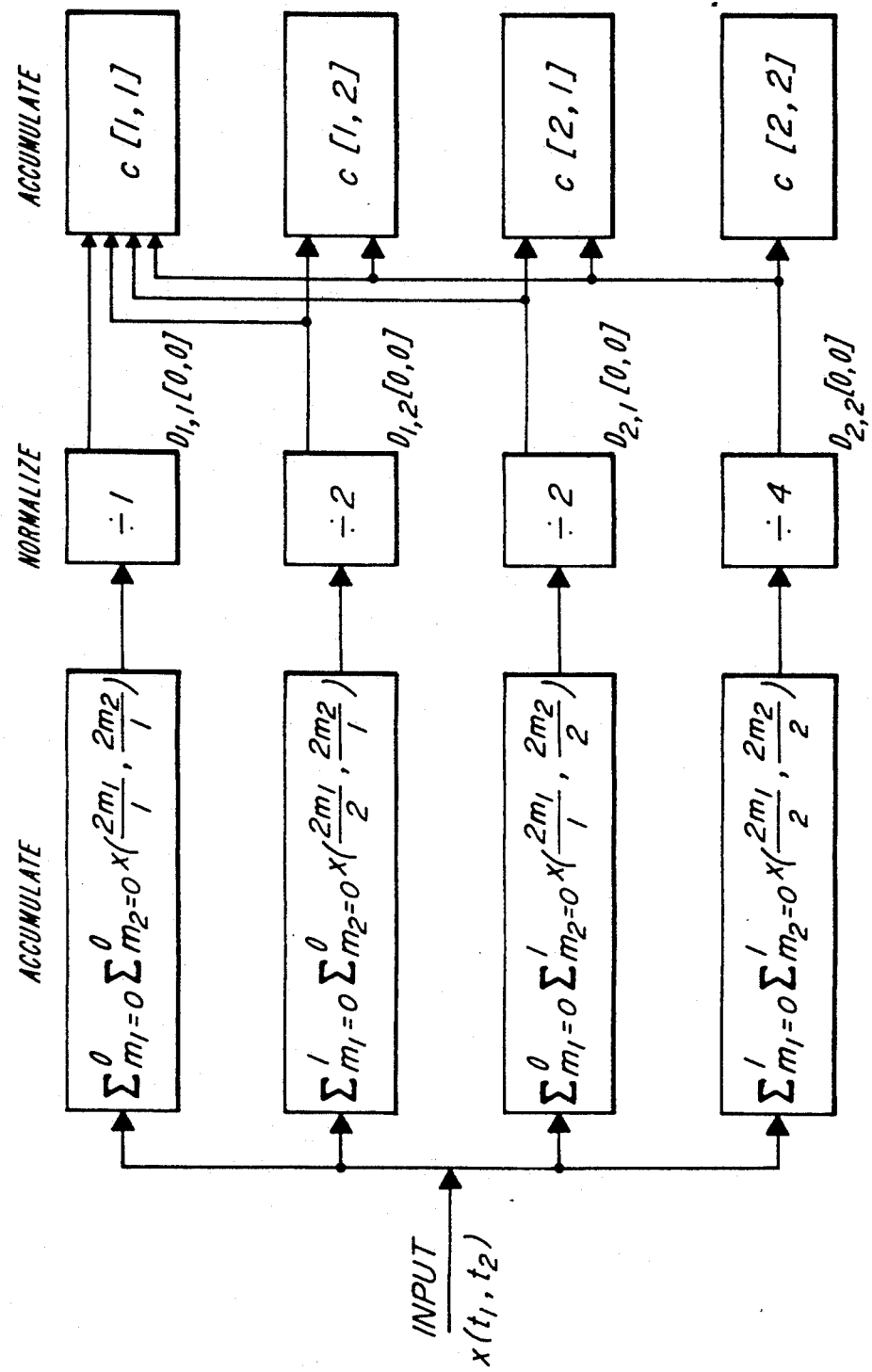
FIG. 14 shows a flow chart computing the 2-D DCT using the AFT.

The flow chart of computing the 2-D DCT using the AFT for the case of $N=3$ is shown in FIG. 14. From (104) and FIG. 14, the computation of the 2-D DCT using the 2-D AFT needs only additions except for a small amount of multiplications by prescribed scale factors. The high degree regularity and parallelism of the AFT make it very suitable for efficient VLSI implementation. The disadvantage of this approach is that dense data samples of $x(t_1, t_2)$ at non-equally spaced 2-D fractions $$\left(\frac{2m_1}{n_1}, \frac{2m_2}{n_2}\right):$$

$(1 \leq n_1 \leq (N-1), 0 \leq m_1 \leq n_1 - 1; \quad 1 \leq n_2 \leq (N-1), 0 \leq m_2 \leq n_2 - 1)$ are required. This need for more data samples can be alleviated by zero-order or first-order interpolation.

Computation of the 2-D Inverse DCT Using the 2-D AFT

The difficulties in the previous section can be overcome by using the iterative AFT. This iterative method for calculating the forward DCT is based on iterative evaluation of the inverse DCT using the AFT algorithm. In this section, details of the computation of the inverse DCT using the modified AFT are presented. The computation of the inverse DCT using the AFT also has advantages for VLSI implementation and parallel processing. To reduce the size of data set required in the computation, the symmetry properties of the cosine transform are utilized.

For equation (100), we know that the function $c(w_1, w_2)$ has a period of $4\pi$ for both $w_1$ and $2w_2$. Similar also to the AFT algorithm, we define a set of two-dimensional delay-line filters in the form:

$$S(2m_1 + 1, 2m_2 + 1) = \frac{1}{(2m_1+1)(2m_2+1)} \sum_{k_1=0}^{2m_1} \sum_{k_2=0}^{2m_2} c\left[4\pi \frac{k_1}{2m_1+1}, \frac{k_2}{2m_2+1}\right] \qquad (112)$$

$$= \frac{1}{(2m_1 + 1)(2m_2 + 1)} \sum_{k_1=0}^{2m_1} \sum_{k_2=0}^{2m_2} c\left[\frac{k_1}{2m_1 + 1}, \frac{k_2}{2m_2 + 1}\right]$$

where $$c\left[\frac{k_1}{2m_1 + 1}, \frac{k_2}{2m_1 + 2}\right] = c\left[4\pi \frac{k_1}{2m_1 + 1}, \frac{k_2}{2m_1 + 2}\right] \quad (113)$$

for $0 \leq m_1, m_2 \leq N-1$, $0 \leq k_1 \leq 2m_1$, $0 \leq k_2 \leq 2m_2$. Substituting (100) into (112) and exchanging the orders of summations, results as:

$$\sum_{k_1=0}^{2m_1} \sum_{k_2=0}^{2m_2} \sum_{n_1=0}^{N-1} \sum_{n_2=0}^{N-1} \frac{x[n_1, n_2]}{(2m_1 + 1)(2m_2 + 1)} \cos\left[(n_1 + 1/2)\frac{4k_1\pi}{2m_1 + 1}\right] \quad (114)$$

$$= \sum_{n_1=0}^{N-1} \sum_{n_2=0}^{N-1} \frac{x[n_1, n_2]}{(2m_1 + 1)(2m_2 + 1)} \sum_{k_1=0}^{2m_1} \cos\left[\frac{2n_1 + 1}{2m_1 + 1} 2k_1\pi\right]$$

$$\sum_{k_2=0}^{2m_2} \cos\left[\frac{2n_2 + 1}{2m_2 + 1} 2k_2\pi\right]$$

Since $$\frac{1}{2m + 1} \sum_{k=0}^{2m} \cos\left(\frac{2n + 1}{2m + 1} 2k\pi\right) = \quad (115)$$

$$\begin{cases} 1, & \text{if } \frac{2n + 1}{2m + 1} = l, \text{ for some interger } l \\ 0, & \text{otherwise;} \end{cases}$$

we get $$S(2m_1 + 1, 2m_2 + 1) = \sum_{n_1} \sum_{n_2} x[n_1, n_2] \quad (116)$$

Figure 15:
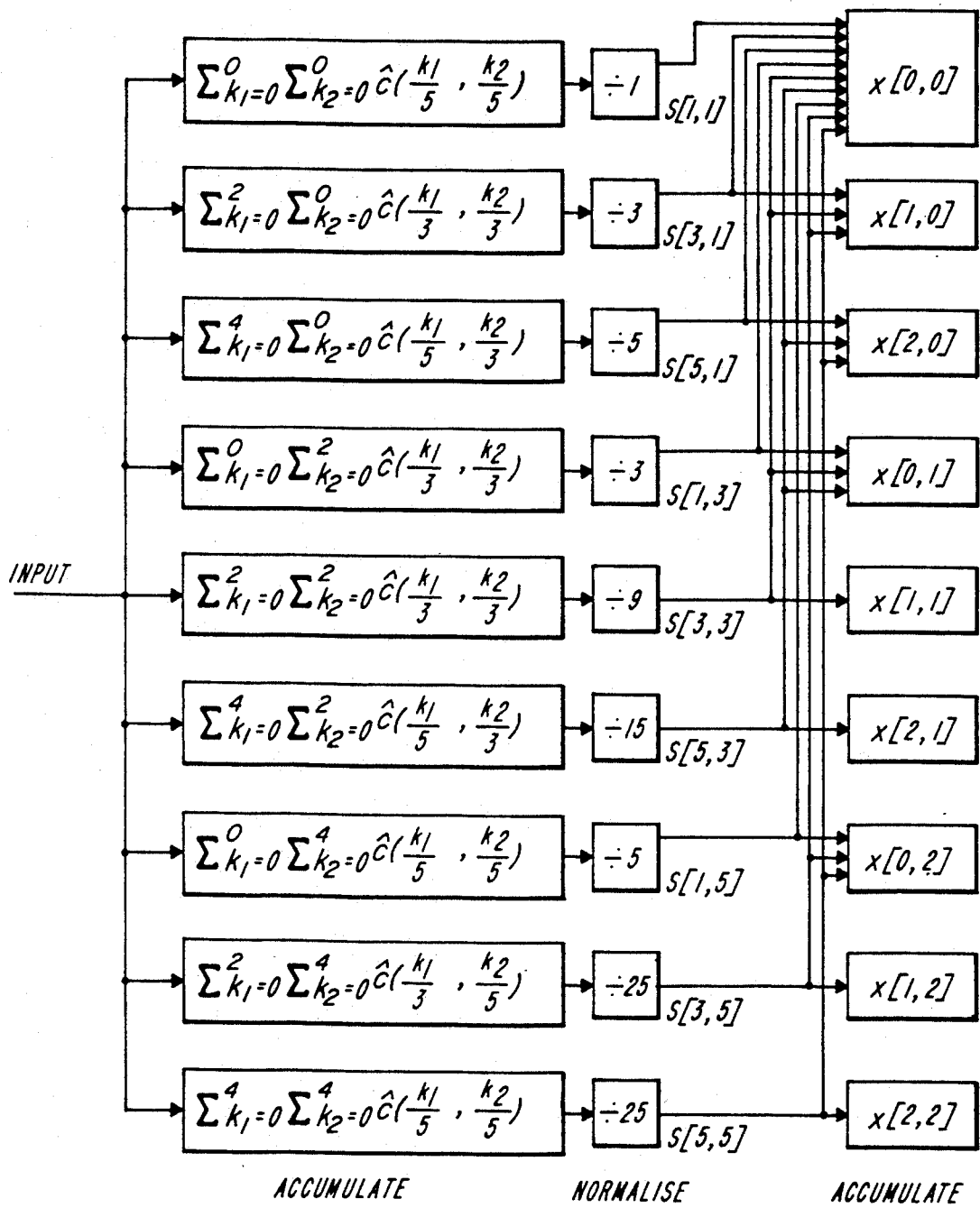
FIG. 15 shows a flow chart for calculating the 2-D inverse DCT using the AFT.

The summation above is carried out over values of $[n_1, n_2]$ which satisfy the condition $$\frac{2n_1 + 1}{2m_1 + 1} = \text{some interger } l_1 \text{ and} \quad (117)$$

$$\frac{2n_2 + 1}{2m_2 + 1} = \text{some interger } l_2$$

and up-bounded by $n_1 \leq (N-1)$, $n_2 \leq (N-1)$. Using the Mobius inversion to equation (116), the formula for determining the image-domain samples $x[n_1, n_2]$ is obtained from the outputs $S(2m_1+1, 2m_2+1)$ of the 2=D delay-line filters.

$$x[n_1, n_2] = \sum_{l_1=0}^{\lfloor \frac{2N=1}{2n_1+1} - 1 \rfloor} \sum_{l_2=0}^{\lfloor \frac{2N=1}{2n_2+1} - 1 \rfloor} \mu(2l_1 + 1)\mu(2l_2 + 1) \quad (118)$$

$$S[(2l_1 + 1)(2n_1 + 1), (2l_2 + 1)(2n_2 + 1)]$$

for $0 \leq n_1, n_2 \leq N-1$ FIG. 15 shows a flow chart for the calculation of the 2-D inverse DCT using the AFT for the case $N=3$. As can be seen, the computations proceed in parallel and the individual operations are very simple. Except for a small number of scaling in one stage of the computation, only multiplications by 0, +1 and −1 are required. There is not need of multiplications by cosine coefficients.

Let $\underline{S}$, $\underline{c}$ and $\underline{x}$ denote the column vectors formed from $S[2m_1+1, 2m_2+1]$, $$c\left[\frac{k_1}{2m_1 + 1}, \frac{k_2}{2m_2 + 1}\right]$$

and $x[n_1, n_2]$ by column-major order, respectively, as $$\underline{S} = O_c(S[2m_1 + 1, 2m_2 + 1]) \quad (119)$$

$$\underline{c} = O_c\left(c\left[\frac{k_1}{2m_1 + 1}, \frac{k_2}{2m_2 + 1}\right]\right)$$

$$\underline{x} = O_c(x[n_1, n_2])$$

where $O_c(.\,,\,.)$ stands for column-by-column ordering operation. Thus, the $i^{th}$ entry in $\underline{S}$, denoted by $\underline{S}_i$, is $$\underline{S}_i = S[2m_1+1, 2m_2+1] \quad (120)$$

with $i = m_1 + m_2 \cdot N + 1$ the $j^{th}$ entry $\underline{x}_j$ of $\underline{x}$ is $$\underline{x}_j = x[n_1, n_2] \quad (121)$$

with $j = n_1 + n_2 \cdot N + 1$ Accordingly, the $k^{th}$ entry of $\underline{c}_k$ of $\underline{c}$ is arranged according to the order of increasing values $$\frac{k_1}{2m_1 + 1} \text{ and } \frac{k_2}{2m_2 + 1}.$$

For $N = 3$, the following hold:

$$\underline{S} = (S[1,1] \; S[3,1] \ldots S[5,1] \ldots S[5,5])^T$$

$$\underline{x} = (x[0,0] \; x[1,0] \ldots x[0,2] \ldots x[2,2])^T \quad (122)$$

$$\underline{c} = (c[0,0]\,c[1/5,0] \ldots c[0,4/5] \ldots c[4/5,4/5])^T$$

where T represents the vector transpose operation.

Figure 16:
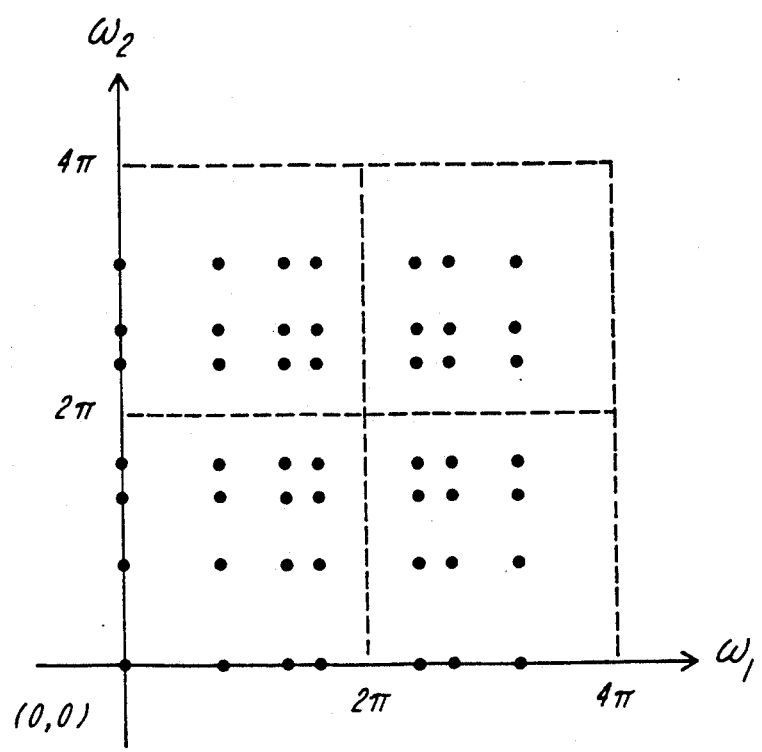
FIG. 16 shows a graph of sampling points of transform-domain samples.

The sampling points of transform-domain samples are the 2-D Farey fraction values which are obtained using only odd-number denominators. For example, 49 sampling points for the case N=3 are shown in FIG. 16. More transform-domain samples are needed for determination of image-domain samples by using the Mobius inversion equation (118), compared with a direct inverse DCT computation. The advantage of simple, efficient computation is gained by using the dense transform-domain representation. The dense transform-domain samples can be utilized in accurate estimation of signal parameters. The total number F of the transform-domain samples in the region $[0 \leq w_1 \leq 4\pi, 0 \leq w_2 \leq 4']$ corresponding to $N \times N$ image-domain samples can be estimated as $$F(N) = 9\left(\frac{2N}{\pi}\right)^4 + O(N \ln(N)). \quad (123)$$

Using the symmetry properties of $c(w_1, w_2)$, the data size of the transform-domain samples required in the inverse DCT computation by the modified AFT equation (118) can be reduced to about a quarter of that determined by formula (113). From (100), $c(w_1, w_2)$ has the following relations:

$$c(2\pi + w_1, 2\pi + w_2) = c(2\pi w_1, 2\pi - w_2)$$

$$c(2\pi + w_1, w_2) = c(2\pi - \text{pi } w_1, w_2) \quad (124)$$

$$c(w_1, 2\pi + w_2) = c(w_1, 2\pi - w_2)$$

Thus, only the samples of $c(w_1, w_2)$ in the sub-region $[0 \leq w_1 \leq 2\pi, 0 \leq w_2 \leq 2\pi]$ are needed. That is, we only need the samples:

$$c\left[\frac{k_1}{2m_1 + 1}, \frac{k_2}{2m_2 + 1}\right] \quad (125)$$

for $0 \leq m_1, m_2 \leq N - 1,$
$0 \leq k_1 \leq m_1, 0 \leq k_2 \leq m_2,$ in the computation $x[n_1, n_2]$ using the modified AFT algorithm (118).

For the case of N=3, we then need 16 samples in the bottom-left sub-region shown in FIG. 3 and the transform-domain vector becomes $\underline{c}$ becomes $$\underline{c} = (c[0,0] \ c[1/5,0] \ . \ c[2/5,0] \ldots c[0,2/5] \ldots c[2/5,2/5])^T \quad (126)$$

The matrices corresponding to the operations of the delay-line filters (112) in the sub-region and the Mobius inversion (118) for N=3 are shown respectively in FIGS. 17A and 17B. The computation of $x[n_1, n_2]$ from $$c\frac{k_1}{2m_1 + 1}, \frac{k_2}{2m_2 + 1}$$

can be expressed in a matrix form as $$\underline{x} = A\underline{c} \quad (129)$$

Combining the delay-line filter matrix (127) and the Mobius inversion matrix (128), the following matrix A is obtained which describes the complete 2-D inverse DCT operation for N=3 as shown in FIG. 17C.

It will be appreciated that in FIG. 17C the matrix A is sparse and its nonzero elements are all proper fractions. Many elements of the column vectors of A have the same absolute values. Furthermore, the elements of different values have least common multiples. These properties of A are useful in using a permuted difference coefficient (PDC) structure to effectively reduce the number of multiplications involved.

It is important to notice that no special index sets must be removed when calculating the IDCT using the AFT approach in (118). This should be contrasted with the special assumptions, discussed in connection with (101), (102) and (103), which are required for the forward DCT computation using the AFT.

Iterative Commutation of the 2-D DCT

The new approach to iterative realization of the one-dimensional Arithmetic Fourier transform will now be used to iteratively compute the 2-D DCT. Started with a properly synthesized initial approximation vector, a set of about $N^2$ transform-domain samples is iteratively computed from N time-domain samples without any interpolation of zero-padding. In this section, the iterative AFT is modified to calculate the 2-D discrete cosine transform with the same data set $x[n_1, n_2]$ in equation (99) and therefore overcome the dense, Farey-fraction sampling problem inherent in the method described above. The previous requirement that $x(t_1, t_2)$ has zero mean can also be eliminated and dense 2-D DTCT samples of $c(w_1, w_2)$ of equation (100) will be obtained.

When given $N \times N$ uniformly spaced image-domain samples $x[n_1, n_2], 0 \leq n_1, n_2 \leq N-1$, the transform domain samples $$c\left[\frac{k_1}{2m_1 + 1}, \frac{k_2}{2m_2 + 1}\right]$$

may be determined by iterative use of formula (129) in the steepest descent algorithm. The initial transform-domain vector is properly determined so that the algorithm will converge and give the dense transform-domain samples of the 2-D discrete cosine transform. The following formulas, results and their proofs parallel those of reference to which the reader is referred for details of the closely parallel justifications. The steepest algorithm is used for updating the transform-domain samples and is given by $$\underline{c}_{j+1} = \underline{c}_j + 2\alpha A^T \underline{e}_j \quad (131)$$

where $\underline{c}_j$ is the $j^{th}$ approximation to $\underline{c}$ and $\alpha$ is the step factor of updating. The error vector $\underline{e}_j$ is defined as $$\underline{e}_j = \underline{x} - \underline{x}_j \quad (132)$$

where $\underline{x}_j$ denotes the synthesized image-domain vector using the AFT filter (129). That is, $$\underline{x}_j = A\underline{c}_j \quad (133)$$

If we start with a zero vector $\underline{c}_0 = \underline{0}$ and choose the step factor $\alpha$ in the range $$0 < \alpha < \frac{1}{\sigma_{max}^2} \quad (134)$$

where $\sigma_{max}$ is the maximum singular value of the matrix A, the process (131) will converge and give the minimum norm solution $c_m$ of the equation (129):

$$c_m = A^T(AA^T)^{-1}x = Mx, \quad (135)$$

where M is the minimum norm solution matrix defined by $M = A^T(AA^T)^{-1}$

Evaluating both sides of formula (100) at $$\left( w_1 = \frac{4k_1\pi}{2m_1 + 1}, w_2 = \frac{4k_2\pi}{2m_2 + 1} \right)$$

in the region of $[0 \leq w_1, w_2 \leq 2\pi]$, the transform-domain samples $$c\left[\frac{k_1}{2m_1 + 1}, \frac{k_2}{2m_2 + 1}\right]$$

of the 2-D cosine transform and the image-domain samples $x[n_1, n_2]$ are related by $$c\left[\frac{k_1}{2m_1 + 1}, \frac{k_2}{2m_2 + 1}\right] = \sum_{n_1=0}^{N-1} \sum_{n_2=0}^{N-1} x[n_1,n_2]\cos\left(\frac{2n_1 + 1}{2m_1 + 1} 2k_1\pi\right)\cos\left(\frac{2n_2 + 1}{2m_2 + 1} 2k_2\pi\right) \quad (136)$$

with $0 \leq m_1, m_2 \leq N - 1$, $0 \leq k_1 \leq m_1, 0 \leq k_2 \leq m_2$.

Writing this in matrix form, we have $$c = Cx \quad (137)$$

where c is the transform-domain vector arranged as the vector $\bar{c}$ and C is the cosine transform matrix whose elements are two dimensional cosine function $$\cos\left(\left(n_1 + \frac{1}{2}\right)w_1, \left(n_2 + \frac{1}{2}\right)w_2\right)$$

sampled at values of $$\left( w_1 = \frac{4k_1\pi}{2m_1 + 1}, w_2 = \frac{4k_2\pi}{2m_2 + 1} \right).$$

The direct computation of (137) will require many multiplications by cosine coefficients. In VLSI, the realization of these multiplications is area intensive and time consuming.

In general, the cosine transform matrix C is not equal to the minimum norm matrix M. Instead an attempt is made to find a better starting vector for the iteration of equation (131). D is used to represent the difference matrix between the cosine transform matrix C and the minimum norm matrix M, namely, $$D = C - M. \quad (138)$$

For N=3, the matrix D is as shown in FIG. 17D. Considering the matrix multiplication of AD, it is noted that:

$$AD = A(C - A^T(AA^T)^{-1}). \quad (140)$$

The operation of AC is the AFT operation on the cosine signals sampled at Farey fraction values. Thus AC=I and therefore AD=O, where I and O are identity matrix and zero matrix, respectively. Starting with an initial vector determined by $$C_o = Dx \quad (141)$$

the convergence property of the updating process (131) will not be affected and the process will converge to the cosine transform solution (137):

$$\lim_{j \to \infty} c_j = c \quad (142)$$

The proof of this fact follows the corresponding argument of reference step by step.

The method steps for computing the 2-D DCT using the iterative AFT are as follows:

1. Specify the maximum tolerance in the squared norm $E_m$ of the error vector $e_j$;
2. Calculate the initial transform-domain vector $c_j = D\underline{x}$;
3. Synthesize the image-domain vector $\underline{x}_j = Ac_j$;
4. Calculate the error signal vector $\underline{e}_j = \underline{x} - \underline{x}_j$;
5. Update the transform-domain vector $c_{j+1} = c_j + 2\alpha A^T e_j$;
6. Repeat steps 3-5 by incrementing the iterate index j until a satisfactory convergence ($E_j \leq E_m$) has been achieved.

The functional block diagram of the apparatus used for the computation of the DCT using the iterative AFT is shown in FIG. 18. The vectors $a_i$ for $i = 1, \ldots L$ are the column vectors of the matrix A. That is $$A = [\underline{a}_1 \underline{a}_2 \ldots \underline{a}_L]. \quad (143)$$

The switch s is closed only at the first step (j=0) to obtain the initial transform-domain vector $c_o$.

In this process, the computation of synthesizing the signal $\underline{x}_j = Ac_j$ can be easily achieved by the AFT as shown in FIG. 15. From the matrix A in (130) and the matrix D in (139), many elements in the rows of D have the same absolute values. The successive ordered differences of the elements of A and D will result in many zero-valued coefficients. Therefore, based on the properties of the matrices A and D, by using a permuted different coefficient (PDC) structure, the number of multiplications in the computations of $A^T e_j$ and of the initial vector $c_o$ can be effectively reduced. The PDC is equivalent to the mathematical formulation known as Summation by Parts (SBP) which is a finite difference analog to the integration by parts reformulation of an integral. The PDC structure can be easily implemented with random access memory (RAM) and read-only memory (ROM). Furthermore, some rows of D are the same except for the difference in sign and some rows have all zero elements. Therefore, the arithmetic computations of this iterative method also have a high degree of parallelism and the resulting architecture is regular. As a result of this iterative use of the AFT, the problem of dense, non-equally spaced image-domain data samples has been obviated. Also, the dense transform-domain samples of the cosine transform are obtained without any interpolation or zero-padding. These dense samples can be used to obtain the accurate estimation of signal parameters and the determination of principal components. The resulting parameters and principal components are useful for image processing and coding.

As an example of computation of the 2-D discrete cosine transform using the iterative AFT, the values of $c(w_1, w_2)$ of a signal are calculated as:

$$x[n_1, n_2] = \cos[2\pi f_1 n_1 + 2\pi f_2 n_2] \quad (144)$$

with $f_1 = 0.2$, $f_2 = 0.3$ and $0 \leq n_1, n_2 \leq 1$. The function $c(w_1, w_2)$ defined by equation (100) is shown in FIG. 19 by mesh plot. Its values along the frequency $$f_1 \left( = \frac{w_1}{2\pi} \right)$$

for 4 different values of $$f_2 \left( = \frac{w_2}{2\pi} \right)$$

are shown in FIG. 20 to FIG. 23 by solid lines. The values of the DTCT at the Farey-fraction points using the iterative AFT at different iterations are shown in these figures by the asterisks. The squared error norms are shown in FIG. 24 as functions of iteration number j. The squared image-domain error norm $E_s(j)$ is defined by $$E_s(j) = e_j^T e_j = \sum_{n_1=0}^{N-1} \sum_{n_2=0}^{N-1} |x[n_1, n_2] - x_j[n_1, n_2]|^2 \quad (145)$$

where $x_j[n_1, n_2]$ is the synthesized signal by the AFT filter. The corresponding squared transform-domain error norm $E_{r(j)}$ is defined by $$E_t(j) = (c - c)^T(c - c) = \quad (146)$$

$$\sum_{k_1, m_1} \sum_{k_2, m_2} \left| c\left[ \frac{k_1}{2m_1 + 1}, \frac{k_2}{2m_2 + 1} \right] - c_j\left[ \frac{k_1}{2m_1 + 1}, \frac{k_2}{2m_2 + 1} \right] \right|^2$$

where the transform-domain sample points are at the odd-number denominator Farey-fractions in the subregion. From these figures, starting from the initial values determined by simple computation Dx, the iterative AFT quickly reduces the squared error norms and resulting 2-D transform converges to the 2-D DTCT. Note that the squared error norms $E_s(j)$ and $E_{r(j)}$ have different values because of the different number of components of $\underline{x}$, $x_j$ in image-domain and of $\underline{c}$, $c$ in transform-domain.

In the practice of VLSI implementation of this iterative method, the accuracy of the computation is limited by the input A/D conversion process, the finite word length of the internal accumulating registers, and the implementation of the scaling operations. Because of this, the minimum image-domain and minimum transform-domain error norms cannot be reduced to zero value. Since the convergence rate of this iterative algorithm is exponential, only several iterations are necessary to reach the minimum image-domain error norm and to obtain the final results.

Therefore, two methods of computing the 2-D discrete cosine transform are herein presented. The first method uses the 2-D AFT to implement a simple computation fo the 2-D DCT and dense samples are required. The second method is based on the iterative AFT. It overcomes the difficulty of dense, Farey-fraction sampling in the image-domain and could be used for cases in which (a) the function to be analyzed can only be sampled uniformly and at a rate close to the Nyquist rate or (b) dense transform-domain samples are needed. The 2-D inverse discrete cosine transform can be very efficiently computed from these dense, Farey-fraction tranform-domain samples using the 2-D AFT. Therefore, this iterative method could be used with the AFT to form a transform and inverse transform pair and to efficiently perform the 2-D discrete cosine transform and the 2-D inverse discrete cosine transform.

Applications of the Iterative AFT in Imaging

Both the AFT and the iterative AFT (IAFT) have been extended for the efficient computations of one-dimensional (1-D) and two-dimensional (2-D) discrete cosine transforms (DCT). The resulting methods have the similar advantages of the AFT and the IAFT, and are useful in image coding and processing.

The AFT and the IAFT also have potential applications in medical diagnostic image processing, such as reconstruction of an image from partial information about its Fourier transform, the recovery of computerized tomograph (CT) images and the zooming of nuclear magnetic resonance (NMR) images. The AFT and the IAFT may be implemented with integrated circuits and used to provide fast computations for these specific tasks.

In diagnostic imaging, there is a great need for more powerful and yet economic signal acquisition, processing, display and storage technologies. The AFT and the IAFT are applicable in the following image processing problems.

The problem of reconstructing an image from only the amplitude or phase of its Fourier transform arises in a variety of different applications. The iterative Fourier-transform based calculations have been used for the image reconstruction since they have the advantages of wide applicability, low sensitivity to noise and easy incorporation of a priori information about solutions.

These methods involve the Fourier transform and the inverse Fourier transform back and forth iteratively between the Fourier transform domain, where the measured amplitude or the phase of Fourier transform $X(k_1, k_2)$ is applied, and the image domains, where a priori information about the image $x(n_1, n_2)$ is applied. The block diagram of the constrained image reconstruction using the iterative Fourier transform approach is shown in FIG. 25, where $F\{.\}$ and $F^{-1}\{.\}$ represent the Fourier transform and the inverse Fourier transform, respectively $x_i(n_1, n_2)$ and $x_f(n_1, n_2)$ are the image-domain data before and after the operation of the image-domain constraints, respectively. $X_i(k_1, k_2)$ and $X_f(k_1, k_2)$ are the transform-domain data before and after the operation of the transform-domain constraints, respectively. Started from an initial estimate $x_0(n_1, n_2)$, the method iteratively reconstructs the object image $x(n_1, n_2)$. Typically the convergence of calculations to acceptable solutions requires hundreds of iterations and the computation load is rather heavy.

The IAFT and the AFT may be used in these image reconstruction algorithms. The iterative AFT needs only a small number of multiplications in each iteration and its arithmetic computations are performed in parallel, and furthermore, from the dense transform-domain samples at the Farey-fraction values, the inverse Fourier transform can be implemented very efficiently using the AFT to obtain the image-domain samples. The adaptation of the iterative AFT could be performed concurrently with the iterative process of image reconstruction. The AFT and the IAFT also have advantages of cost and power when they are implemented in an intergrated circuit. The hardware of the AFT can be time-shared by the AFT and the IAFT in these image reconstruction algorithms.

The computerized tomography (CT) with x-rays has obtained spectacular success in diagnostic imaging. Recently, tomography imaging with ultrasound, microwave and nucelar magentic resonance (NMR) has also received much attention in research. These techniques are also very useful in ocean acoustic tomography, sonar imaging and seismic mapping.

In the CT imaging, the observed data are the samples of the Fourier transform of the object image and the image can be reconstructed by the inverse Fourier transform. If the source is non-diffracting such as x-ray, these data are samples over a polar grid. If the source is diffracting such as ultrasound, these data are available over circular arcs. Interpolation is required to transform the data over a polar grid of points $\{p_n, \theta_k\}$ or over arcs to the points $\{x_n, y_k\}$ over a Cartesian grid before using the fast Fourier transform (FFT) to recover the image. Inexact interpolation is a major source of error in reconstruction by direct Fourier methods.

The AFT and the IAFT can be used instead of the FFT to recover the CT image as shown in FIG. 26. Since in the IAFT, from N projection data samples of each view, about $N^2/3$ Fourier transform samples are obtained over a central slice or a circular arc. The resulting data from different view angles more densely cover the transform plane than using the FFT. From these dense samples, the 2-D frequency-domain data over a 2-D Farey-fraction grid can be more accurately determined using the zeroth-order or first-order interpolation. Then 2-D inverse Fourier transform can be efficiently computed using the 2-D AFT to recover the desired image.

Nuclear magnetic resonance (NMR) imaging is a new technique for noninvasive looking inside the human body. Images are commonly reconstructed by calculating the inverse Fourier transform. Often, the sampling rate is close to the Nyquist criterion and thus the details of the image are difficult to discern. The pixel duplication or the Sinc (trigonometric) interpolation approaches have been used to zoom an image. The Since interpolation results in a superior image to the pixel duplication and is implemented with zero-padding and the FFT. Therefore, a considerable amoung of computation is spent on manipulating and performing complex arithmetic operations on zeros, especially when zooming factor is big. Some algorithms based on the pruned-FFT have been progressed to perform the efficient zooming of NMR images.

Using the IAFT, from N data samples in one domain, about $N^2/3$ data samples are obtained in the other domain without any additional zero-padding. Thus, it could be used to perform the effective zooming of NMR images, especially when the sample number of the original NMR image is small. When only a subimage is to be zoomed, the IAFT can be used to interpolate the data from the band selectable digital filtering (BSDF).

Conclusion

An iterative Arithmetic Fourier tranform method and apparatus is proposed by the present invention. This method preserves the advantage of the AFT by using the permuted difference coefficient structure and is suitable for VLSI implementation. The dense, Farey-fraction samples in the frequency domain are useful rational approximations. Given any real frequency value f, we can always find a "nearby" Farey fraction $$\frac{k}{m}$$

of order N which gives the approximation error $$e_f = \left| f - \frac{k}{m} \right|$$

bounded by $$\frac{1}{m(N+1)}.$$

If $$m > \frac{N}{2},$$

the error compares well with the approximate approximating error bound $$\frac{\pi^2}{12N^2}$$

resulting from the same number of uniformly spaced DFT frequency domain samples. This iterative AFT could be used with the AFT in many applications to reduce computation and efficiently perform Fourier analysis.

What is claimed is:

1. A signal processing method for converting an input signal, which represents Fourier coefficients of a function that varies in relation to an independent variable, into a set of output signals respectively representing the values of a Fourier series associated with said input signal, said method comprising the steps of:
(a) generating from a signal data source a data signal vector comprising plural sets of samples of an input signal received within an analysis period of said independent variable;

(b) generating from a first matrix multiplier means a frequency domain signal vector representative of an approximation of said frequency domain signal vector by multiplying said data signal vector by a predetermined transform signal matrix, wherein said first matrix multiplier means performs a predetermined number of computational iterations, and said frequency domain signal vector comprises plural sets of frequency samples of said input signal;

(c) performing via a second matrix multiplier means an inverse transformation on said frequency domain signal vector by multiplying said frequency domain signal vector by an Arithmetic Fourier Transform signal matrix to produce a synthesized data signal vector representative of an approximation of said data signal vector;

(d) generating from a subtractor an error signal vector by determining the difference between said generated data signal vector and said synthesized data signal vector;

(e) converting via a third matrix multiplier means said error signal vector into a frequency domain improvement signal vector by multiplying said error signal vector by the transpose of said Arithmetic Fourier Transform signal matrix, and by a predetermined scaling value;

(f) generating from an accumulator an updated frequency domain signal vector by adding said frequency domain improvement signal vector to said frequency domain signal vector;

(g) utilizing said updated frequency domain signal vector as a replacement signal vector for said frequency domain signal vector, repeating steps (c) through (f) for said predetermined number of computational iterations; and (h) producing said output signals representative of said calculated frequency domain signal vector.

2. A signal processing apparatus for converting an input signal, which represents Fourier coefficients of a function that varies in relation to an independent variable, into a set of output signals respectively representing the values of a Fourier series associated with said input signal, said apparatus comprising:

a signal data source which generates a data signal vector comprising plural sets of samples of input signal received within an analysis period of said independent variable;

a first matrix multiplier means which generates a frequency domain signal vector representative of an approximation of said frequency domain signal vector multiplying said data signal vector by a predetermined transform signal matrix, wherein said first matrix multiplier means performs a predetermined number of computational iterations, and said frequency domain signal vector comprises plural sets of frequency samples of said input signal;

a second matrix multiplier means which performs an inverse transformation on said frequency domain signal vector by multiplying said frequency domain signal vector by an Arithmetic fourier Transform signal matrix to produce a synthesized data signal vector representative of an approximation of said data signal vector;

a subtractor which generates an error signal vector by determining the difference between said generated data signal vector and said synthesized data signal vector;

a third matrix multiplier means which converts said error signal vector into a frequency domain improvement signal vector by multiplying said error signal vector by the transpose of said Arithmetic Fourier Transform signal matrix, and by a predetermined scaling signal value;

an accumulator which generates an updated frequency domain signal vector by adding said frequency domain improvement signal vector to said frequency domain signal vector;

means for utilizing said updated frequency domain signal vector as a replacement vector for said frequency domain signal vector, and thereafter cycling said frequency domain signal vector through said second matrix multiplier means, subtractor, third matrix multiplier means, and said accumulator for said predetermined number of computational iterations; and means for producing said output signals representative of said calculated frequency domain signal vector.

3. A signal processing method for converting an input signal, which represents Fourier coefficients of a function that varies in relation to an independent variable, into a set of output signals respectively representing the values of a Fourier series associated with said input signal, said method comprising the steps of:

(a) generating from a signal data source a data signal vector comprising plural sets of samples of an input signal received within an analysis period of said independent variable;

(b) generating from a first matrix multiplier means a preliminary frequency domain signal vector by multiplying said data signal vector by a predetermined transform signal matrix, said preliminary frequency domain signal matrix comprising plural sets of frequency samples of said input signal;

(c) generating from said first matrix multiplier means a frequency domain signal vector representative of an approximation of said frequency domain signal vector, wherein said first matrix multiplier means performs a predetermined number of computational iterations;

(d) performing via a second matrix multiplier means an inverse transformation on said frequency domain signal vector by multiplying said frequency domain signal vector by an Arithmetic Fourier Transform signal matrix to produce a synthesized data signal vector representative of an approximation of said data signal vector;

(e) generating from a subtractor an error signal vector by determining the difference between said generated data signal vector and said synthesized data signal vector;

(f) converting via a third matrix multiplier means said error signal vector into a frequency domain improvement signal vector by multiplying said error signal vector by the transpose of said Arithmetic Fourier Transform signal matrix, and by a predetermined scaling signal value;

(g) calculating via an accumulator an updated frequency domain signal vector by adding said frequency domain improvement signal vector to said frequency domain signal vector;

(h) utilizing said updated frequency domain signal vector as a replacement signal vector for said frequency domain signal vector, repeating steps (c)

through (f) for said predetermined number of computational iterations;

(i) generating from said accumulator a summation frequency domain signal vector by adding said preliminary frequency domain signal vector to said updated frequency domain signal vector; and (j) producing said output signals representative of said calculated summation frequency domain signal vector.

4. A signal processing apparatus for converting an input signal, which represents Fourier coefficients of a function that varies in relation to an independent variable, into a set of output signals respectively representing the values of a Fourier series associated with said input signal, said apparatus comprising:

a signal data source which generates a data signal vector comprising plural sets of samples of an input signal received within an analysis period of said independent variable;

a first matrix multiplier means which generates a preliminary frequency domain signal vector by multiplying said data signal vector by a predetermined transform signal vector, said preliminary frequency domain signal vector comprising plural sets of frequency samples of said input signal, said first matrix multiplier means further operable for generating a frequency domain signal vector representative of an approximation of said frequency domain signal vector, wherein said means for generating performs a predetermined number of computational iterations;

a second matrix multiplier means which performs an inverse transformation on said frequency domain signal vector by an Arithmetic Fourier Transform signal matrix to produce a synthesized data signal vector representative of an approximation of said data signal vector;

a subtractor which generates an error signal vector by determining the difference between said generated data signal vector and said synthesized data signal vector;

a third matrix multiplier means which generates said error signal vector into a frequency domain improvement signal vector by multiplying said error signal vector by the transpose of said Arithmetic Fourier Transform signal matrix, and by a predetermined scaling signal value;

an accumulator which generates an updated frequency domain signal vector by adding said frequency domain improvement signal vector to said frequency domain signal vector, said accumulator utilizing said updated frequency domain signal vector as a replacement signal vector for said frequency domain signal vector, and thereafter cycling said frequency domain signal vector through said second matrix multiplier means, subtractor, third matrix multiplier means, and said accumulator for said predetermined number of computational iterations, said accumulator further operable for generating a summation frequency domain signal vector by adding said preliminary frequency domain signal vector to said updated frequency domain signal vector; and means for producing said output signals representative of said calculated frequency domain signal vector.

5. A signal processing method for converting an input signal, which represents Fourier coefficients of a function that varies in relation to a first independent variable, into a set of output signals respectively representing the values of a Fourier series associated with said input signal, said method comprising the steps of:

(a) generating from a signal data source a data signal vector comprising plural sets of samples of an input signal received within an analysis period of said first independent variable;

(b) generating from a first matrix multiplier means a second independent variable domain signal vector representative of an approximation of said second independent variable domain signal vector by multiplying said data signal vector by a predetermined transform signal matrix, wherein said first matrix multiplier means performs a predetermined number of computational iterations, and said second independent variable domain signal vector comprises of said input signal;

(c) performing via a second matrix multiplier means an inverse transformation on said second independent variable domain signal vector by multiplying said second independent variable domain signal vector by an Arithmetic Fourier Transform signal matrix to produce a synthesized data signal vector representative of an approximation of said data signal vector;

(d) generating from a subtractor an error signal vector by determining the difference between said generated signal vector and said synthesized data signal vector;

(e) converting via third matrix multiplier means said error signal vector into a second independent variable domain improvement signal vector by multiplying said error signal vector by the transpose of said Arithmetic Fourier Transform signal matrix, and by a predetermined scaling signal value;

(f) generating from an accumulator an updated second independent variable domain signal vector by adding said second independent variable domain improvement signal vector to said second independent variable domain signal vector;

(g) utilizing said updated second independent variable domain signal vector as a replacement signal vector for said second independent variable domain signal vector, repeating steps (c) through (f) for said predetermined number of computational iterations; and (i) producing said output signals representative of said calculated second independent variable domain signal vector.

6. A signal processing apparatus for converting an input signal, which represents Fourier coefficients of a function that varies in relation to an independent variable, into a set of output signals respectively representing the values of a Fourier series associated with said input signal, said apparatus comprising:

a signal data source which generates a data signal vector comprising plural sets of samples of an input signal received within an analysis period of said first independent variable;

a first matrix multiplier means which generates a independent variable domain signal vector representative of an approximation of said second independent variable domain signal vector by multiplying said data signal vector by a predetermined transform signal matrix, wherein said first matrix multiplier means performs a predetermined number of computational iterations, and said second independent variable domain signal vector comprises plural sets of second independent variable domain samples of said input signal;

a second matrix multiplier means which performs an inverse transformation on said second independent variable domain signal vector by multiplying said second independent variable domain signal vector by an Arithmetic Fourier Transform signal matrix to produce a synthesized data signal vector representative of an approximation of said data signal vector;

a subtractor which generates an error signal vector by determining the difference between said generated data signal vector and said synthesized data signal vector;

a third matrix multiplier means which converts said error signal vector into a second independent variable domain improvement signal vector by multiplying said error signal vector by the transpose of said Arithmetic Fourier Transform signal matrix, and by a predetermined scaling signal value;

an accumulator which generates an updated second independent variable domain signal vector by adding said second independent variable domain improvement signal vector to said second independent variable domain signal vector;

means for utilizing said updated frequency domain vector as a replacement signal vector for said second independent variable domain signal vector, and thereafter cycling said second independent variable domain signal vector through said second matrix multiplier means, subtractor, third matrix multiplier means, and said accumulator for said predetermined number of computational iterations; and means fo producing said output signals representative of said calculated second independent variable domain signal vector.

7. A signal processing method for converting an input signal, which represents Fourier coefficients of a function that varies in relation to a first independent variable, into a set of output signals respectively representing the values of a Fourier series associated with said input signal, said method comprising the steps of:

(a) generating from a signal data source a data signal vector comprising plural sets of samples of an input signal within an analysis period of said independent variable;

(b) generating from a first matrix multiplier means a preliminary second independent variable domain signal vector by multiplying said data signal vector by a predetermined transform signal matrix, said preliminary second independent variable domain signal vector comprising plural sets of second independent variable domain samples of said input signal;

(c) generating from a first matrix multiplier means a second independent variable domain signal vector representative of an approximation of said second independent variable domain signal vector, wherein said first matrix multiplier means performs a predetermined number of computational iterations;

(d) performing via a second matrix multiplier means an inverse transformation on said second independent variable domain signal vector by multiplying said second independent variable domain signal vector by an Arithmetic Fourier Transform signal matrix to produce a synthesized data signal vector representative of an approximation of said data signal vector;

(e) generating from a subtractor an error signal vector by determining the difference between said generated signal vector and said synthesized data signal vector;

(f) converting via a third matrix multiplier means said error signal vector into a second independent variable domain improvement signal vector by multiplying said error signal vector by the transpose of said Arithmetic Fourier Transform signal matrix, and by a predetermined scaling signal value;

(g) calculating via an accumulator an updated second independent variable domain signal vector by adding said second independent variable domain improvement signal vector to said second independent variable domain signal vectors;

(h) utilizing said updated second independent variable domain signal vector as a replacement signal vector for said second independent variable domain signal vector, repeating steps (d) through (g) for said predetermined number of computational iterations;

(i) generating from said accumulator a summation second independent variable domain signal vector by adding said preliminary second independent variable domain signal vector to said updated second independent variable signal vector; and (k) producing said output signals representative of said calculated summation second independent variable domain signal vector.

8. A signal processing apparatus for converting an input signal, which represents Fourier coefficients of a function that varies in relation to a first independent variable, into a set of output signals respectively representing the values of a Fourier series associated with said input signal, said apparatus comprising the steps of:

a signal data source which generates a data signal vector comprising plural sets of samples of said input signal within an analysis period of said first independent variable;

a first matrix multiplier means which generates a preliminary second independent variable domain signal vector by multiplying said data signal vector by a predetermined transform signal matrix, said preliminary second independent variable domain signal vector comprising plural sets of second independent variable domain samples of said input signal said first matrix multiplier means further operable for generating a second independent variable domain signal vector representative of an approximation of said second independent variable domain signal vector, wherein said first matrix multiplier means performs a predetermined number of computational iterations;

a second matrix multiplier means which performs an inverse transformation on said second independent variable domain signal vector by multiplying said second independent variable domain signal vector by an Arithmetic Fourier Transform signal matrix to produce a synthesized data signal vector representative of an approximation of said data signal vector;

a subtractor which generates an error signal vector by determining the difference between said generated signal vector and said synthesized data signal vector;

a third matrix multiplier means which converts said error signal vector into a second independent variable domain improvement signal vector by multiplying said error signal vector by the transpose of said Arithmetic Fourier Transform signal matrix, and by a predetermined scaling signal value;

an accumulator which generates an updated second independent variable domain signal vector by adding said second independent variable domain improvement signal vector to said second independent variable domain signal vector, said accumulator utilizing said updated second independent variable domain signal vector as a replacement signal vector for said second independent variable domain signal vector, and thereafter cycling said second independent variable domain signal vector through said second matrix multiplier means, subtractor, third matrix multiplier means, and said accumulator for said predetermined number of computational iterations, said accumulator further operable for generating a summation second independent variable domain signal vector by adding said preliminary second independent variable domain signal vector to said updated second independent variable domain signal vector; and means for producing said output signals representative of said calculated summation second independent variable domain signal vector.

* * * * *

UNITED STATES PATENT AND TRADEMARK OFFICE
Certificate

Patent No. 5,253,192

Patented: October 12, 1993

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Donald W. Tufts, East Greenwich, Rhode Island; and Haiguang Chen, Mountain View, CA.

Signed and Sealed this Twenty-fifth Day of October 2005.

KAKALI CHAKI
*Supervisory Patent Examiner*
Art Unit 2193

UNITED STATES PATENT AND TRADEMARK OFFICE
CERTIFICATE OF CORRECTION

PATENT NO.      : 5,253,192
DATED           : October 12, 1993
INVENTOR(S)     : Donald W. Tufts It is certified that error appears in the above-identified patent and that said Letters Patent is hereby corrected as shown below:

Column 1,
Line 5, after the title and before the Background Section of the Invention, insert the following:

-- This invention was made with government support under Grant No. DAAl03-90-G-105, awarded by the United States Department of the Army. The government has certain rights in this invention. --.

Signed and Sealed this

Sixth Day of December, 2005

JON W. DUDAS
*Director of the United States Patent and Trademark Office*